United States Patent [19]
Barkans et al.

[11] Patent Number: 5,519,822
[45] Date of Patent: May 21, 1996

[54] METHOD AND APPARATUS FOR SIMULTANEOUSLY SELECTING A PLURALITY OF PIXELS TO LIE UPON A LINE SEGMENT DEFINED BY TWO END POINTS

[75] Inventors: Anthony C. Barkans, Fort Collins; Bryan G. Prouty, Wellington; Lawrence G. Mahoney; Ian A. Elliott, both of Fort Collins, all of Colo.

[73] Assignee: Hewlett-Packard Company, Palo Alto, Calif.

[21] Appl. No.: 354,171

[22] Filed: Dec. 9, 1994

[51] Int. Cl.⁶ .................................................. G06F 15/62
[52] U.S. Cl. ......................................................... 395/143
[58] Field of Search ................................. 395/141, 142, 395/143; 345/136, 137

[56] References Cited

U.S. PATENT DOCUMENTS

| | | | |
|---|---|---|---|
| 5,265,210 | 11/1993 | Vatti et al. | 395/143 |
| 5,303,339 | 4/1994 | Ikuma | 395/132 |
| 5,313,529 | 5/1994 | Itonori | 382/24 |
| 5,349,369 | 9/1994 | Kim | 345/136 |

Primary Examiner—Phu K. Nguyen
Attorney, Agent, or Firm—Edward L. Miller

[57] ABSTRACT

First next and second next pixel locations are selected simultaneously from among adjacent pixel locations and represent a straight line segment defined by two end locations and having a slope of one or less. An initialization process uses the ΔX and ΔY of the desired line segment to find various constants, including an initial error term, an error term increment, an error term decrement, an error term double increment, an error term double decrement, and an error term increment-then-decrement. These represent, respectively, an increment in the X location without an increment to the Y location (a step S), an increment in the X location and an increment in the Y location (a jump J), a step followed by a step (two steps SS), two jumps (JJ), and either of a step-then-jump or a jump-then-step (SJ/JS). These five operations correspond to the only possible locations that might be selected, given any starting location. Of the five operations, exactly one of the first two will be for the first next location, while exactly one of the last three will be for the second next location. The present error term is an input to three different adders. Another input to each of the adders is one of the constants for S or J and two of the constants for SS, JJ and SJ/JS. The three additions proceed simultaneously. The initial error term and the resulting three trial error terms can be inspected in relation to error term limits. When the Bresenham Algorithm is implemented, these comparisons are simple determinations of sign. A logic circuit responsive to the error term inspection indicates which combination of the operations S and J correspond to the desired path. A corresponding frame buffer operation code is sent to the a frame buffer address controller. Once the selection is made the error term value for the selected second next pixel location is captured and made to be the error term input for the adders, and the process is ready to select another two pixel locations. If ΔX is an odd number then the second next position is not needed for the final sequence of frame buffer operation codes, and it to be suppressed.

5 Claims, 56 Drawing Sheets

METHOD AND APPARATUS FOR SIMULTANEOUSLY SELECTING A PLURALITY OF PIXELS TO LIE UPON A LINE SEGMENT DEFINED BY TWO END POINTS

REFERENCES TO RELATED PATENTS AND OTHER PUBLICATIONS

The subject matter of this disclosure is related to that discussed in U.S. Pat. No. 5,025,405 (Swanson, issued 18 Jun. 1991). That patent is hereby expressly incorporated herein by reference. Also of particular interest is section two in chapter eleven of Fundamentals of Interactive Computer Graphics by J. D. Foley and A. Van Dam (Addison-Wesley 1982, 1984/ISBN 0-201-14468-9). Of particular interest is the development and explanation of Bresenham's Algorithm at sections 11.2.1 and 11.2.2.

BACKGROUND OF THE INVENTION

The task of determining which pixels are to be illuminated along a line segment (vector) defined by two end points in a raster scanned environment is a fairly common one where computer graphic techniques are used to create an image. In high performance graphic systems that task is performed by dedicated hardware. This is usually a good choice, since the task consists of solving equations belonging to a generally well understood class. Much effort has gone into finding ways to solving these equations in hardware with a minimum of time, so that the pixel determination hardware does not become an obnoxious limitation in restricting the rate at which manipulations to the object can be shown in the display. The present disclosure concerns a way to get the results of such pixel determination in less time than would ordinarily be required. The technique to be disclosed is compatible with the Bresenham algorithm, although use of that algorithm is not a requirement. Also, the technique to be disclosed is not limited to the selection of pixel-position; in a more generalized form it may also be used to interpolate the successive values of any dependent parameter as a function of sequential steps in an independent variable.

SUMMARY OF THE INVENTION

Consider a pixel grid and a given present location therein. A collection of adjacent "next" pixel locations are selected to represent a straight line segment with a slope of one or less and defined by two end locations. The first next and second next pixel locations to be selected are found simultaneously by applications of Bresenham's algorithm. Since the slope restriction confines the line segment of interest to the first octant (stepping in the X direction), and since there must be a pixel selected in Y for each location along X between the end locations, it follows that each increment along the X axis will be accompanied by either retaining the previous Y value (which we shall call a "step" and indicate by the symbol S) or by increment the Y value by one (a "jump", J).

Previously, an initialization process used the ΔX and ΔY of the desired line segment to find an initial Bresenham error term value, and various constants for the adjustment of the Bresenham error term, including an error term increment, an error term decrement, an error term double increment, an error term double decrement, and an error term increment-then-decrement. These adjustment constants represent, respectively, the location that is reached by an increment in the X location without an increment to the Y location (a step), the location that is reached by an increment in the X location and an increment in the Y location (a jump), the location that is reached by a step followed by a step (two steps, starting at the present pixel location), the location reached by two jumps, and either of the locations reached by step-then-jump and jump-then-step (these are two different paths to the same location).

Since we are dealing with Bresenham, the sign of the error term at each of these locations indicates if the next move is to be a jump or a step. That is, it indicates path information. Given a starting location there are, for two moves, two intermediate locations (for S and J) and three possible ending locations (for SS, JJ, and SJ/JS). There are, however, four paths (or transitions) that can be taken in reaching those three ending locations. That is because the SJ path is not the same as the JS path, even though they end at the same location. The key here is that by examining the signs of the error terms at the initial and intermediate locations it is possible to identify the proper one of the four paths, and that such identification can be a unit operation. That is, it can be implemented as if by a truth table, and does not require a multi-step inquiry.

These two intermediate and three ending locations correspond to the only possible locations that might be selected, given any starting location (the line has a slope of one or less, remember). Of the five, exactly one of the first two (S or J) will be the first next location, while exactly one of the last three (SS, JJ, SJ/JS) will be the second next location.

The present error term (whether it be the initial error term for the very start of the vector, or the end result of a previous application of this,pixel location selection process) is an input to a number of different adders. (Five might be needed for a brute force solution; after minimization three is sufficient.) Another input to each of the adders is an associated error term adjustment constant, of which there is one for each of S, J, SJ/JS, SS and JJ. The various additions proceed simultaneously. The resulting trial error terms are inspected in relation to error term limits. When the Bresenham Algorithm is implemented, these comparisons are simple determinations of sign. Circuitry responsive to the error term inspection indicates which of SS, SJ, JS and JJ produces to the desired path. Corresponding frame buffer operation codes are sent to a frame buffer address controller. Thus pairs of pixel locations are selected in parallel as a unit operation. These may be sent to a set of scan converters that subdivide the screen into collections of tiles. The scan converters operate concurrently, and thus for pairs of pixels the pixel rendering proceeds at approximately twice the rate of serially selecting pixel locations one at a time.

Once the selection is made the error term value for the selected second next pixel location is captured and made to be the error term input for the adders, and the process is ready to select another two pixel locations. If ΔX is an odd number, or if some line patterning is in effect, then a circuit can detect that a final second next (or third next, etc.) position is not needed, and cause it to be suppressed in the corresponding frame buffer operation code. (These vagaries arise when the needed vector ends before an integral number of pixel pairs or line patterns; it is sufficient and perhaps simplest to allow vector generation to continue until all cyclic mechanisms are satisfied, and then simply truncate the resulting string of frame buffer operation codes to be exactly long enough for the desired vector.) The method can also be extended for the simultaneous finding of more than two consecutive next pixel locations as a unit operation.

DESCRIPTION OF A PREFERRED EMBODIMENT

Figure 1:
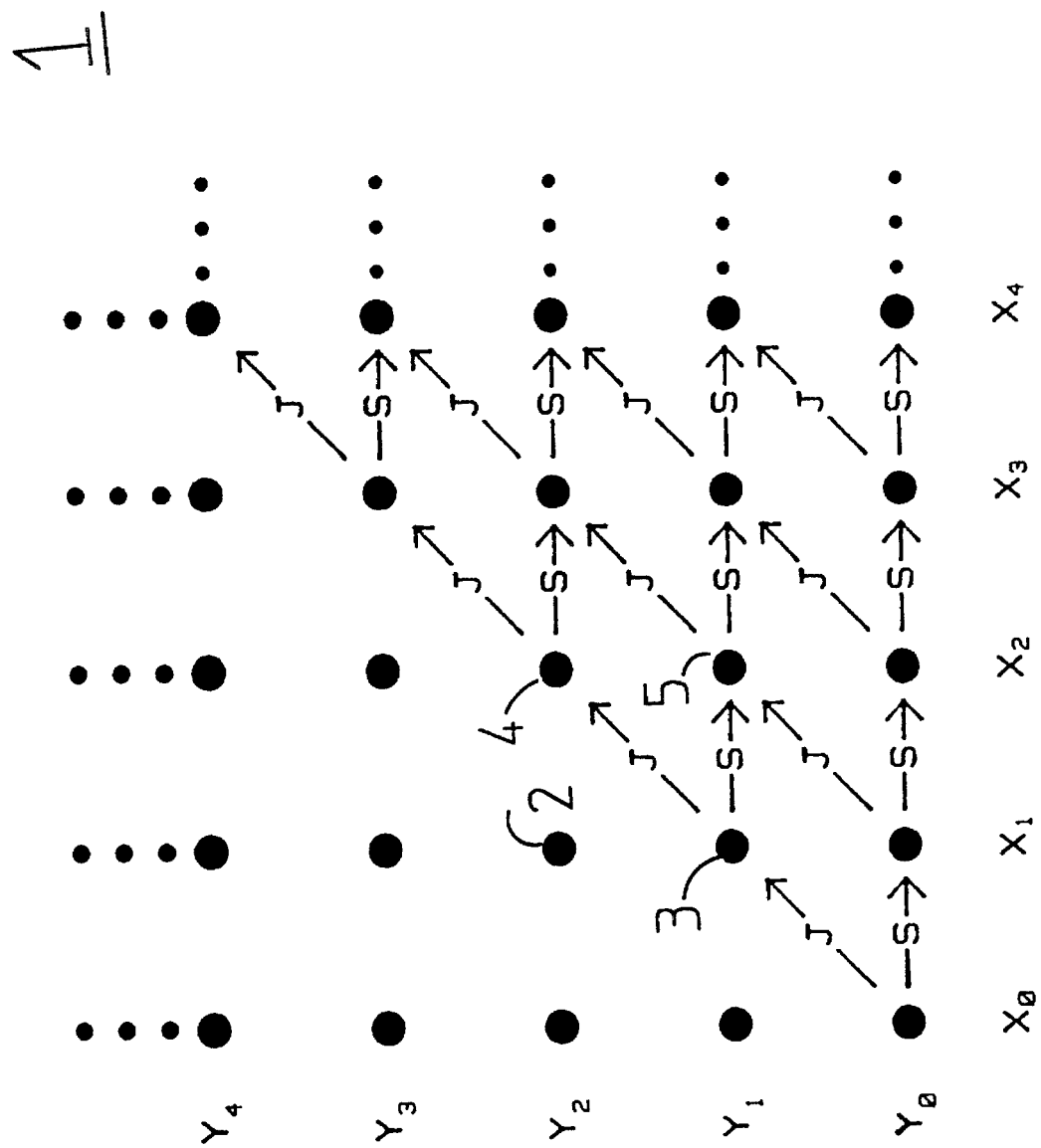
FIG. 1 an array of pixel locations and an illustration of step and jump transitions their may be used to construct any line segment of slope one or less.

We shall begin by illustrating a method by which a plurality of pixels can be simultaneously selected as those that lie along a line connecting two given end points. After the method is understood it will be productive to examine a hardware architecture for rapidly performing such pixel selection according to the method.

The method will be explained with the aid of a series of figures created by a demonstration program written to illustrate certain aspects of how the method works for the various different vectors that may occur. The demonstration program is listed in the Appendix, and will not only re-create the figures included herein, but will also draw (within certain limits) other figures that can facilitate any further investigation that a curious reader may have. Further information concerning the demonstration program is included therewith in the Appendix.

Certain preliminaries are in order. First, it must be pointed out that the various demonstrations and explanations that follow all assume that the vector to be rendered lies in the first half of the first quadrant (i.e., in the first "octant"). It has been shown in the literature, as well as by the operation of earlier systems, that any vector not already in the first octant can be mapped into the first octant by operations involving reflection and symmetry. The vector can then be rendered as if it belonged in the first octant in the first place, and the results mapped back into the octant of the original vector. All of the examples that follow lie within the first octant, and it will be understood that the X axis (abscissa) represents a major axis along which an independent variable is stepped, while Y axis (ordinate) represents the resulting dependent variable. It will be further understood that if an original vector lies outside the first octant, and is then mapped into the first octant, the results obtained must then also be adjusted, in a way that is already known, in order that they may correctly represent that original vector. It will be clear, then, that when we talk of the X and Y axes we are usually referring to the major and minor axes of the vector as is viewed for processing in the first octant, and that these may not be the actual X and Y axes of the displayed vector.

Second, the method will be explained in conjunction with determining which pixels will be selected to represent a line between two given end points. This involves the notion of a pixel grid, which is nothing more than a first quadrant Cartesian coordinate system using strictly integer values. In principle, the pixel grid has a one-to-one mapping onto the physical pixel locations appearing on the graphical output device, say, a CRT or perhaps an LCD array. As a convenience, and without loss of generality, we will consider smaller pixel grids that always start at $(x_0, y_0)$ and that are no bigger in either axis than is necessary to contain a vector of the size that is of interest (i.e., some run in X and some rise in Y, which we term ΔX and ΔY, respectively). This requires the further understanding that this more convenient vector's coordinates may be later translated back to an original location within the actual pixel grid.

FIG. 1 illustrates such a pixel grid 1 of convenience. It starts at $(x_0, y_0)$ and continues in each axis for only as long as needed to contain the first octant vector of interest. The various pixel locations are the possible Cartesian" coordinates, and these are indicated by the heavy dots (2–5). Since the rendering is quantized to the pixel level, there is nothing between pixels, and the operation of drawing a line is reduced to moving in X a pixel at a time and inquiring if this next coordinate location has the old Y value or one plus the old Y value. These possible pixel-to-pixel location changes are referred to herein as a "step" and as a "jump", respectively. So, for example, a transition from pixel location 3 $(x_1, y_1)$ to pixel location 5 $(x_2, y_1$ is a step and is denoted by an "S". The transition from pixel location 3 to pixel location 4 $(x_2, y_2)$ is a jump that is denoted by a "J".

Clearly, if we are given the end points of a vector we can describe the intervening pixels of the connecting straight line as a series of steps and jumps. What is more, we can construct the line by implementing the corresponding series of jump and step operations once the translation to the actual start location has been accomplished. Just what these operations are may depend upon the nature of the graphic output device. In the case of an actual mechanical plotter the jump and step operations could cause incremental movement of a pen. In the case of CRT those operations could instead be the writing of intensity information into consecutively adjacent locations in a frame buffer.

Figure 2:
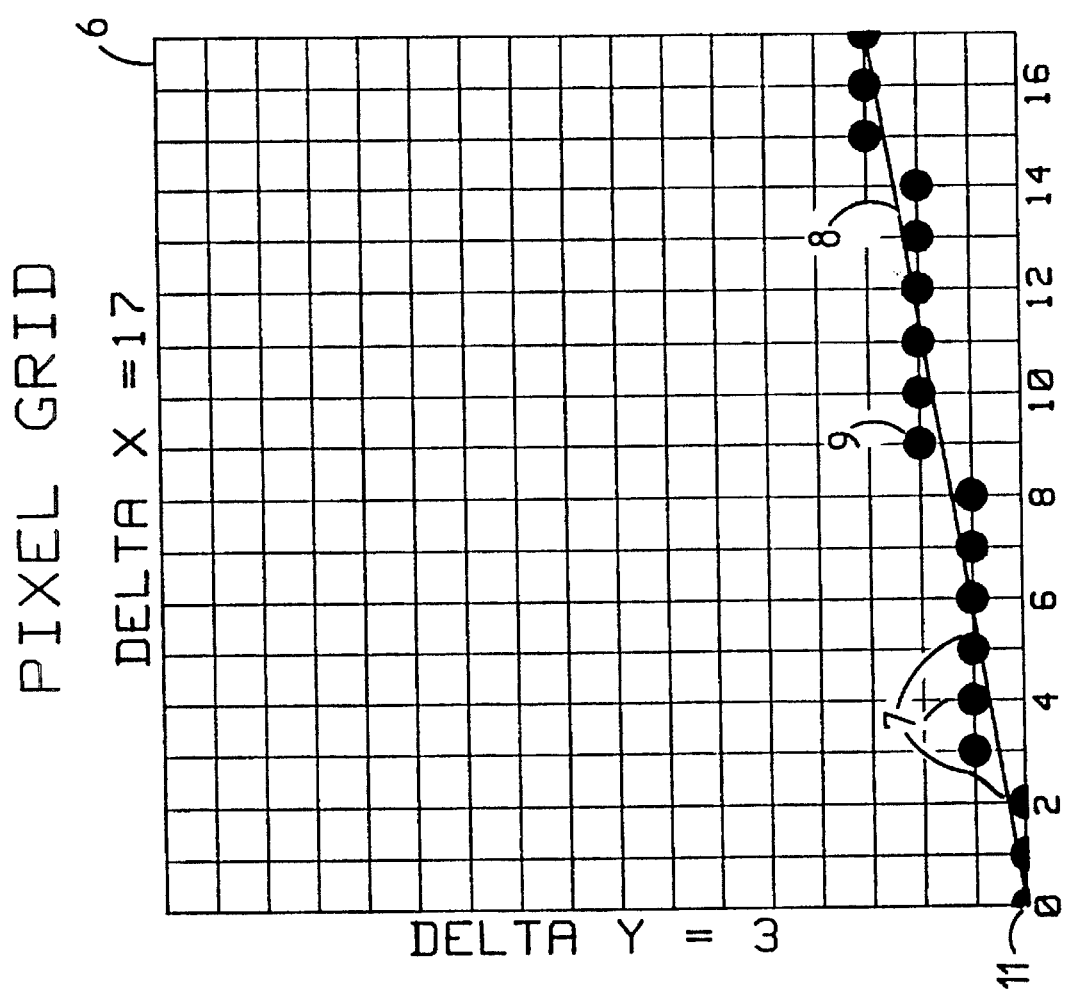
FIG. 2 is a pixel grid having pixels selected to represent a line segment that is described by a ΔX=17 and a ΔY=3.

Now consider the example vector shown in FIG. 2. In this example the vector to be drawn has a ΔX=17 and a ΔY=3. The heavy black dots 7 indicate which pixels on the associated pixel grid 6 are (according to Bresenham) to be illuminated to represent the line connecting the end points. Also shown is an ideal line 8 (described by the equation y=3/17x) interconnecting end points of the vector. This line 8 is included principally for reference, since most of it does not lie on permissible pixel locations. The line 8 is useful in appreciating how pixel positions are selected for illumination, however. Consider illuminated pixel 9, which is at pixel position (9, 2). The line 8 does not pass through pixel position (9, 2), but pixel position (9, 2) is closer to the line 8 than either of pixel positions (9, 1) or (9, 3).

Figure 3:
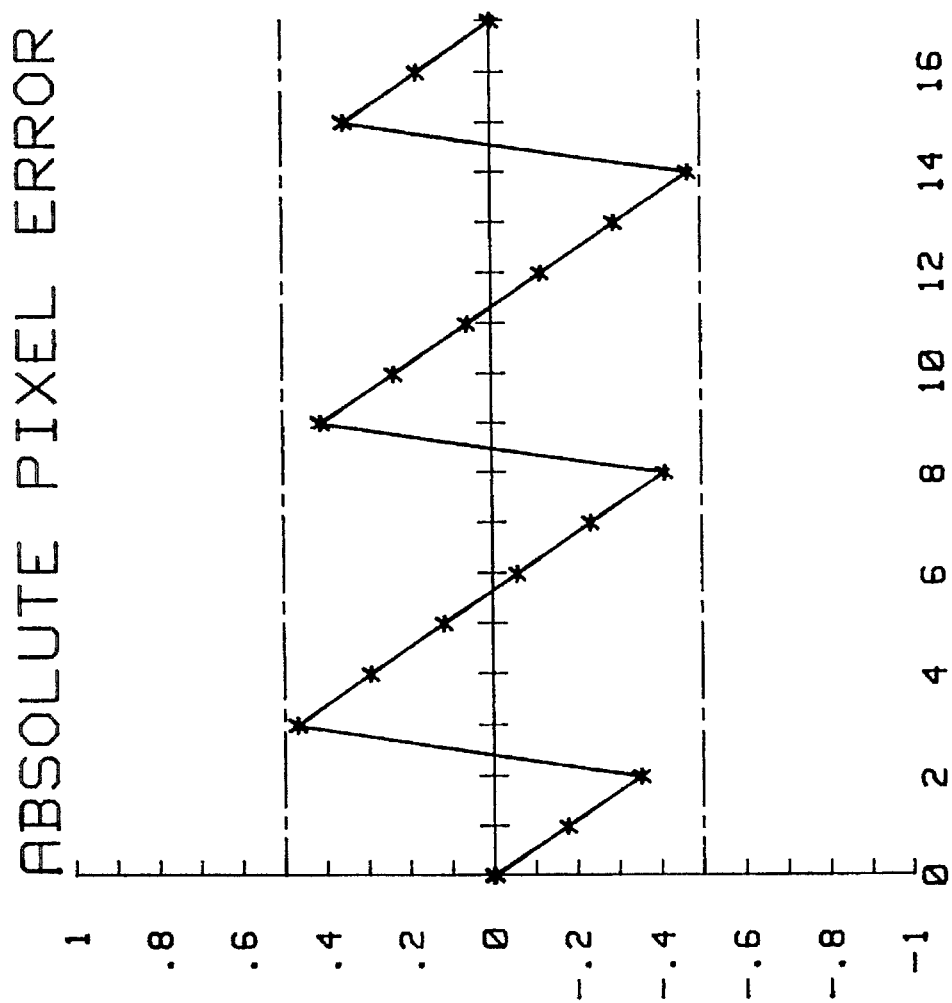
FIG. 3 is a graph of the absolute pixel error of the pixels for the line segment of FIG. 2.

The notion of how dose the illuminated pixels are to the ideal line 8 can be described as an "error term". FIG. 3 is a graph of the error term for the vector of FIG. 2. It is labelled as showing "absolute pixel error", since the ordinate of the graph is in the units of pixel position used in FIG. 2 (i.e., pixel positions that are one location apart). The absolute pixel error never exceeds one half of a pixel position, for if it did, then another pixel position would be closer to the ideal line 8.

We are now in a position to describe the general sort of activity that is used to plot the desired vector on the pixel grid. Assume that the plotting proceeds from left to right, and recall that a slope of less than or equal to one has been imposed on the vector. So, location (0, 0) is illuminated. We know that the next abscissa is one, and that the ordinate will be either zero or one (a step or a jump, respectively). Because the end points of the vector are known, the equation of the ideal line is also known. It is then possible to evaluate the equation of the ideal line for x=1, thus determining the ideal ordinate. The selected ordinate will be whichever one of zero and one that is closer to,the ideal value. That is, whichever one produces the smaller error term when differenced with the ideal value. Whatever plots the pixel positions engages in this general sort of activity. To reduce computation time the slope is found, and an incrementing loop is formed that increments by the slope and is conditioned upon a comparison of the absolute value of the resulting (absolute) error term with one half. The Digital Differential Analyzer (DDA) is an example of this sort of thing.

Figure 4:
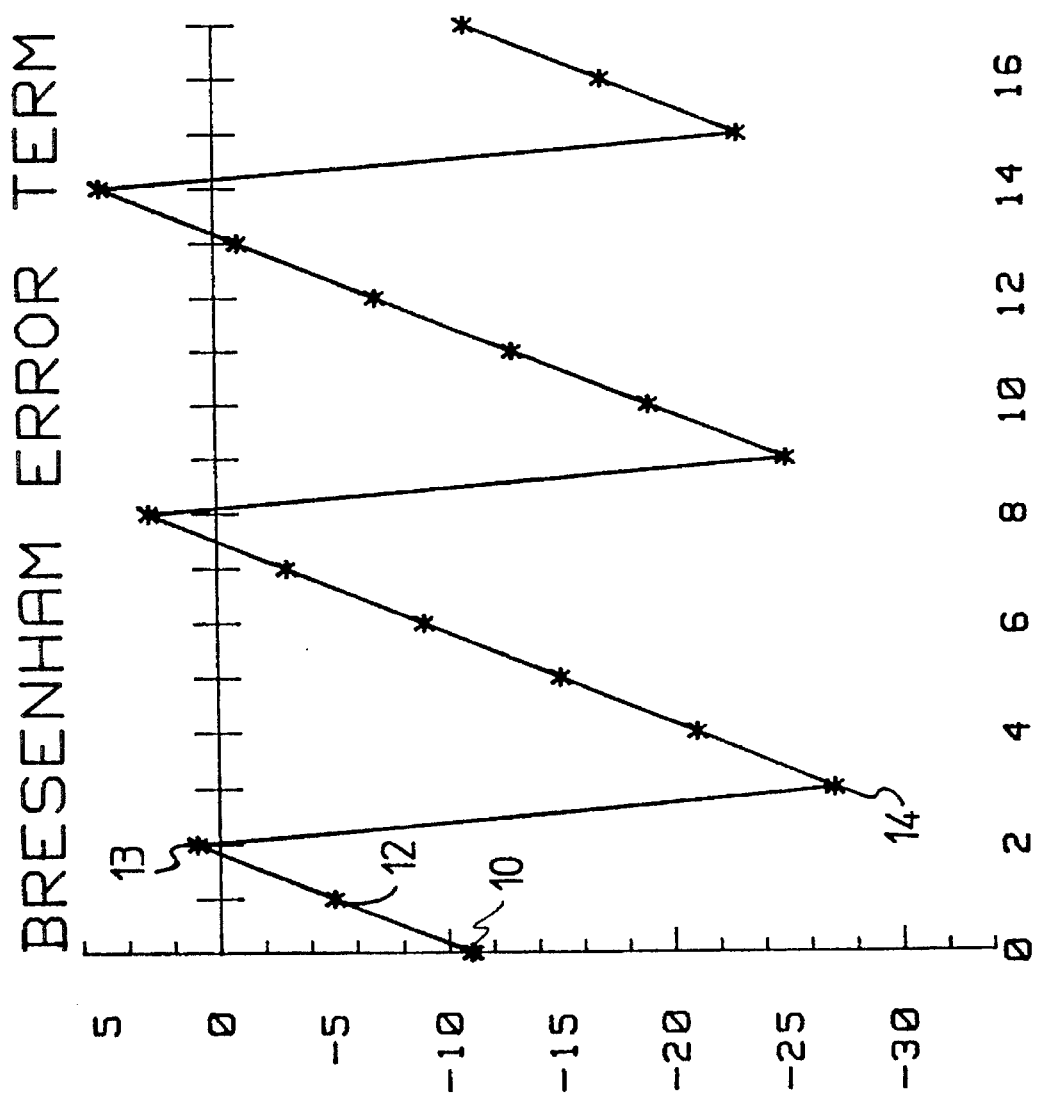
FIG. 4 is a graph of the Bresenham error term of the pixels for the line segment of FIG. 2.

The Bresenham algorithm is an enhancement of this general ideal. In Bresenham the slope is scaled and the error term offset so as to eliminate floating point divides and make the error term event of interest be a simple sign check. FIG. 4 shows the Bresenham error term for the vector of FIG. 2. Observe that in FIG. 4 the error term goes positive three times: at pixel locations x=2, x=8 and x=14. Further observe in FIG. 2 that the transitions from x=2, x=8 and x=14 are each jumps, while all the others are steps. Thus, in the Bresenham algorithm, a positive error term indicates that the next transition should be a jump; otherwise it is a step.

Whether the DDA, Bresenham or some other variant on this idea is used, certain vector-dependent constants are pre-computed for use in the plotting loop. These include an initial value for an error term (so called in Bresenham, owing to the way it is derived) or for a "control term" (for the DDA) whose function is similar, but is probably not an "error". Also included in the list of pre-computed constants are a routine increment representing the slope (and corresponding to a step) and also a reset decrement (corresponding to a jump) that is applied when the limits are exceeded for the error/control term. In conjunction with each iteration around the plotting loop the state of the error/control term relative to certain limits determines whether to indicate a jump or a step. It is important to appreciate that these adjustment constants are findable in advance, and that when executed with accumulators in hardware, the operations of a trial increment and a trial decrement can proceed simultaneously. Assuming ow that Bresenham is in use, after those operations are complete, the resulting "trial error terms" are checked and the contents of the appropriate accumulator (the selected ("next") error term) is gated out onto a bus and fed back to the accumulators as the starting point for the next pass through the loop. The unselected trial error term is thrown away. Meanwhile, the sign of the selected error term is output as the jump/step indicator. During this conventional process the pre-computed constants reside in registers connected appropriately to the accumulators.

It may be well to dwell on this conventional process just a little longer and observe how, for the vector of FIG. 2, it produces the plot shown in FIG. 4. At the beginning of the vector, an initialization process determines the starting value for the error term. This is the negative ordinate value shown by reference character 10 in FIG. 4. This initial error term value corresponds to pixel 11 in FIG. 2, which is in the lower left-hand corner of the pixel grid 6 at location (0, 0). Also computed during initialization are the error term increment, which is the (step) increase in ordinate value from point 10 (in FIG. 4) to point 12 (and also the same as from point 12 to point 13), and the (jump) error term decrement for the negative change in ordinate value from point 13 to point 14.

The desired vector is obtained by then testing the error term to see if it is positive. If it is not, then a step is indicated and the error term is replaced by the sum of itself and the error term increment. This produces point 12 in FIG. 4 and the pixel at location (1, 0) in FIG. 2. In a high-speed hardware implementation the result of subtracting the error term decrement from the error term (in anticipation of a jump) would also have been formed simultaneously, but not used subsequent to the determination that the starting value for the error term was not yet positive. This process is repeated exactly as described above for the transition from point 12 to point 13, which produces the step from location (1, 0) to location (2, 0). Upon a third application of the loop, however, the error term is already positive, so the result of the decrement is selected to produce the new (and again negative) error term (point 14), and a jump is indicated. Thus fat the (partial) set of indications to the mechanism controlling the flow of information into the frame buffer is S-S-J, for step-step-jump. This conventional process continues as described until the end of the vector is reached. For the situation shown in FIG. 2 the final set of indications for rendering the vector is S-S-J-S-S-S-S-S-J-S-S-S-S-S-J-S-S.

Now suppose that the computing hardware already runs at the fastest practical clock rate, but that we are prepared to deploy considerably more computing hardware. How might the desired sequence of steps and jumps be obtained in, say about one half the time that is required for the conventional process just described above?

Figure 5:
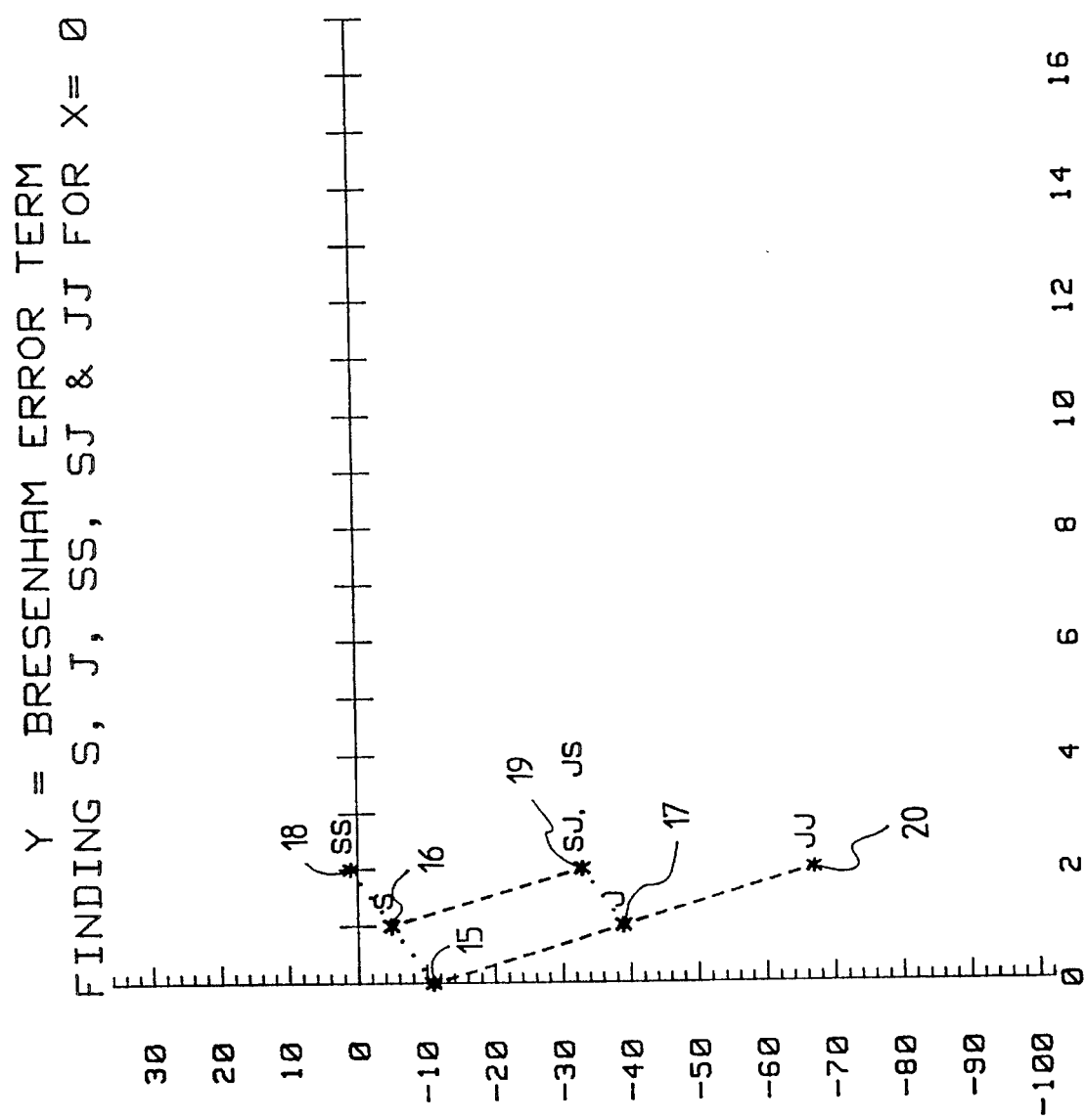
FIG. 5 is a plot of Bresenham error terms corresponding to the five trial next locations for the transitions S, J, SS, JJ and SJ/JS from the starting location at X=0 in FIG. 2.

With an appreciation of FIG. 4, consider now the process illustrated by FIG. 5. The process begins at a point 15 along the ordinate axis. This point 15 corresponds to the pixel 11 in FIG. 2, and the negative value of the ordinate of point 15 is the actual initial Bresenham error term for the line segment of FIG. 2. Since that value is not positive, the next pixel in FIG. 2 is produced by a step. That is indeed what FIG. 2 shows; the location of the next pixel is (1, 0). The ordinate of point 16 (a step S relative to point 15) may be found by adding the error term increment to the initial value of the error term. Simultaneously, the ordinate of point 17 (a jump J relative to point 15) could be found by subtracting the error term decrement from the initial error term. However, since it can be determined by inspection of the initial error term that the first operation is S, there really is no need to compute the error term for doing a J, although we could if we wanted to. Furthermore, we needn't wait until that first next pixel is determined to determine the second next pixel. Simultaneous with the trial calculations for the first next pixel location, we can perform trial calculations for the second next pixel locations, represented by points 18, 19 and 20.

Consider point 18. It represents a step-step relative to point 15. Its trial error term (and thus its sign) may be found by adding to the initial error term a constant that equals twice the error term increment. Point 20 represents a jump-jump relative to point 15. Its error term and sign are found by diminishing the initial error term by a constant that equals twice the error term decrement.

It will be noted that in our example the first operation is S, so it is known that JJ will not obtain. Thus, just as the trial error term for point 17 need not be found, the trial error term for point 20 need not be found, either. When the explanation of FIG. 55 is reached it will be clear that it is not necessary to incur a time penalty to suppress the unneeded results, nor is it necessary during such suppression, to condition the finding of "second operation results" upon a prior selection of "first operation results".

Point 19 represents, relative to point 15, both a step-jump and a jump-step. While these are two different paths to the same point, the value of the error term at point 19 need be computed only once, as if there were only one path. (The value of the error term at point 15 determines which path to take to get to point 19.) So, consider a step-jump. The initial error term would be incremented by a constant that equals the error term increment diminished by the error term decrement.

Thus, we find not two trial error term outcomes as in conventional processes, but three (five minus the two that are not possible). The three are for the locations corresponding to S, SS, and either SJ or JS, or, to J, JJ and either SJ or JS. Once these trial error term results have been found by associated accumulators operating simultaneously and in conjunction with registers holding five associated error term adjusting constants, selection logic can, as a single unit operation, determine the two correct next pixel locations and output the associated frame buffer operation codes, and identify the next initial error term. In the present example those codes would be S, S. As part of completing the loop, ordinate value for point 18 replaces the original initial error term, whereupon the loop is ready to run again.

The frame buffer operation codes are determined by an inspection of the signs of the initial and trial error terms that are produced by the process described above.

Figure 6:
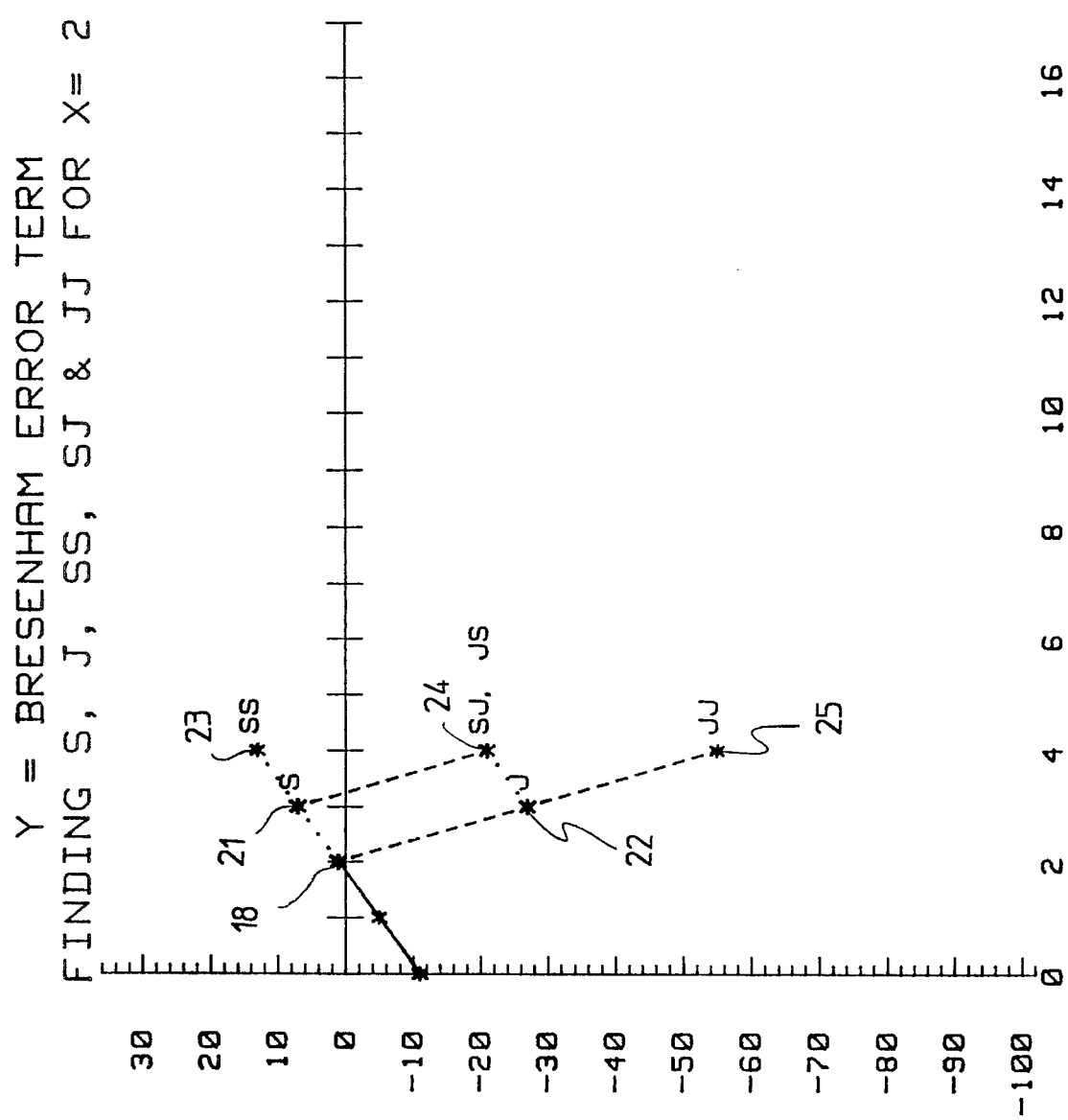
FIG. 6 is a plot of Bresenham error terms corresponding to the five trial next locations for the transition S, J, SS, JJ and SJ/JS from the starting location at X=2 in FIG. 2.

The second pass through the loop of this method may be understood with reference to FIG. 6. Therein, point 18 is the same point 18 in FIG. 5 that represented SS, and is thus the starting point for finding another pair of pixel locations. Now the value of the current error term is the ordinate of point 18. As before, we find the three trial error terms for (all relative to point 18, now) either S, SS, and SJ/JS, or J, JJ and SJ/JS. This is done just as explained above. By inspection of the figure we can clearly see that what ought to be selected are point 22 (J) and point 24 (SJ/JS). The selection logic can indeed make this same choice (frame buffer operation codes J, S), based upon the information available to it. That information includes the fact that the sign of the error term started out at point 18 as positive (first next pixel form by a jump) and that the sign of the error term after that first jump (at point 22) is negative. (That means the slope of the line is small enough that one jump was "enough" to guarantee that the next operation would be a step. Compare this to examples shown later where the slope of the line is closer to one and consecutive jumps are needed.)

As a final example concerning this same line segment, consider yet the next application of a loop using this method. With reference now to FIG. 7, point 24 is again the same as point 24 in FIG. 6 (the terminal end of the JS started at point 18). Once again the three out of five trial new error terms are computed, using the same constants as above. By inspection of the graph we can see that what is required is two consecutive steps (S, S). The sign of point 24 is negative, which rules point 25 in and rules points 26 and 29 out. That the error term for point 25 is negative rules out point 28 in favor of point 27. Thus the instruction sequence sent to the frame buffer controller is S, S.

Thus, to this point the frame buffer operation codes have been S, S, J, S, S, S. These are indeed the first six characters of the desired sequence for the entire line segment. Continued application of the method will correctly produce the remaining operation codes.

Figure 7:
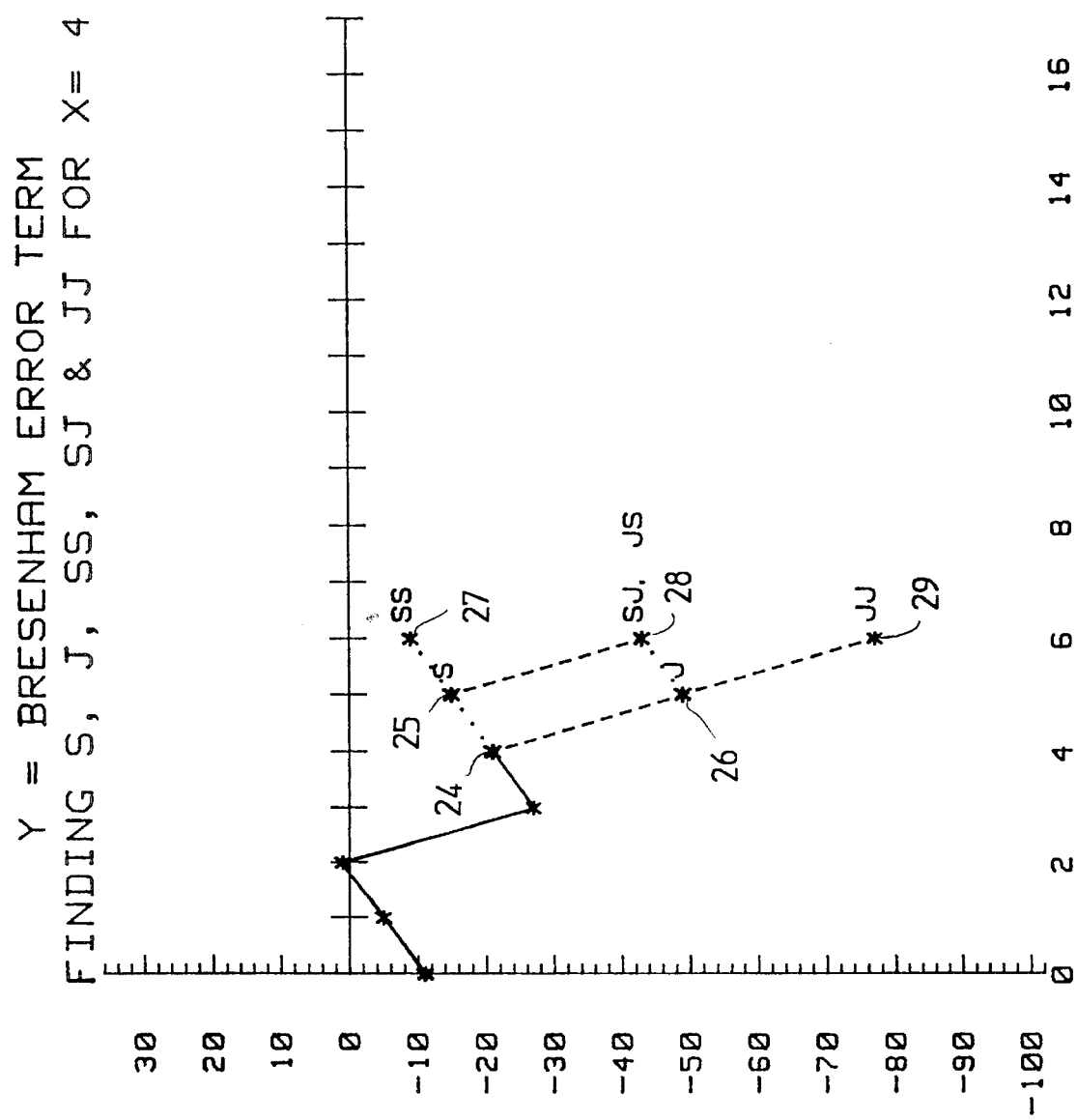
FIG. 7 is a plot of Bresenham error terms corresponding to the five trial next locations for the transitions S, J, SS, JJ and SJ/JS from the starting location at X=4 in FIG. 2.
Figure 8:
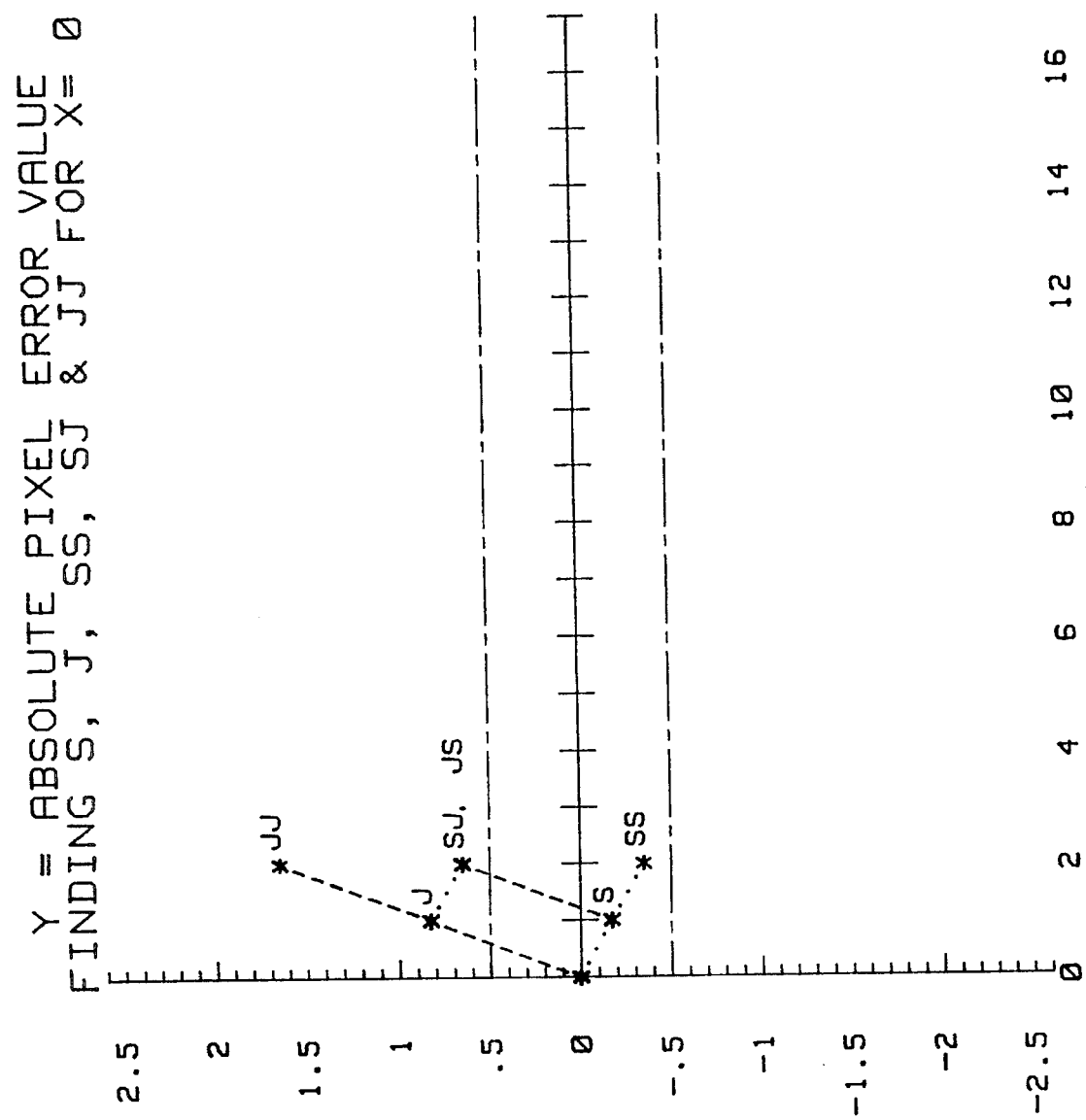
FIG. 8 is a plot of absolute error terms corresponding to the five trial next locations for the transitions S, J, SS, JJ and SJ/JS from the starting location at X=0 in FIG. 2.
Figure 9:
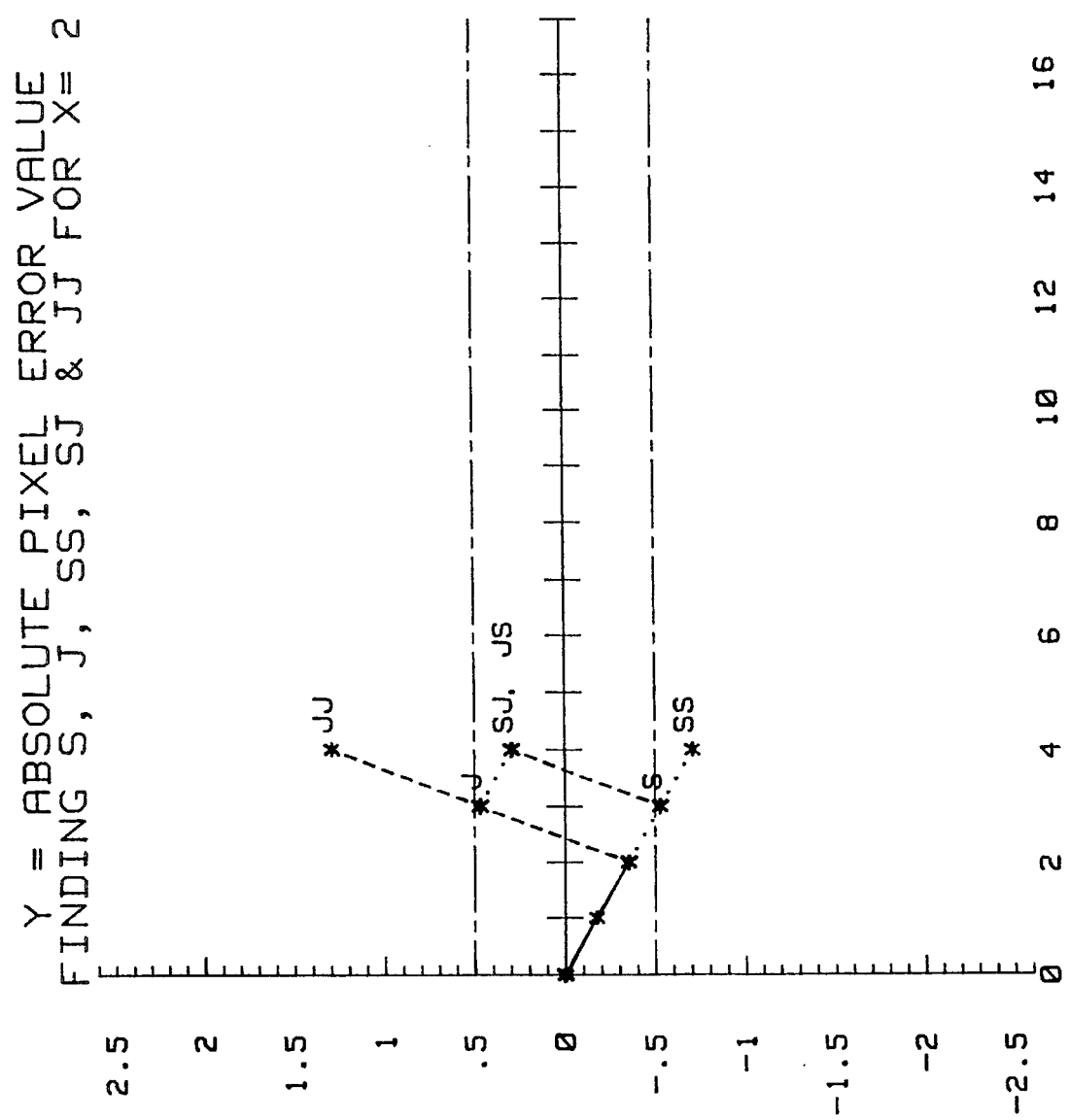
FIG. 9 is a plot of absolute error terms corresponding to the five trial next locations for the transitions S, J, SS, JJ and SJ/JS from the starting location at X=2 in FIG. 2.
Figure 10:
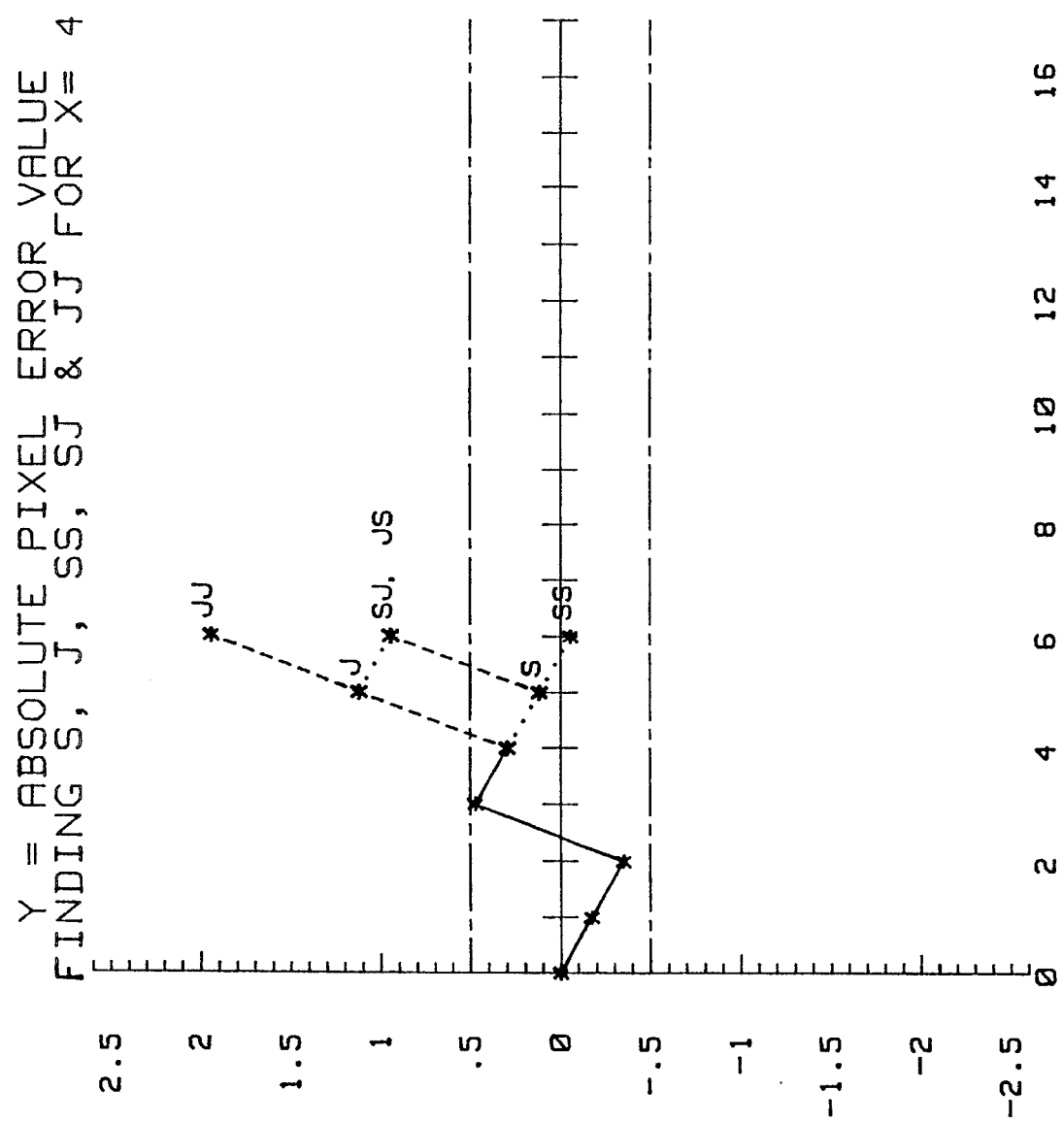
FIG. 10 is a plot of absolute error terms corresponding to the five trial next locations for the transitions S, J, SS, JJ and SJ/JS from the starting location at X=4 in FIG. 2.

FIGS. 8, 9 and 10 have been included to illustrate the same examples as do FIGS. 5, 6 and 7, except that an absolute pixel error is used in place of the Bresenham error term. The explanation of how to traverse the data presented by the figure is slightly different than for Bresenham, but only in a minor way. First, whereas Bresenham provides a error term whose sign is indicative of the next operation (S or J), the absolute error term of FIG. 9 needs to be checked to see if its value lies outside of an acceptable range. Clearly, this is not as simple as the mere checking of a sign bit. Furthermore, as arranged for presentation in these figures, the error term at, say, X=3 does not convey definitive information about which way to get to X=4. Nevertheless, there is strategy that works, provided that the necessary comparisons can be performed. That strategy is to compute the five trial outcomes. One of those is for S and one is for J. In general, only one will meet the comparison. This identifies the next frame buffer operation. To identify the one after that the other three trial outcomes are each tested to see if their values lies within the acceptable range. All five tests are performed at the same time. Combinatorial logic selects the second frame buffer operation as function of the first and the outcomes of testing the three trial error terms for SS, JJ and SJ/JS.

Figure 11:
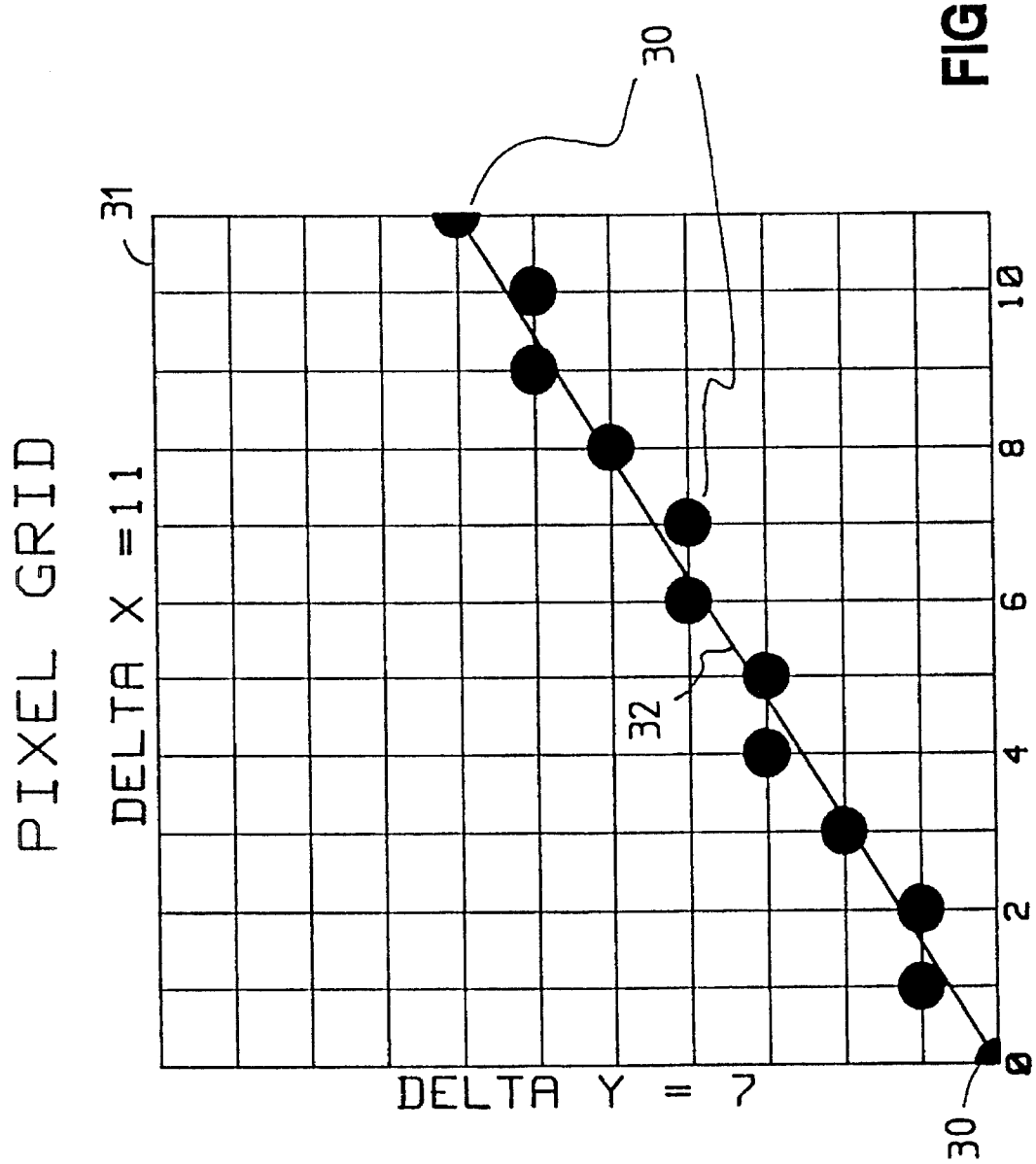
FIG. 11 is a pixel grid having pixels selected to represent a line segment that is described by a ΔX=11 and a ΔY=7.
Figure 12:
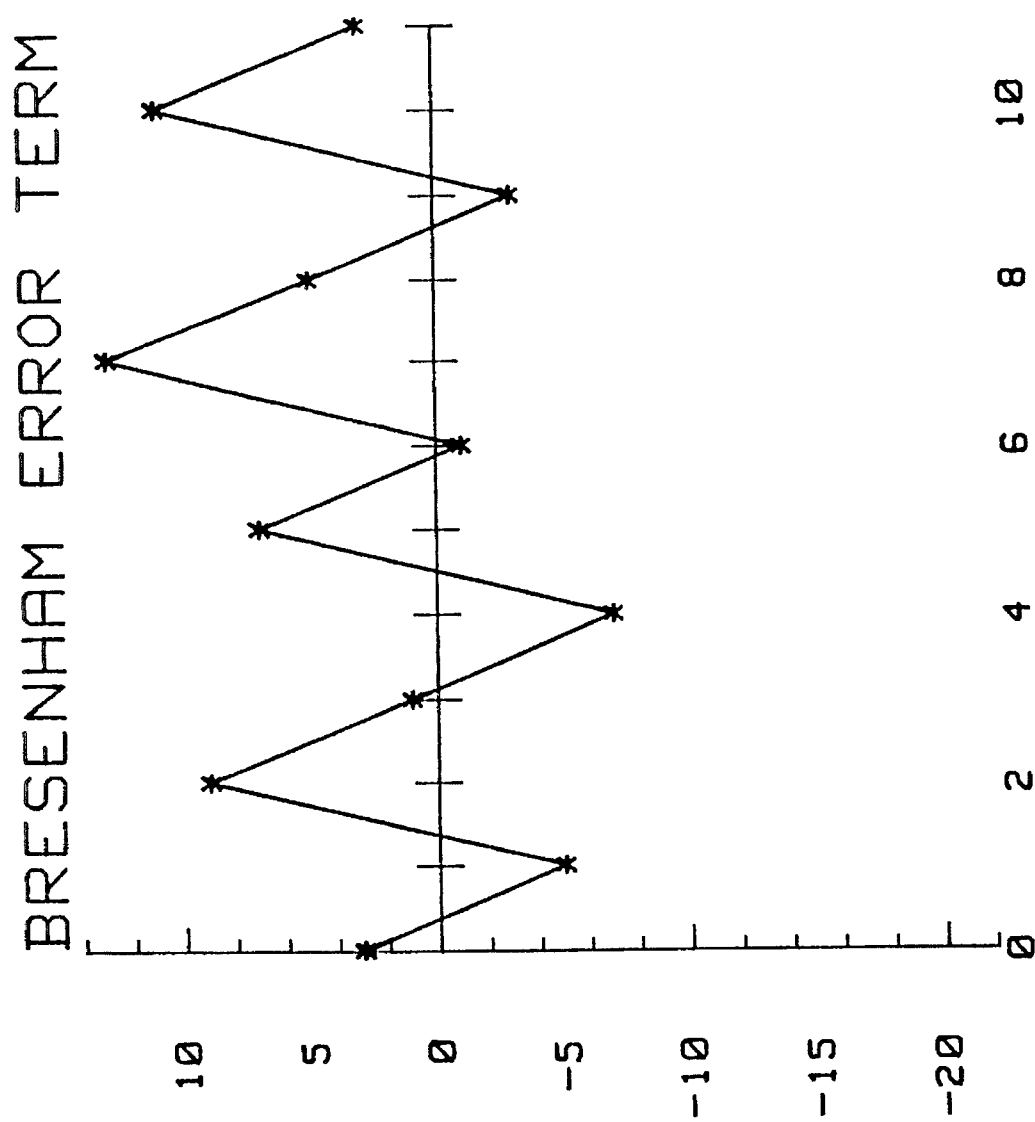
FIG. 12 is a graph of the Bresenham error term of the pixels for the line segment of FIG. 11.
Figure 13:
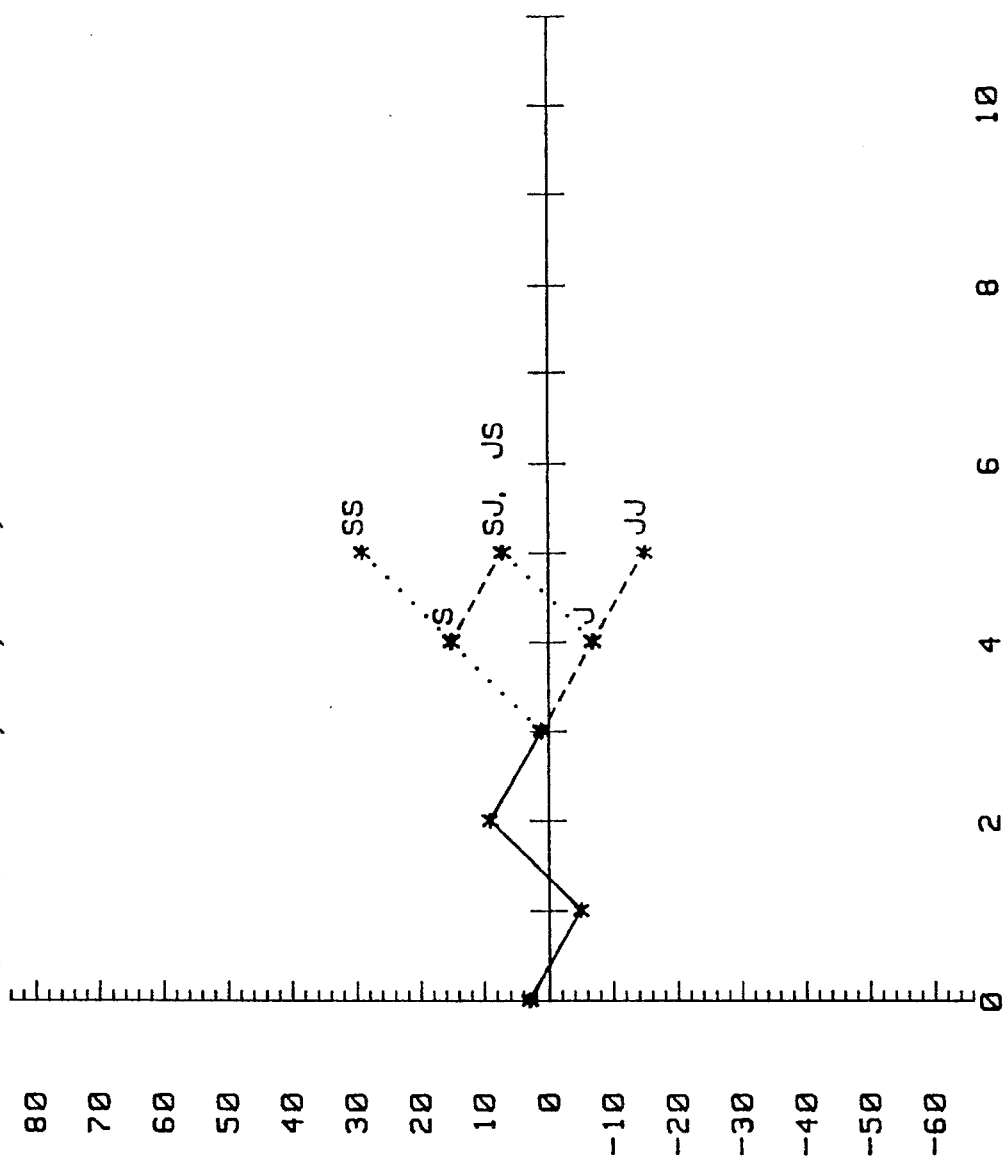
FIG. 13 is a plot of Bresenham error terms corresponding to the five trial next locations for the transitions S, J, SS, JJ and SJ/JS from the starting location at X=3 in FIG. 11.
Figure 14:
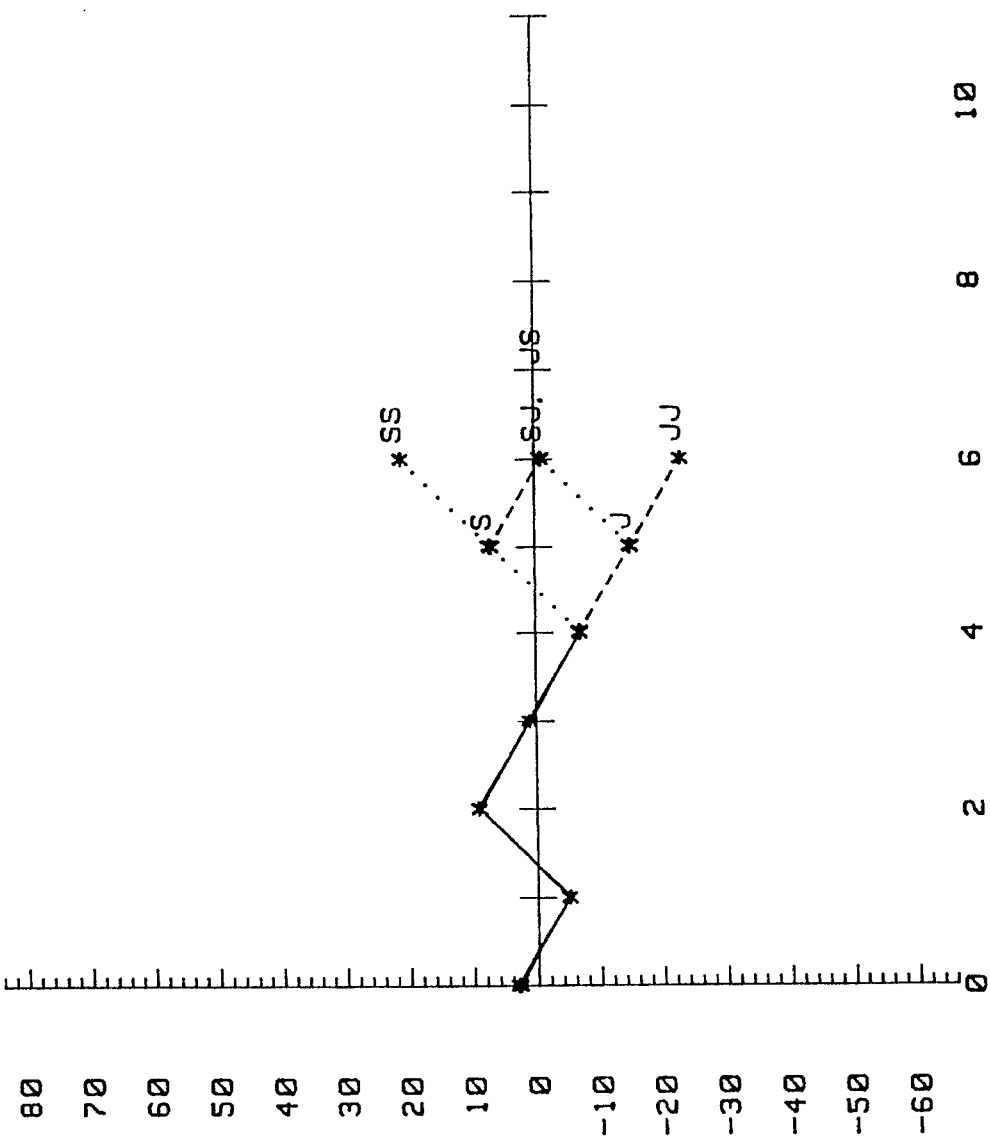
FIG. 14 is a plot of Bresenham error terms corresponding to the five trial next locations for the transitions S, J, SS, JJ and SJ/JS from the starting location at X=4 in FIG. 11.
Figure 15:
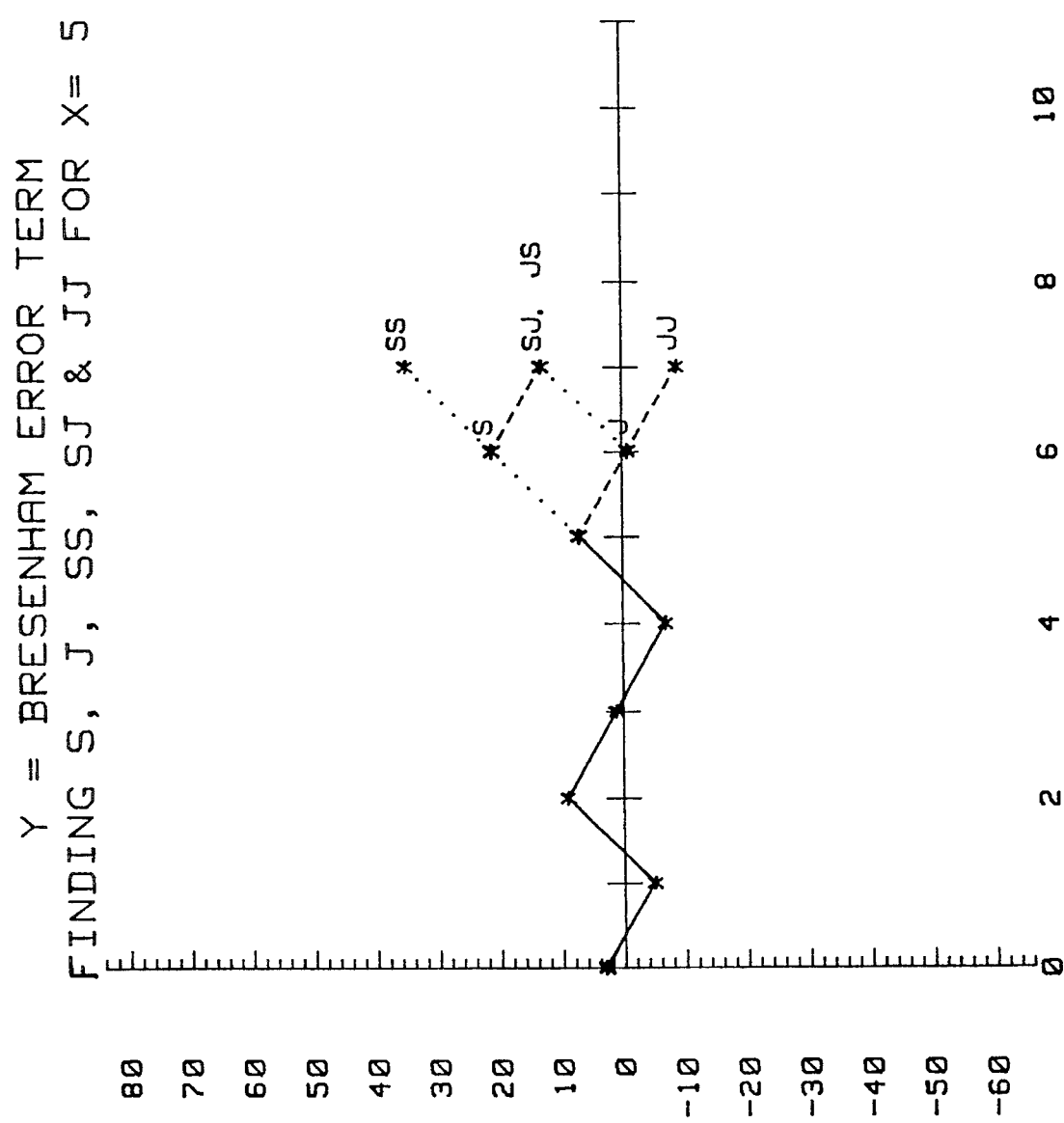
FIG. 15 is a plot of Bresenham error terms corresponding to the five trial next locations for the transitions S, J, SS, JJ and SJ/JS from the staring location at X=5 in FIG. 11.
Figure 16:
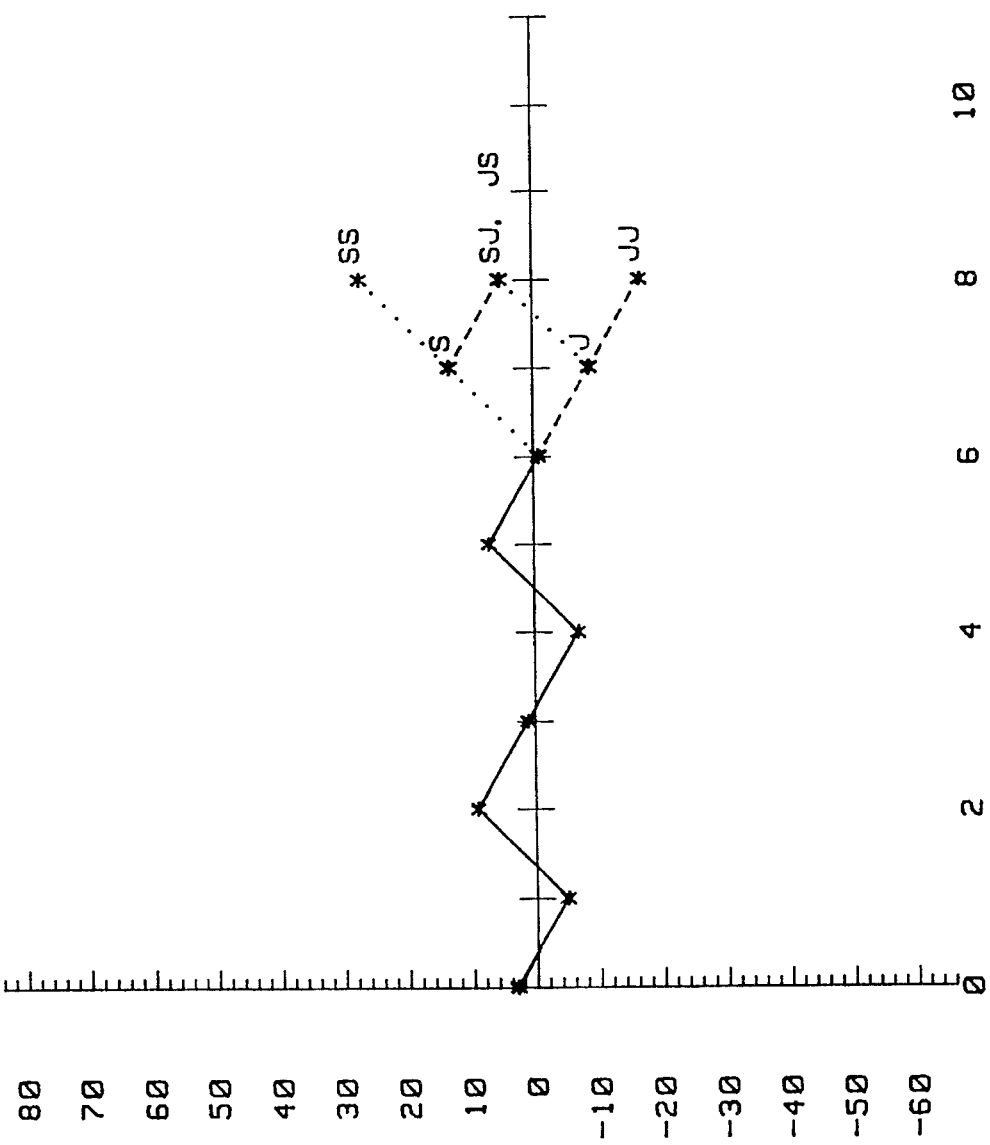
FIG. 16 is a plot of Bresenham error terms corresponding to the five trial next locations for the transitions S, J, SS, JJ and SJ/JS from the staring location at X=5 in FIG. 11.
Figure 17:
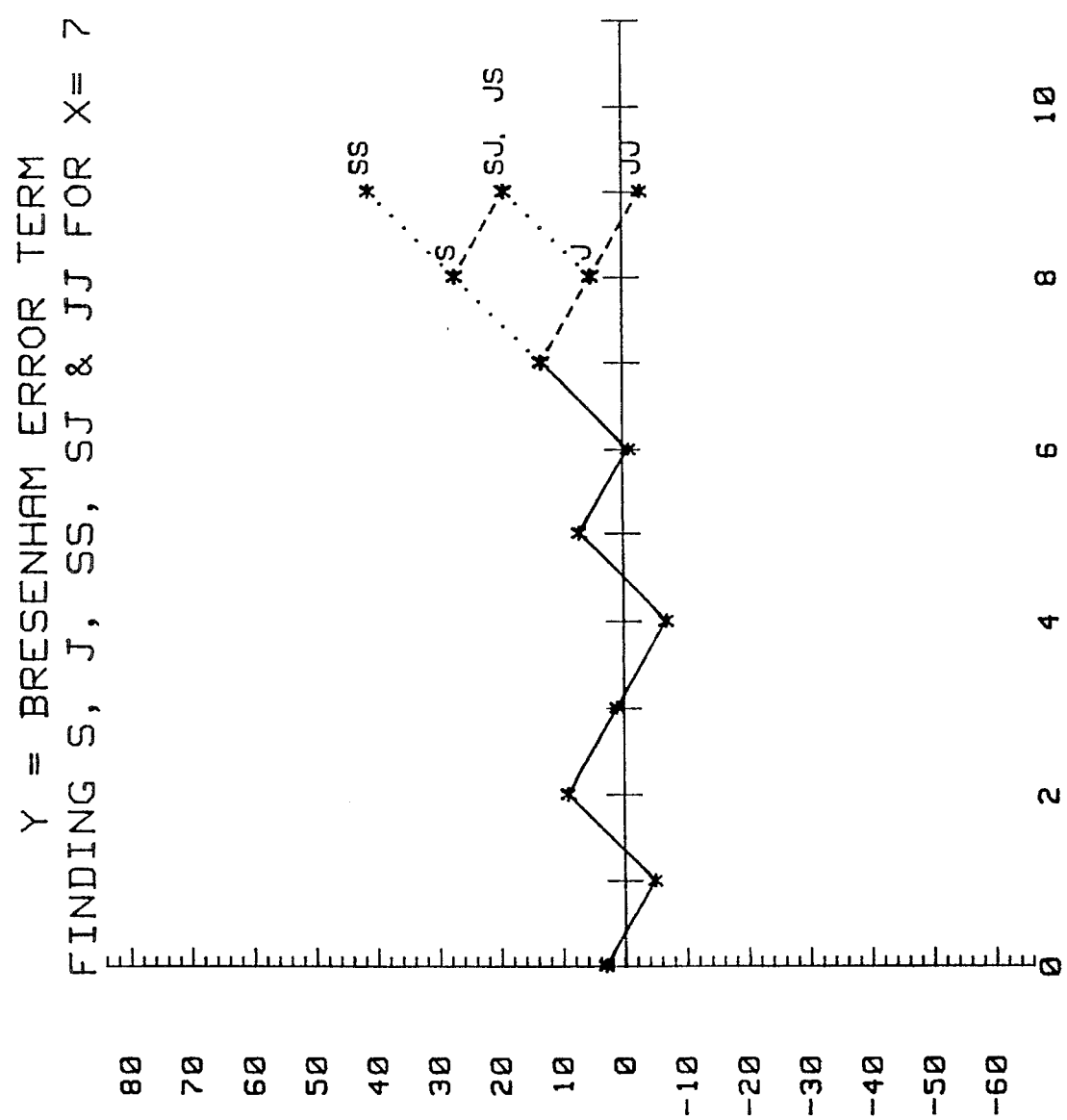
FIG. 17 is a plot of Bresenham error terms corresponding to the five trial next locations for the transitions S, J, SS, JJ and SJ/JS from the staring location at X=7 in FIG. 11.
Figure 18:
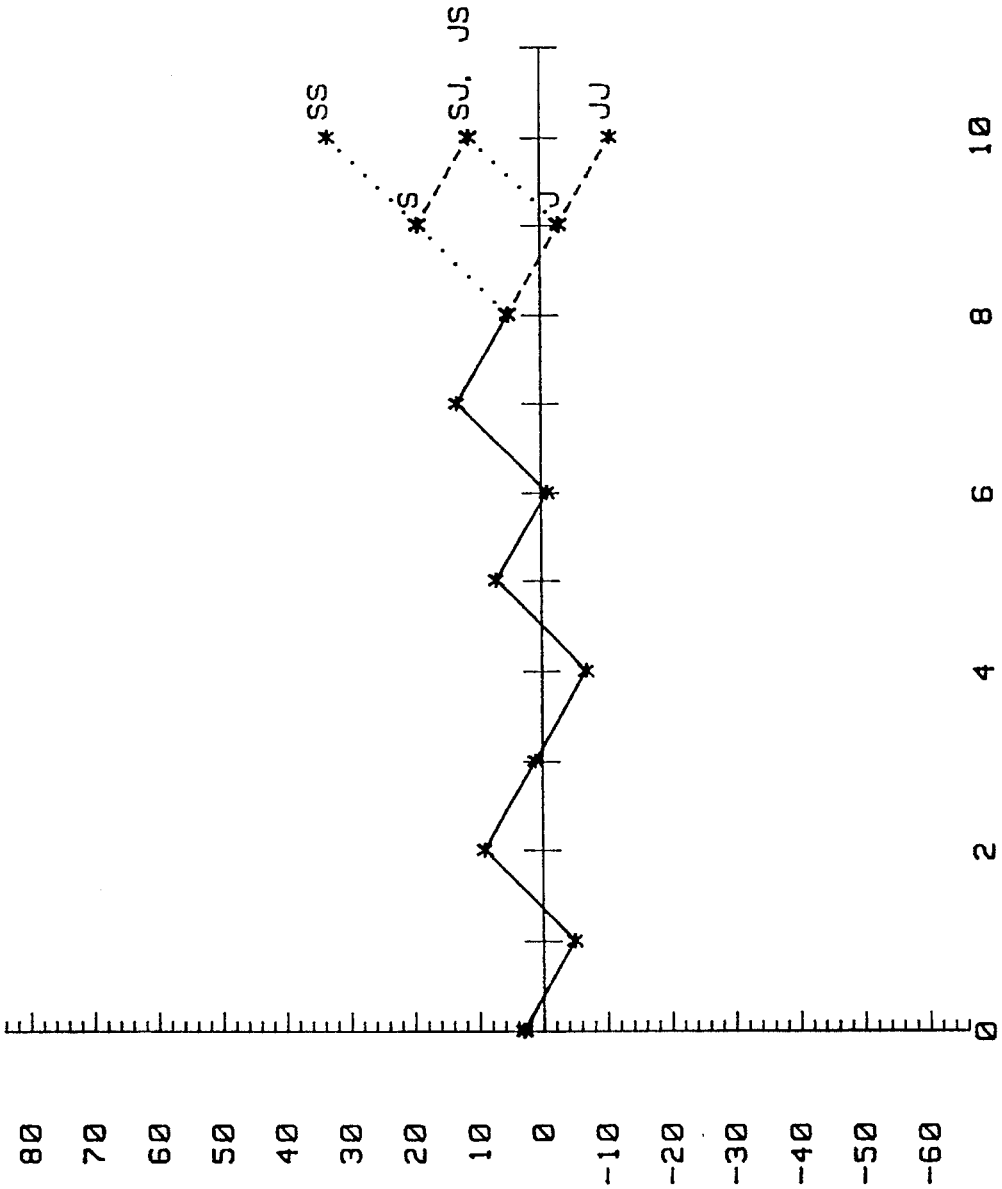
FIG. 18 is a plot of Bresenham error terms corresponding to the five trial next locations for the transitions S, J, SS, JJ and SJ/JS from the staring location at X=8 in FIG. 11.
Figure 19:
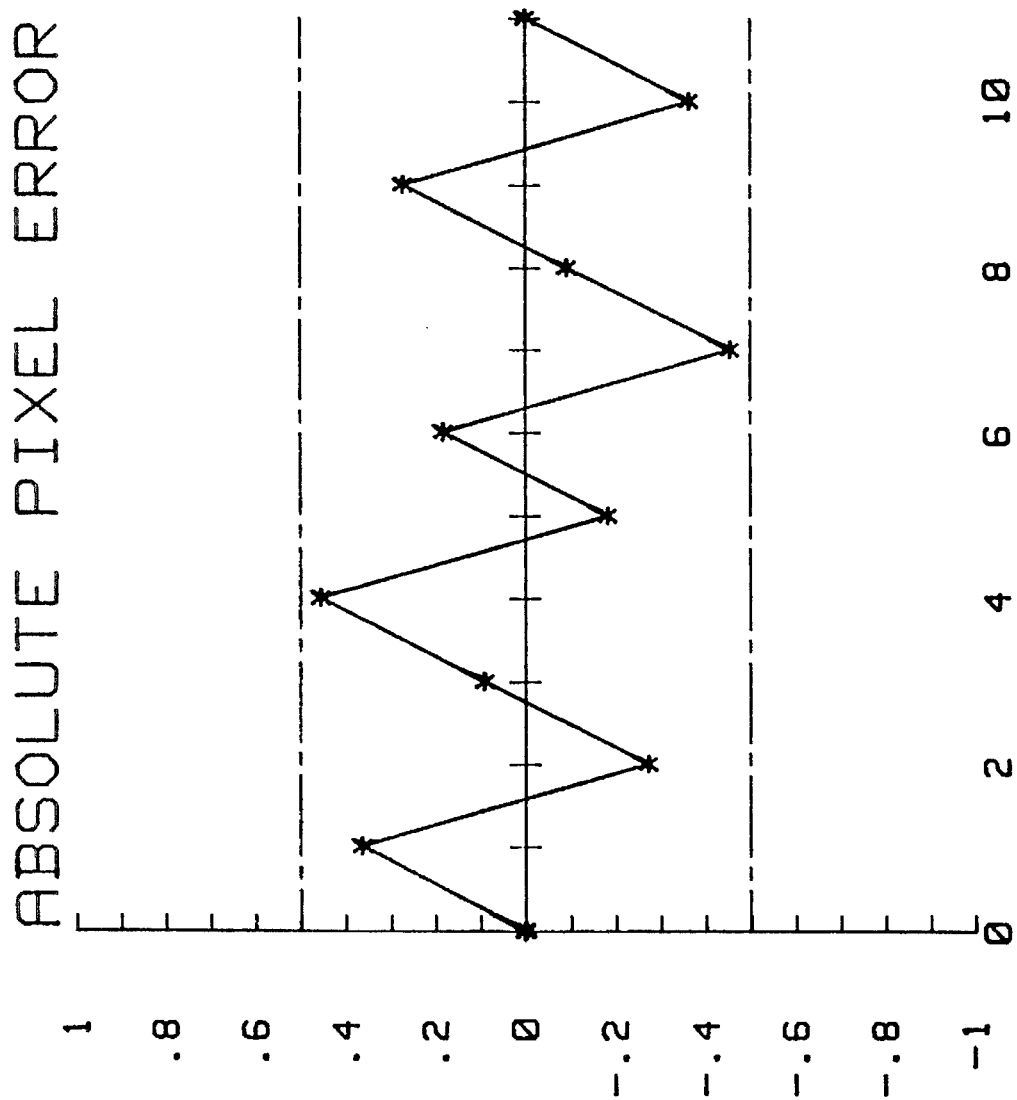
FIG. 19 is a graph of the absolute pixel error of the pixels for the line segment of FIG. 11.
Figure 20:
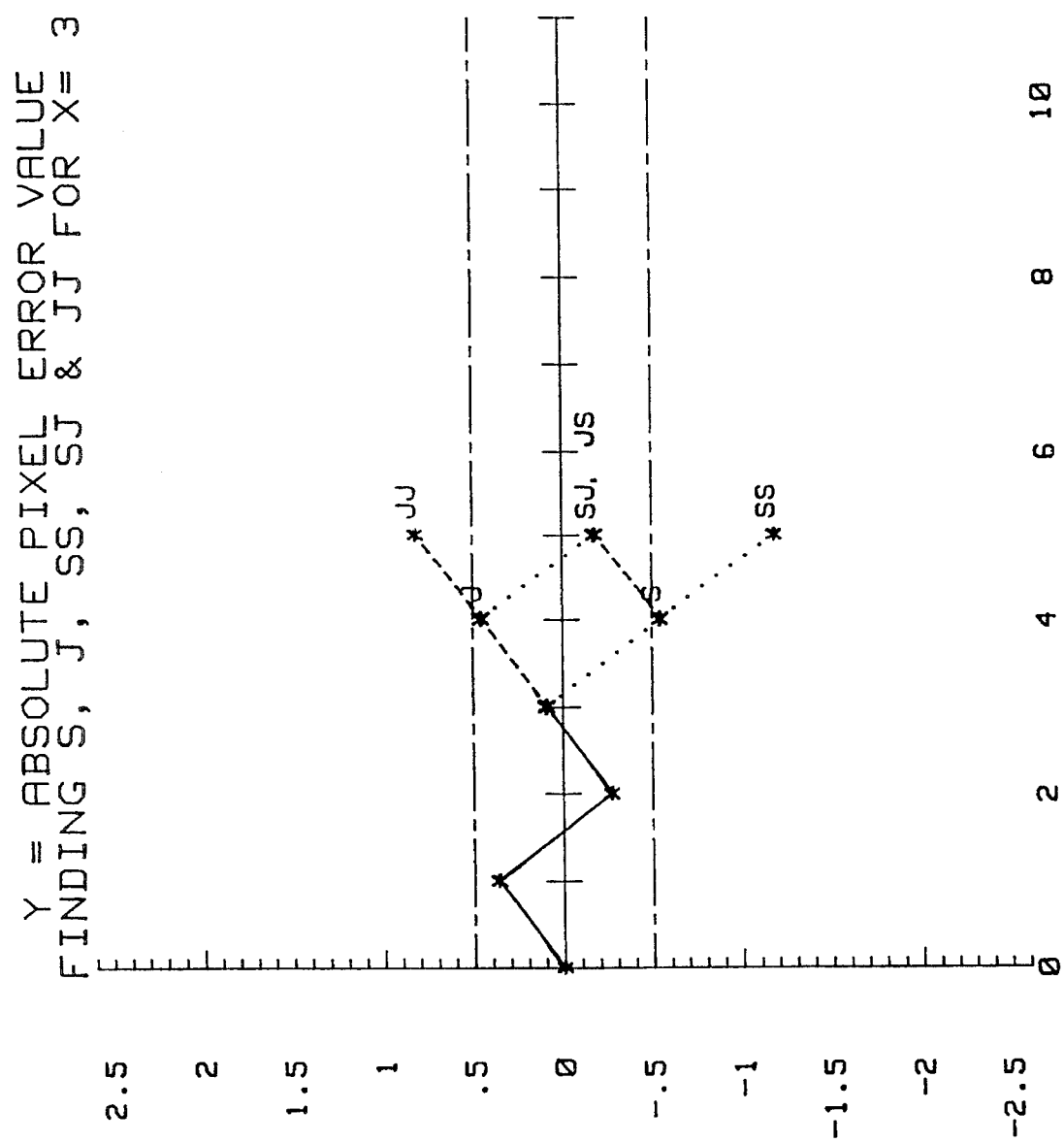
FIG. 20 is a plot of absolute error terms corresponding to the five trial next locations for the transitions S, J, SS, JJ and SJ/JS from the starting location at X=3 in FIG. 11.
Figure 21:
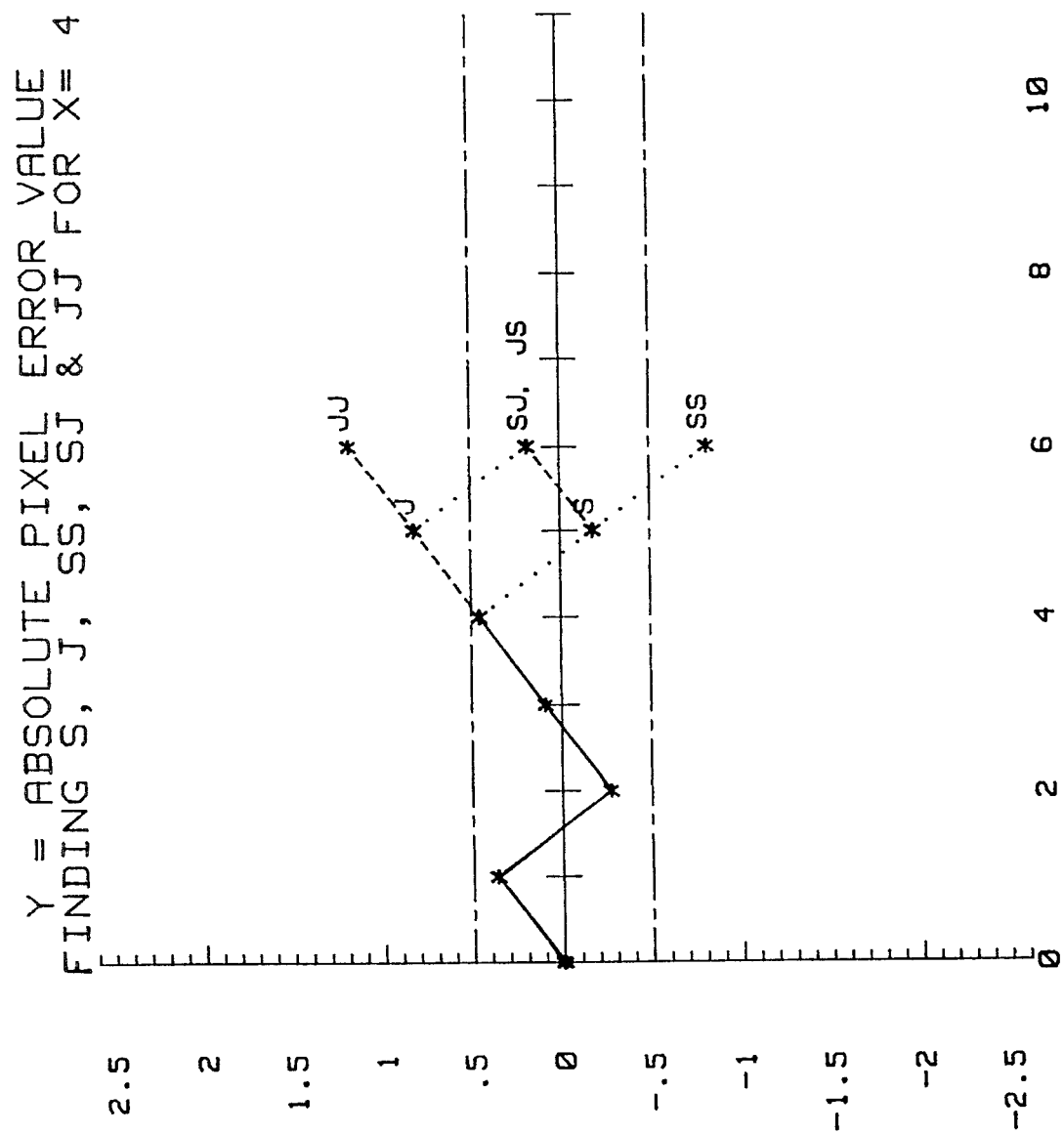
FIG. 21 is a plot of absolute error terms corresponding to the five trial next locations for the transitions S, J, SS, JJ and SJ/JS from the staring location at X=4 in FIG. 11.
Figure 22:
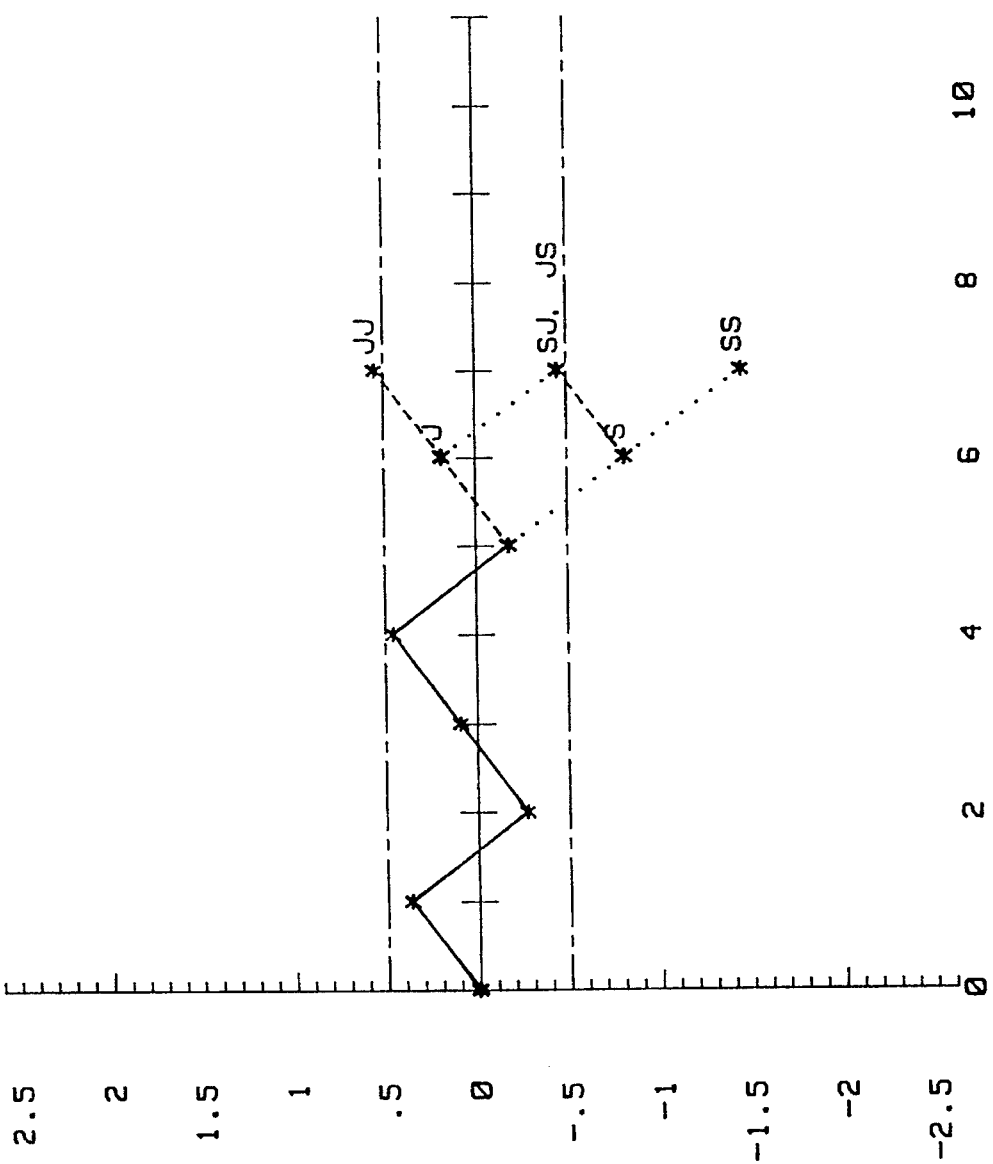
FIG. 22 is a plot of absolute error terms corresponding to the five trial next locations for the transitions S, J, SS, JJ and SJ/JS from the staring location at X=5 in FIG. 11.
Figure 23:
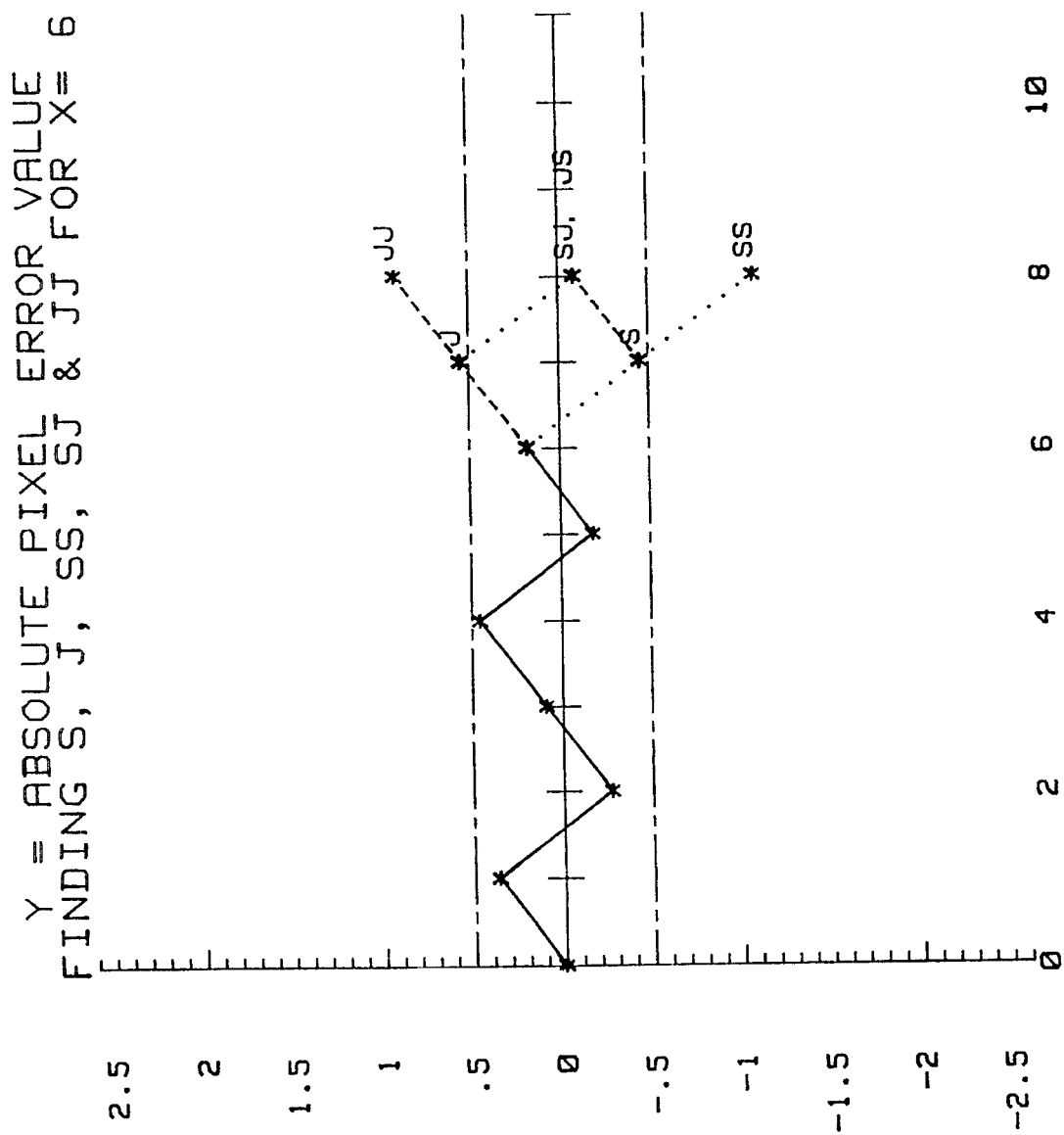
FIG. 23 is a plot of absolute error terms corresponding to the five trial next locations for the transitions S, J, SS, JJ and SJ/JS from the staring location at X=6 in FIG. 11.
Figure 24:
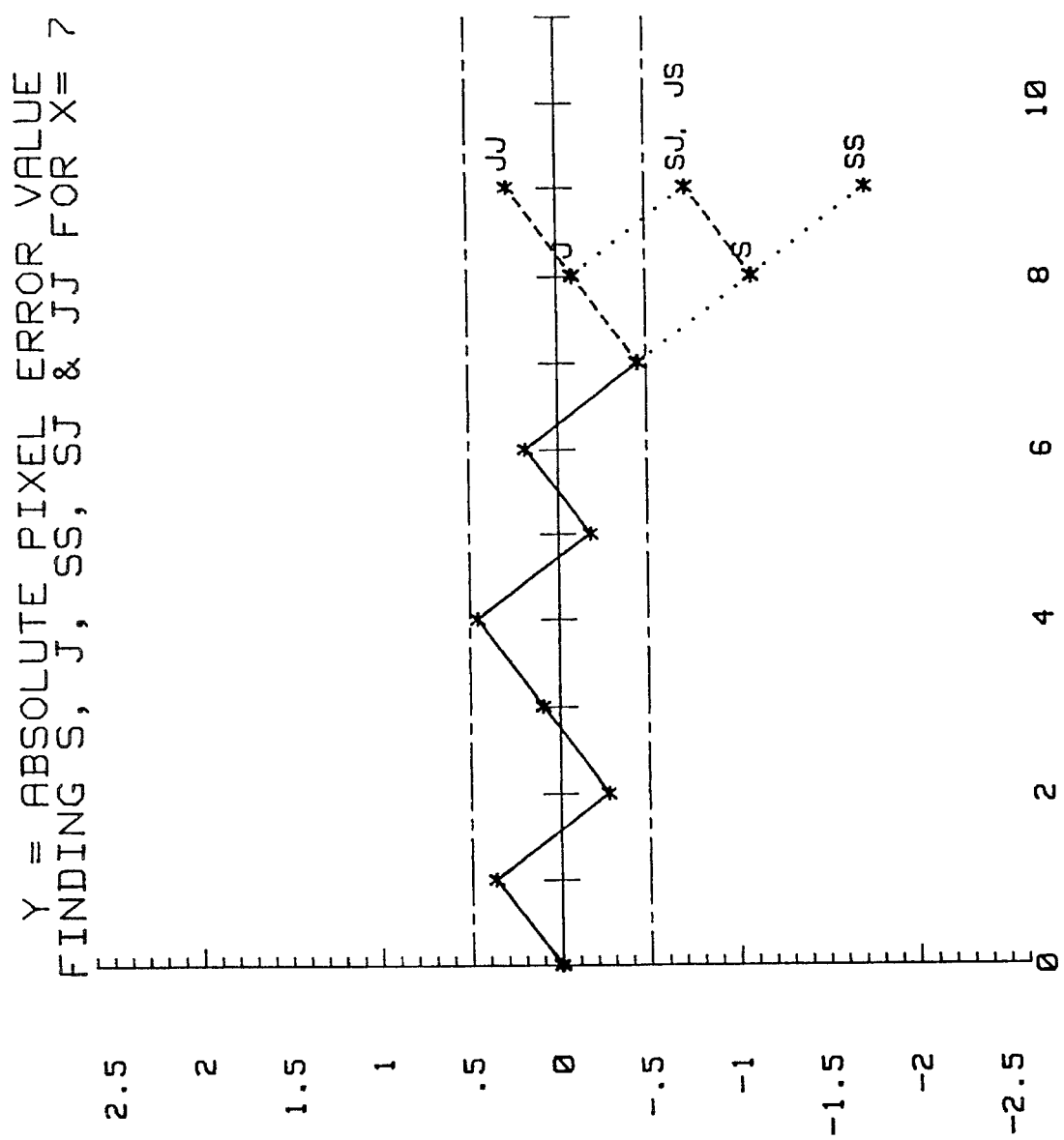
FIG. 24 is a plot of absolute error terms corresponding to the five trial next locations for the transitions, S, J, SS, JJ and SJ/JS from the staring location at X=7 in FIG. 11.
Figure 25:
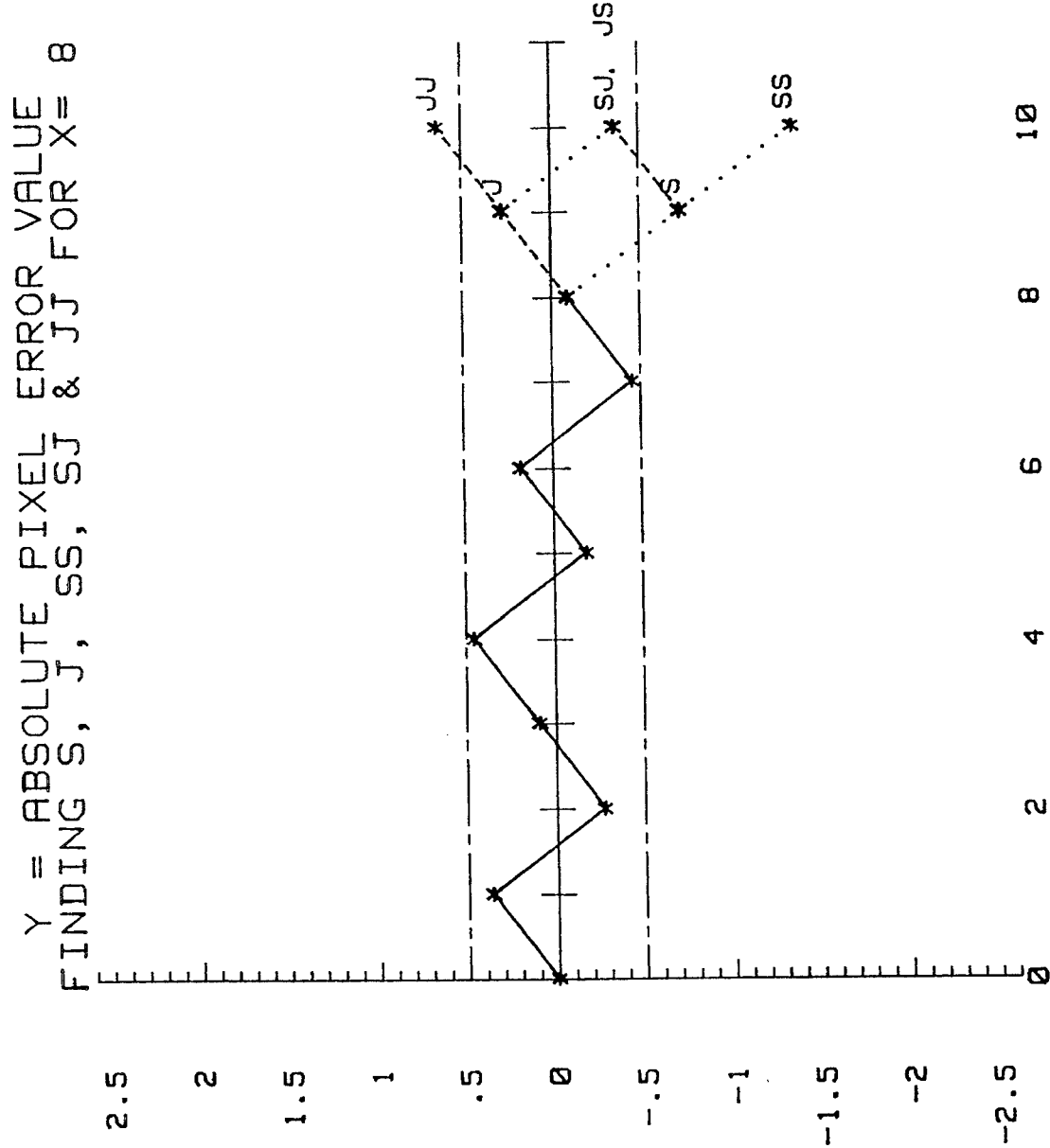
FIG. 25 is a plot of absolute error terms corresponding to the five trial next locations for the transitions S, J, SS, JJ and SJ/JS from the staring location at X=8 in FIG. 11.

FIGS. 11–25 have been included to illustrate various interesting transitions in a vector having a $\Delta X=11$ and a $\Delta Y=7$. FIG. 11 illustrates the vector as a collection 30 of twelve pixels on a pixel grid 31. Also shown is the ideal line segment 32 represented by the equation $Y=7/11\ X$. FIG. 12 is a plot of the Bresenham error term for the entire vector. FIGS. 13–18 show the partial Bresenham error term and trial Bresenham error terms associated with starting locations X=3 through X=8, respectively. FIG. 19 is a plot of the absolute error term for the entire vector, and FIGS. 20–25 correspond to FIGS. 13–18, except that they are for the absolute error term.

Figure 26:
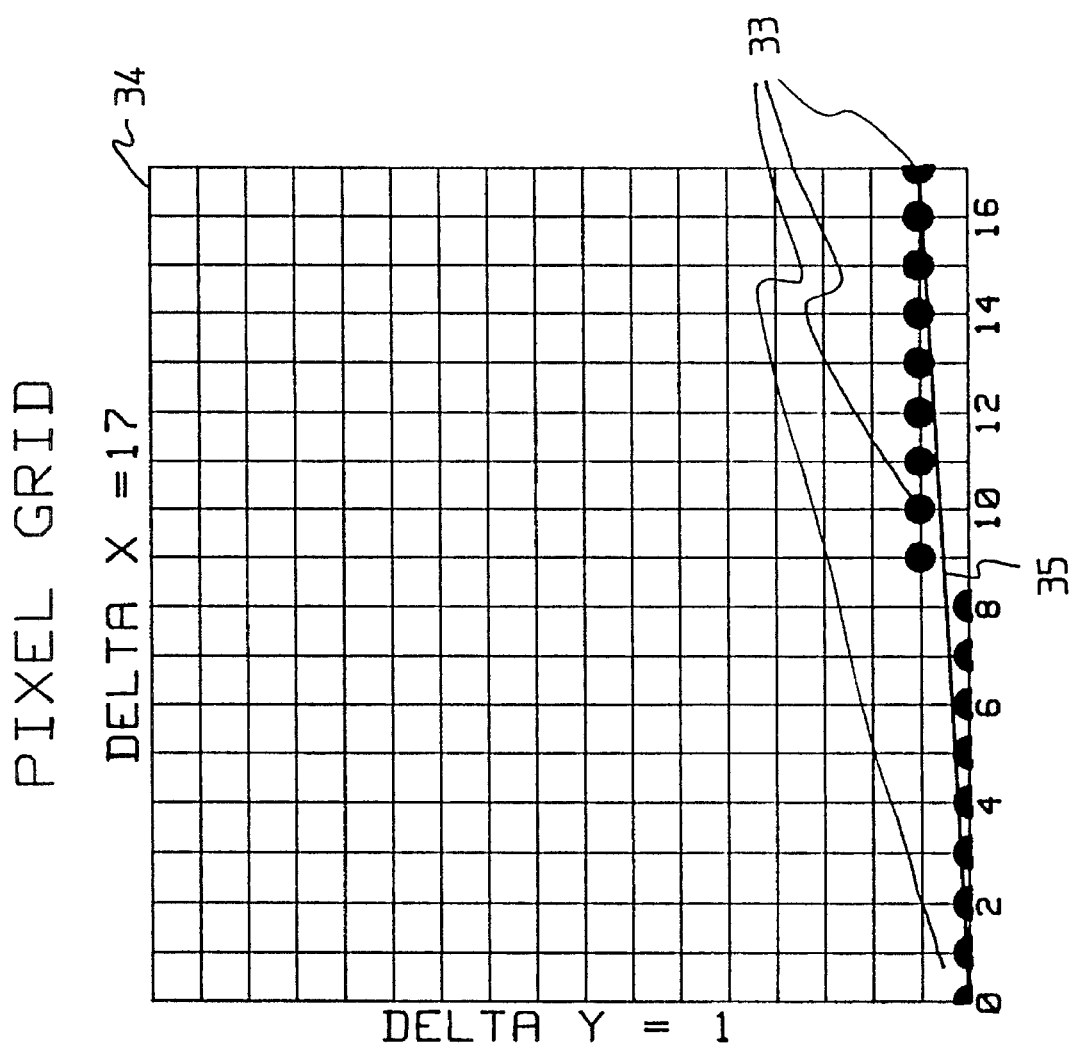
FIG. 26 is a pixel grid having pixels selected to represent a line segment that is described by a ΔX=17 and a ΔY=1.
Figure 27:
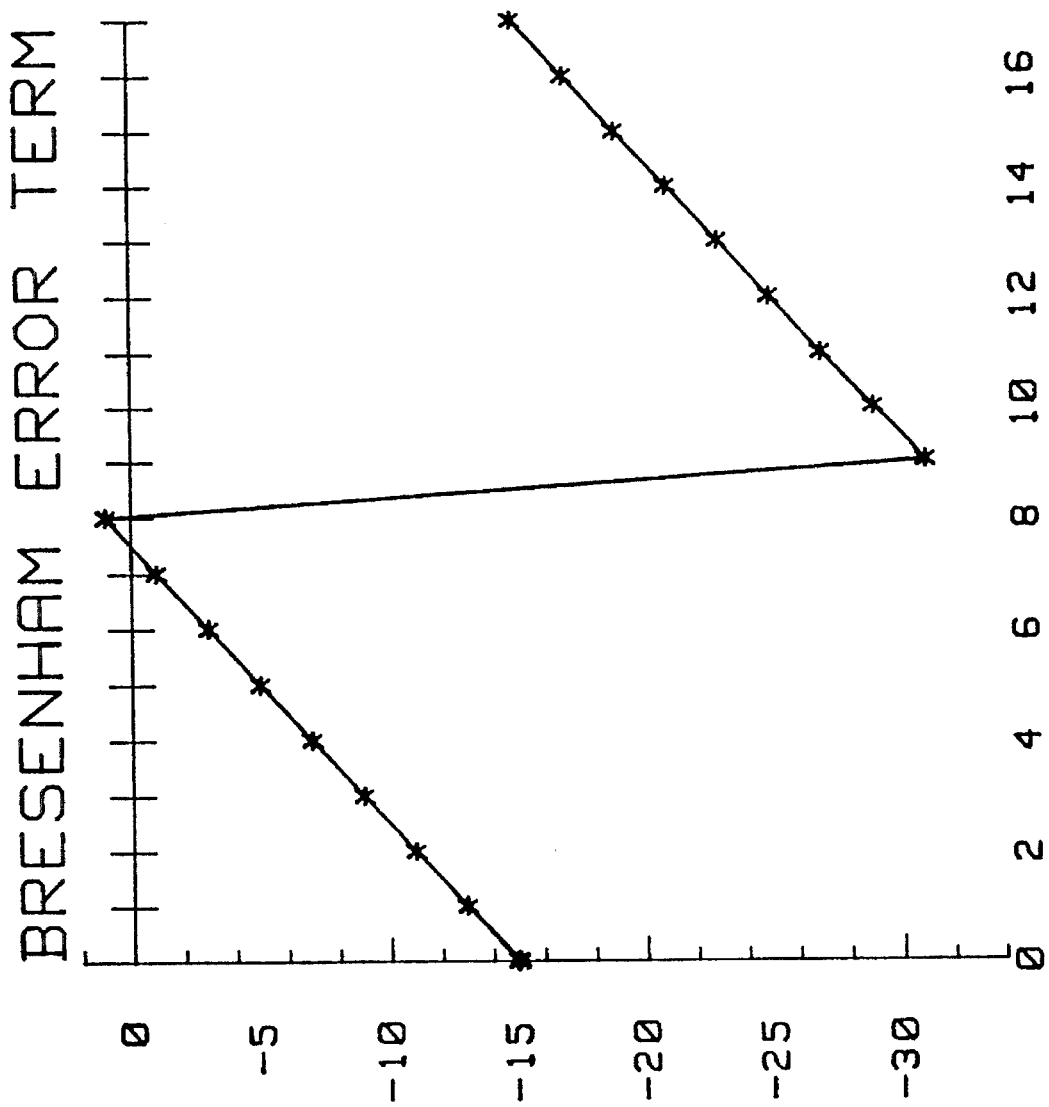
FIG. 27 is a graph of the Bresenham error term of the pixels for the line segment of FIG. 26.
Figure 28:
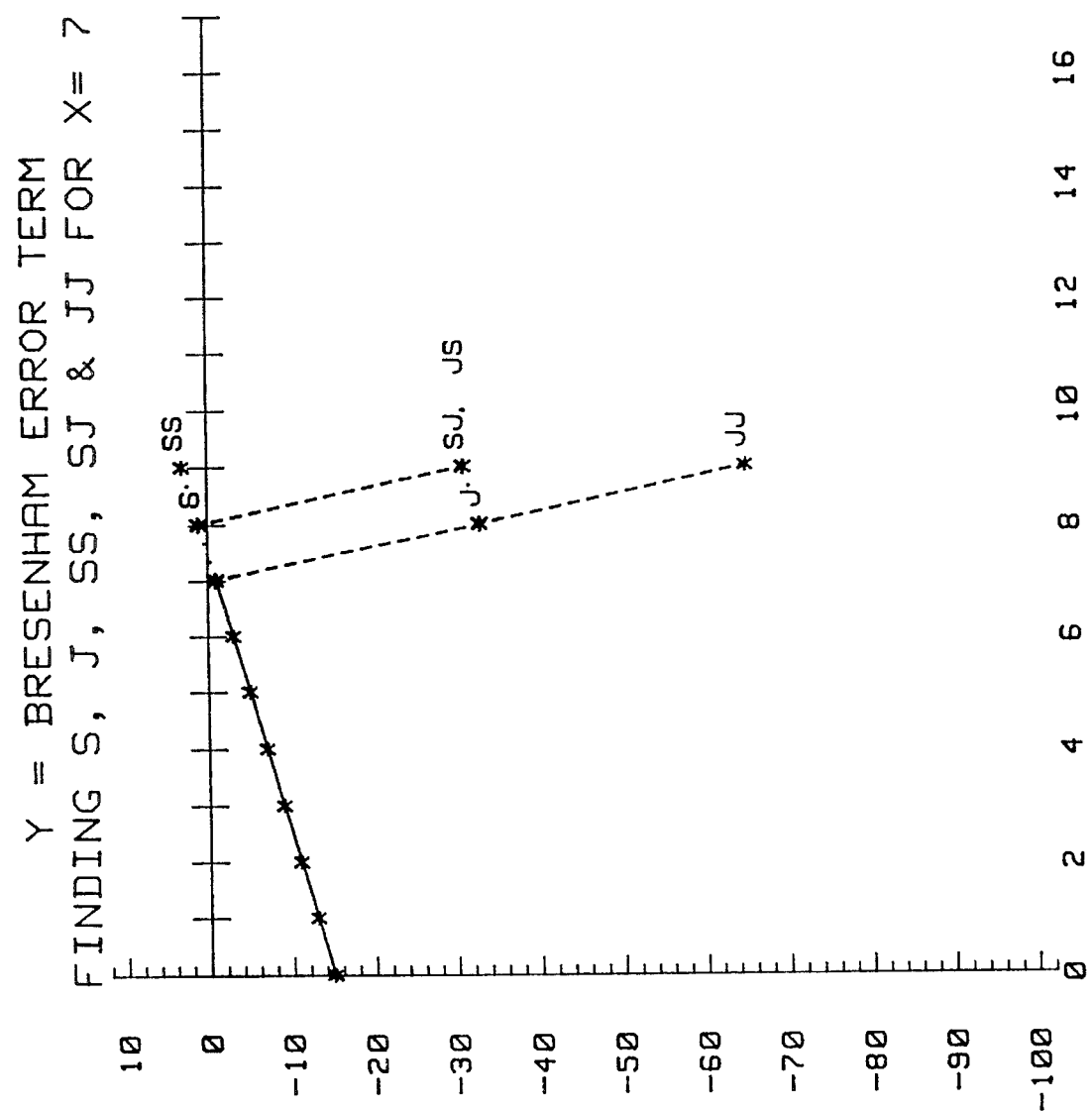
FIG. 28 is a plot of Bresenham error terms corresponding to the five trial next locations for the transitions S, J, SS, JJ and SJ/JS from the starting location at X=7 in FIG. 26.
Figure 29:
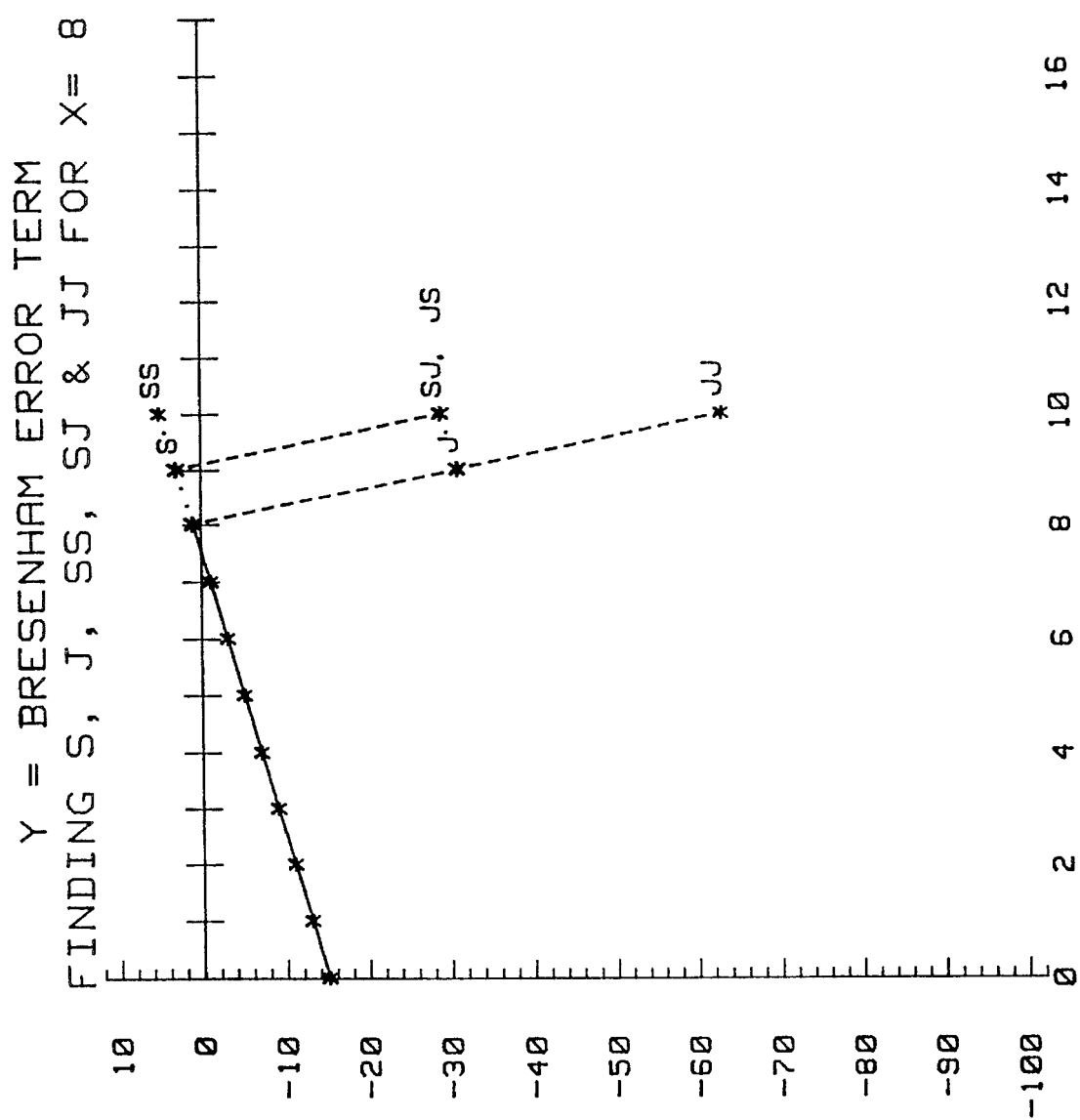
FIG. 29 is a plot of Bresenham error terms corresponding to the five trial next locations for the transitions S, J, SS, JJ and SJ/JS from the starting location at X=8 in FIG. 26.
Figure 30:
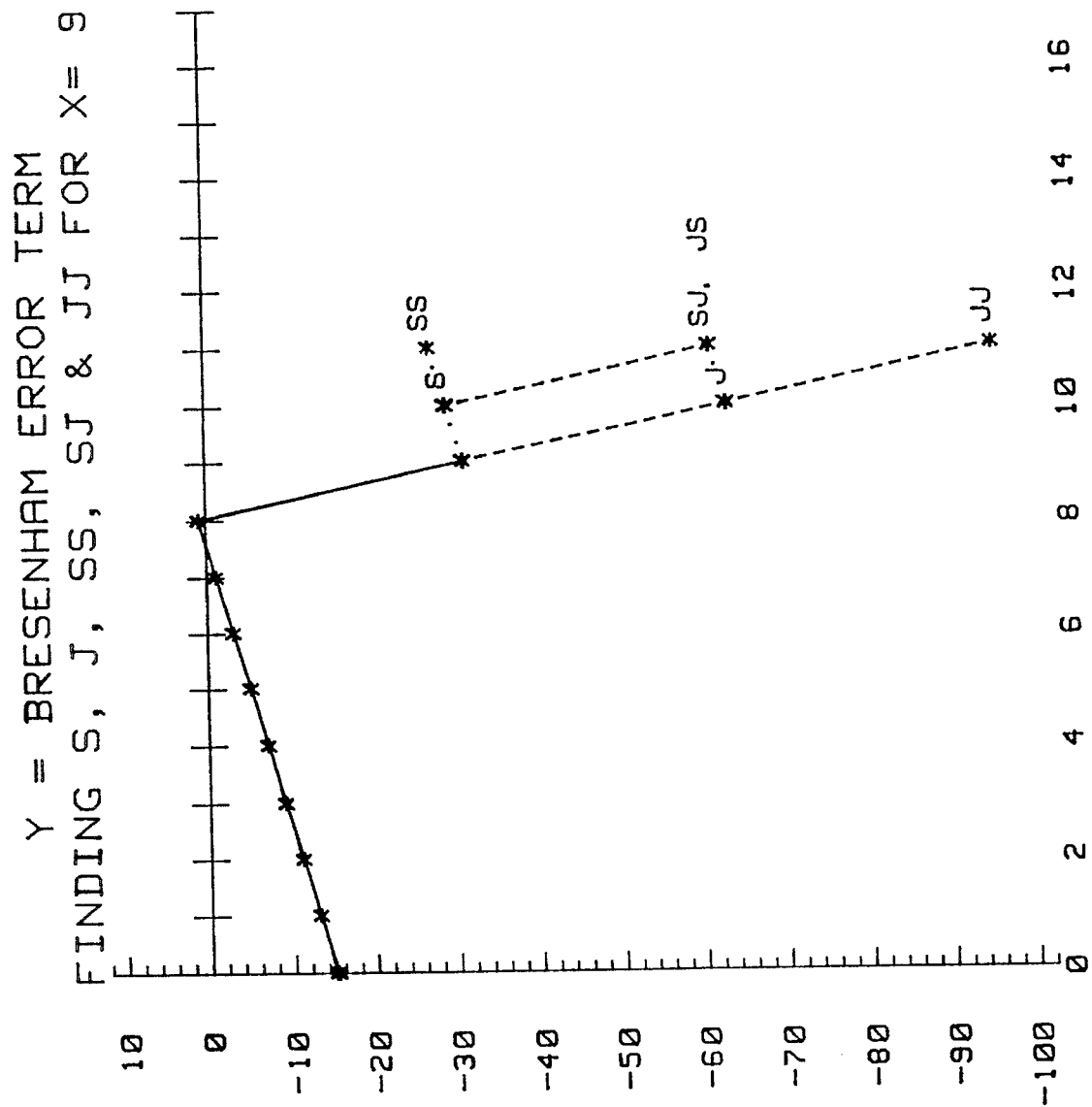
FIG. 30 is a plot of Bresenham error terms corresponding to the five trial next locations for the transitions S, J, SS, JJ and SJ/JS from the starting location at X=9 in FIG. 26.
Figure 31:
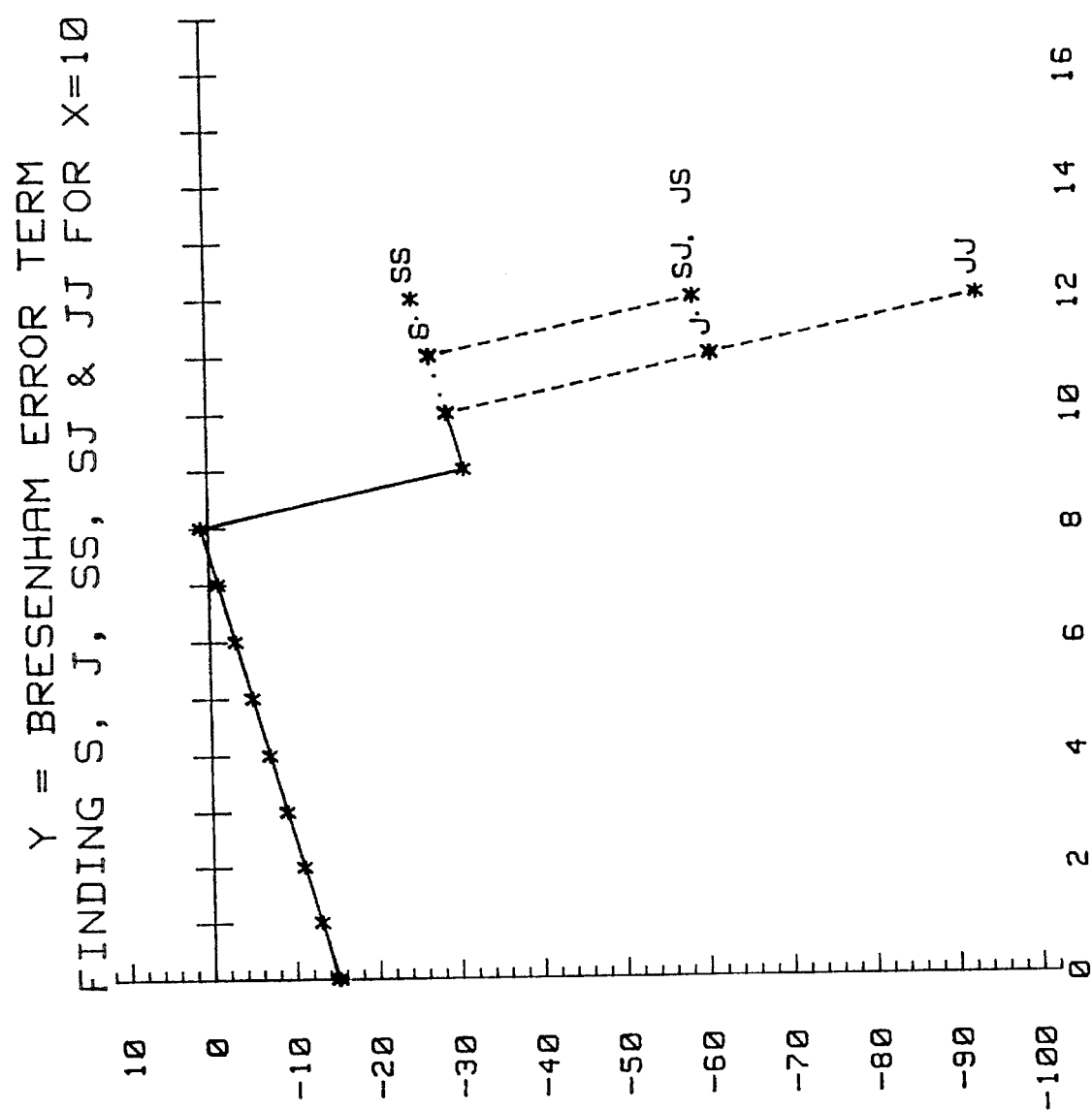
FIG. 31 is a plot of Bresenham error terms corresponding to the five trial next locations for the transitions S, J, SS, JJ and SJ/JS from the starting location at X=10 in FIG. 26.
Figure 32:
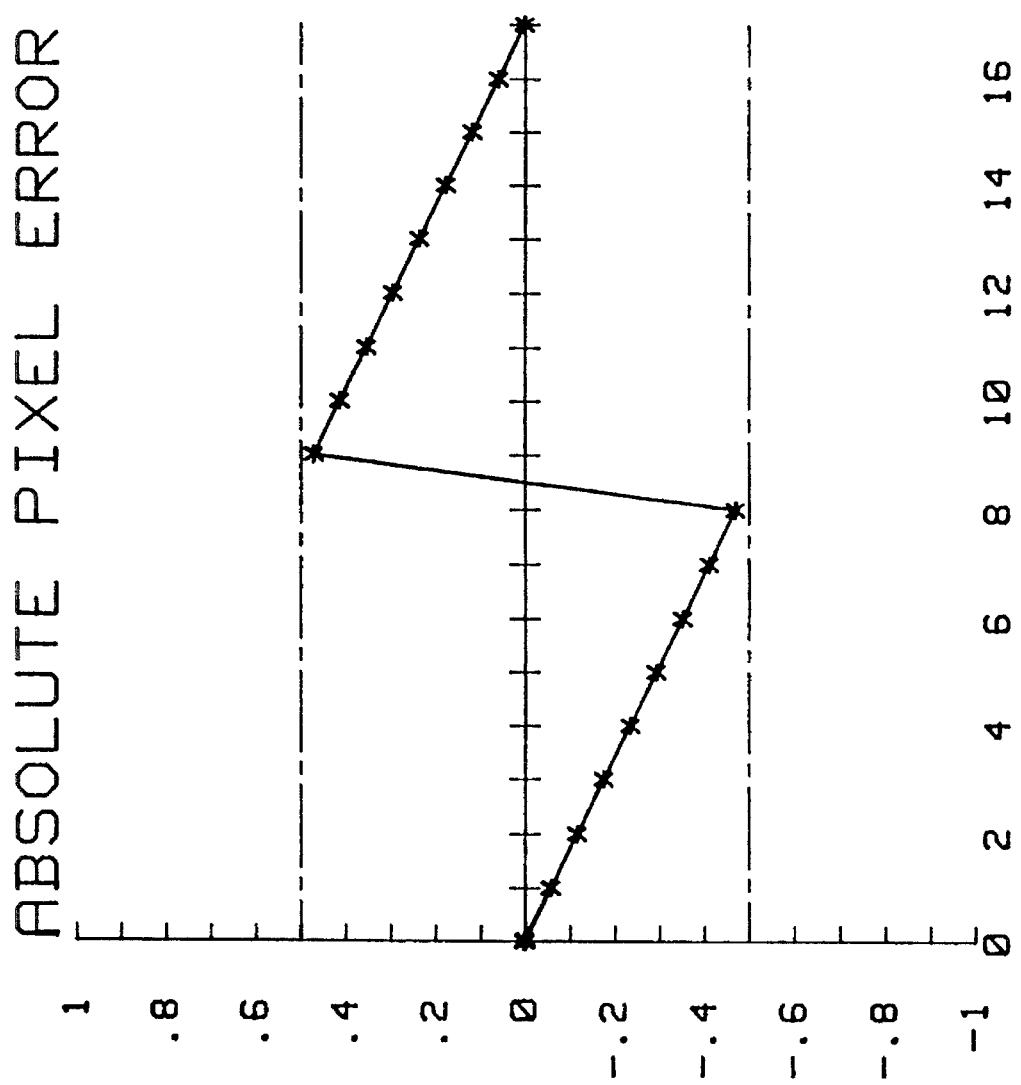
FIG. 32 is a graph of the absolute pixel error of the pixels for the line segment of FIG. 26.
Figure 33:
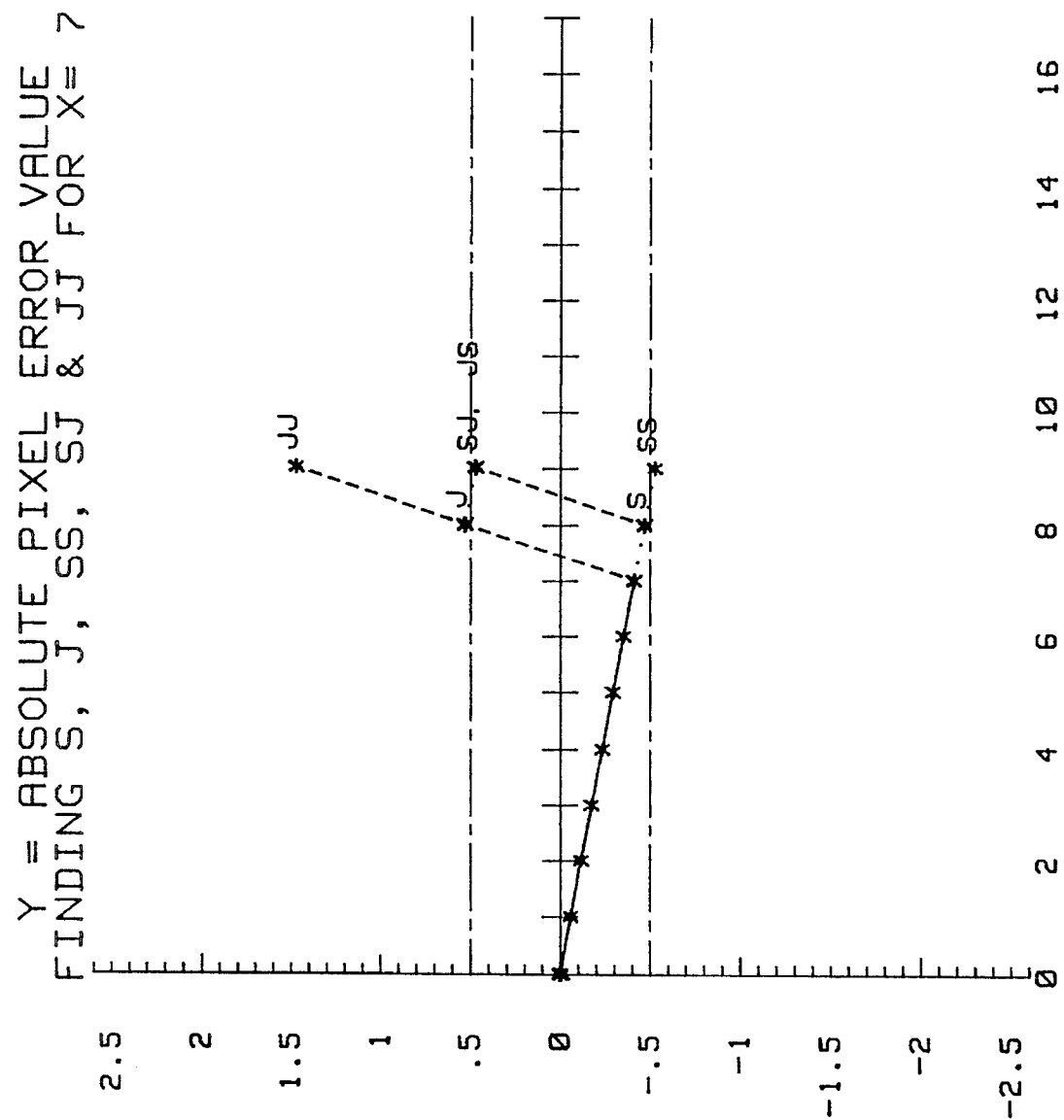
FIG. 33 is a plot of absolute error terms corresponding to the five trial next locations for the transitions S, J, SS, JJ and SJ/JS from the starting location at X=7 in FIG. 26.
Figure 34:
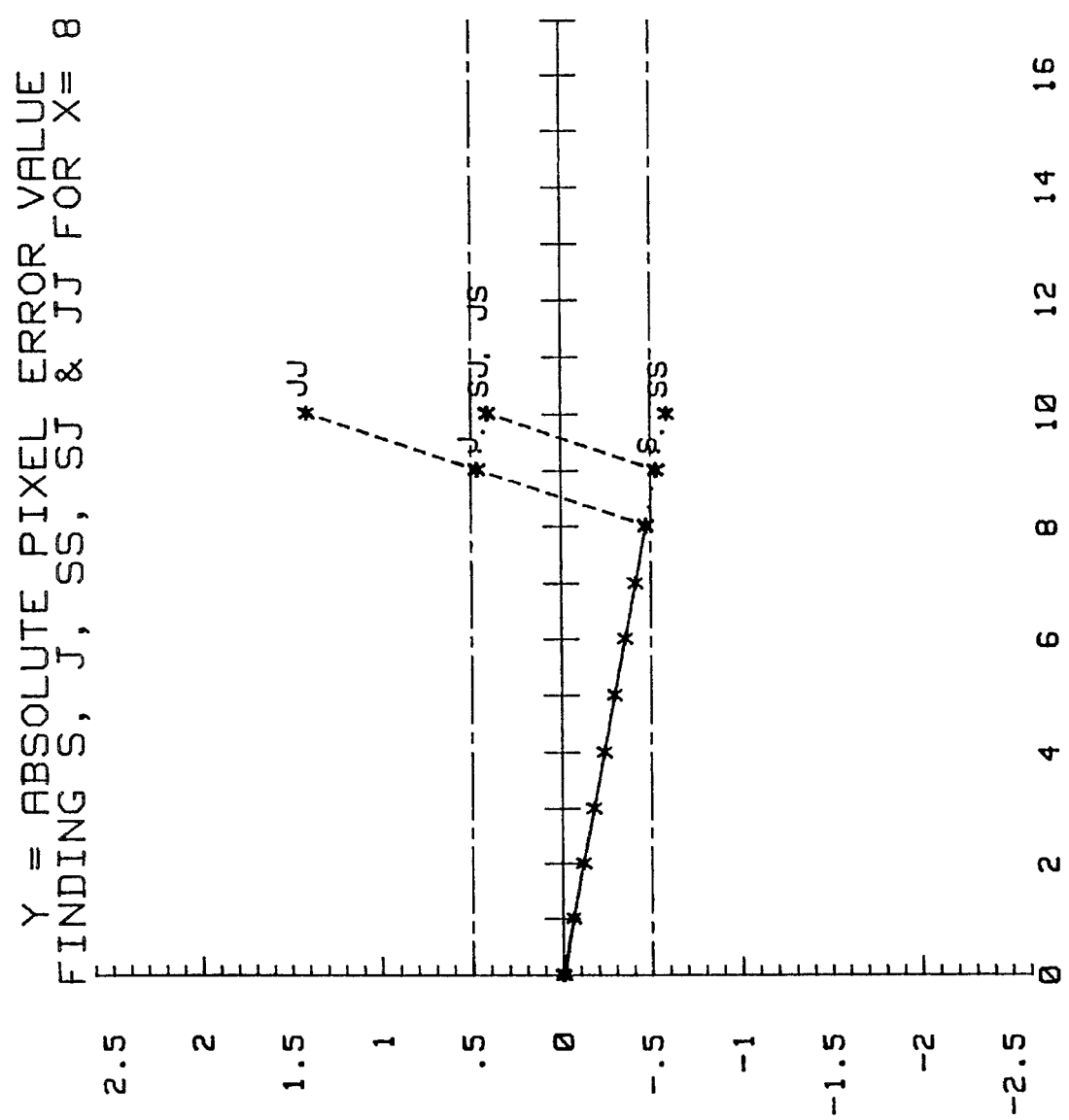
FIG. 34 is a plot of absolute error terms corresponding to the five trial next locations for the transitions S, J, SS, JJ and SJ/JS from the starting location at X=8 in FIG. 26.
Figure 35:
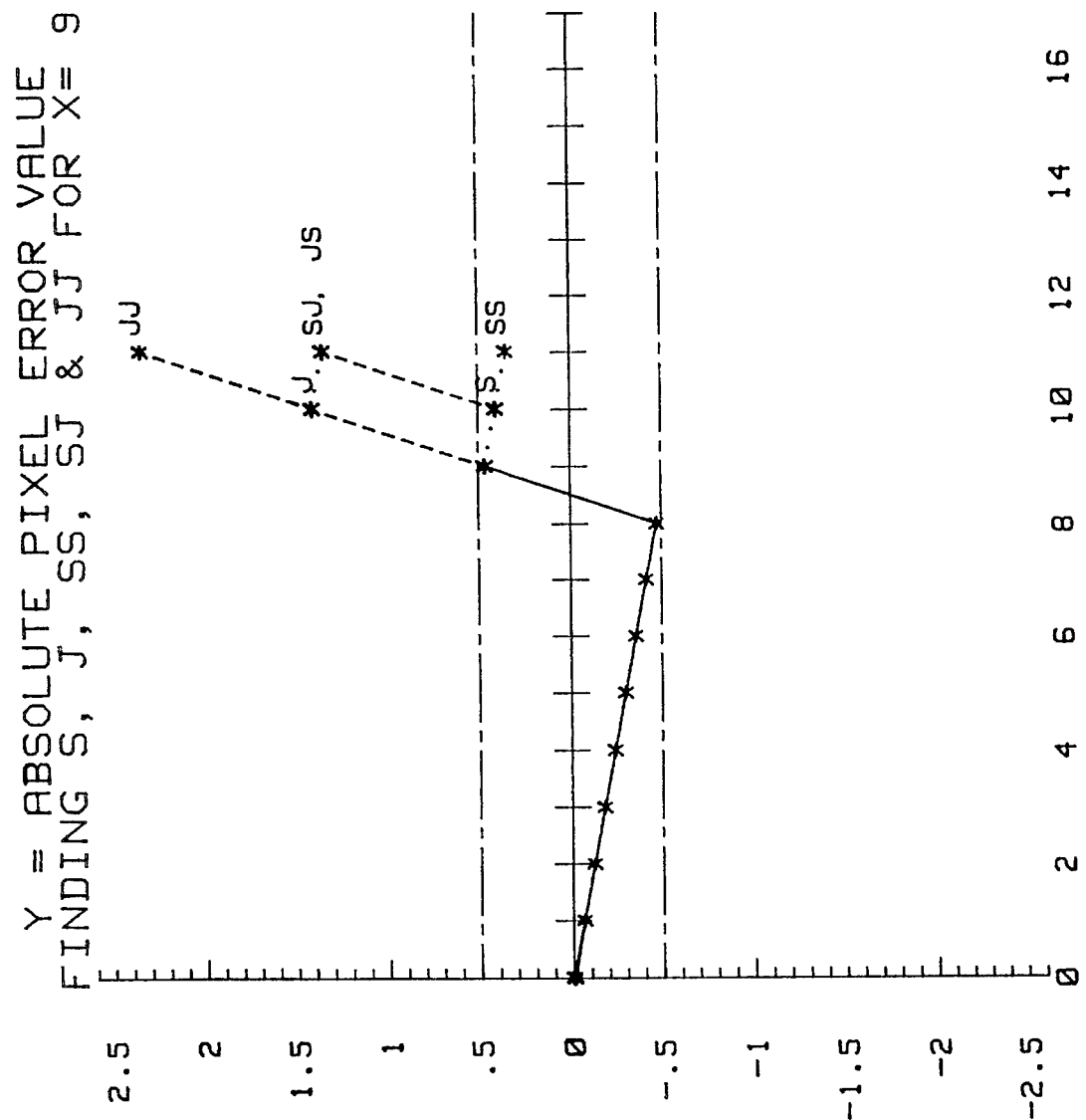
FIG. 35 is a plot of absolute error terms corresponding to the five trial next locations for the transitions S, J, SS, JJ and SJ/JS from the starting location at X=9 in FIG. 26.
Figure 36:
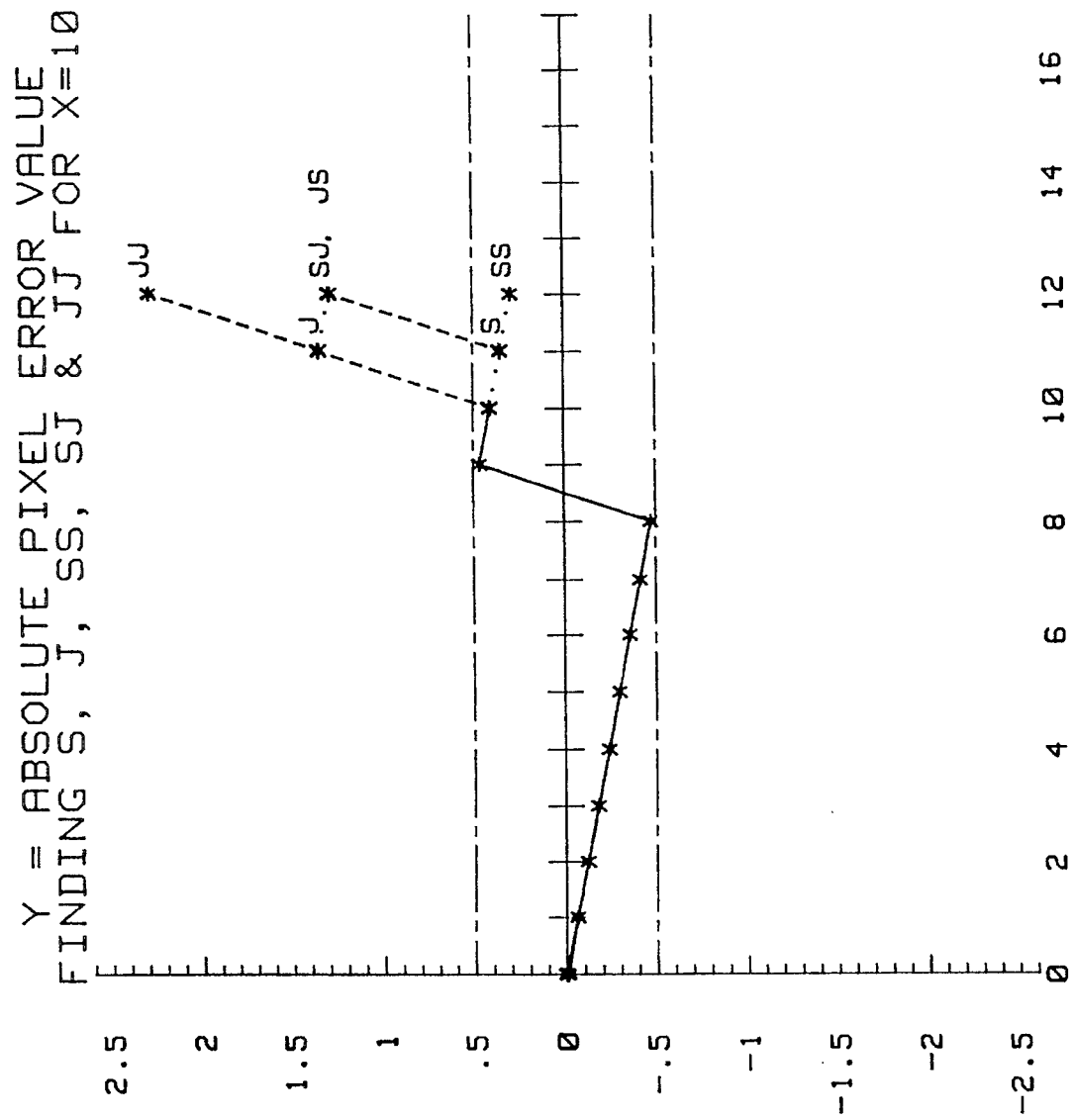
FIG. 36 is a plot of absolute error terms corresponding to the five trial next locations for the transitions S, J, SS, JJ and SJ/JS from the starting location at X=10 in FIG. 26.

FIGS. 26–36 have been included to illustrate various interesting transitions in a vector having a $\Delta X=17$ and a $\Delta Y=1$. FIG. 26 illustrates the vector as a collection 33 of eighteen pixels on a pixel grid 34. Also shown is the ideal line segment 35 represented by the equation $Y=1/17\ X$. FIG. 27 is a plot of the Bresenham error term for the entire vector. FIGS. 28–31 show the partial Bresenham error term and trial Bresenham error terms associated with starting locations X=7 through X=10, respectively. FIG. 32 is a plot of the absolute error term for the entire vector, and FIGS. 33–36 correspond to FIGS. 28–31, except that they are for the absolute error term.

Figure 37:
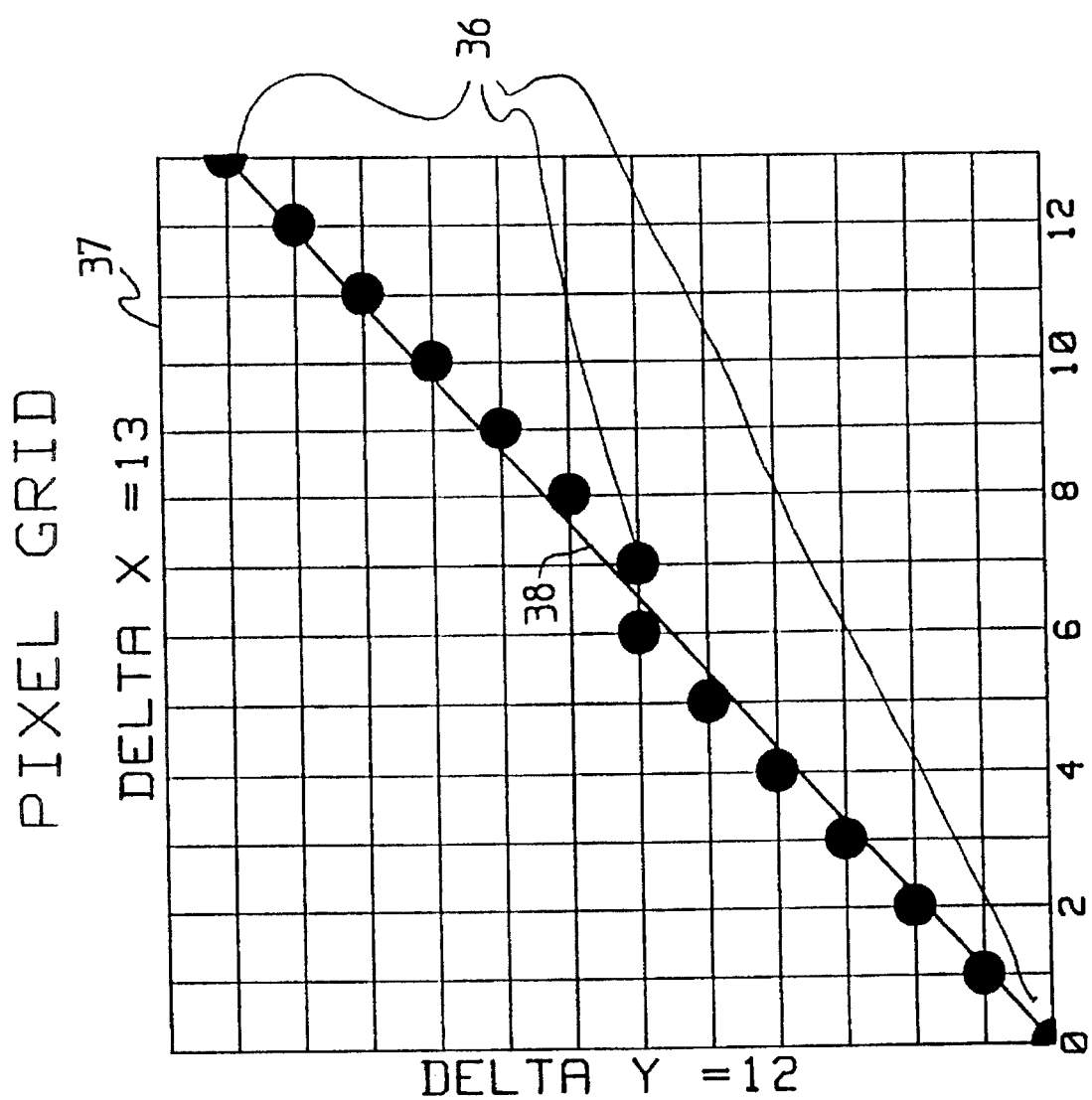
FIG. 37 is a pixel grid having pixels selected to represent a line segment that is described by a ΔX=13 and a ΔY=12.
Figure 38:
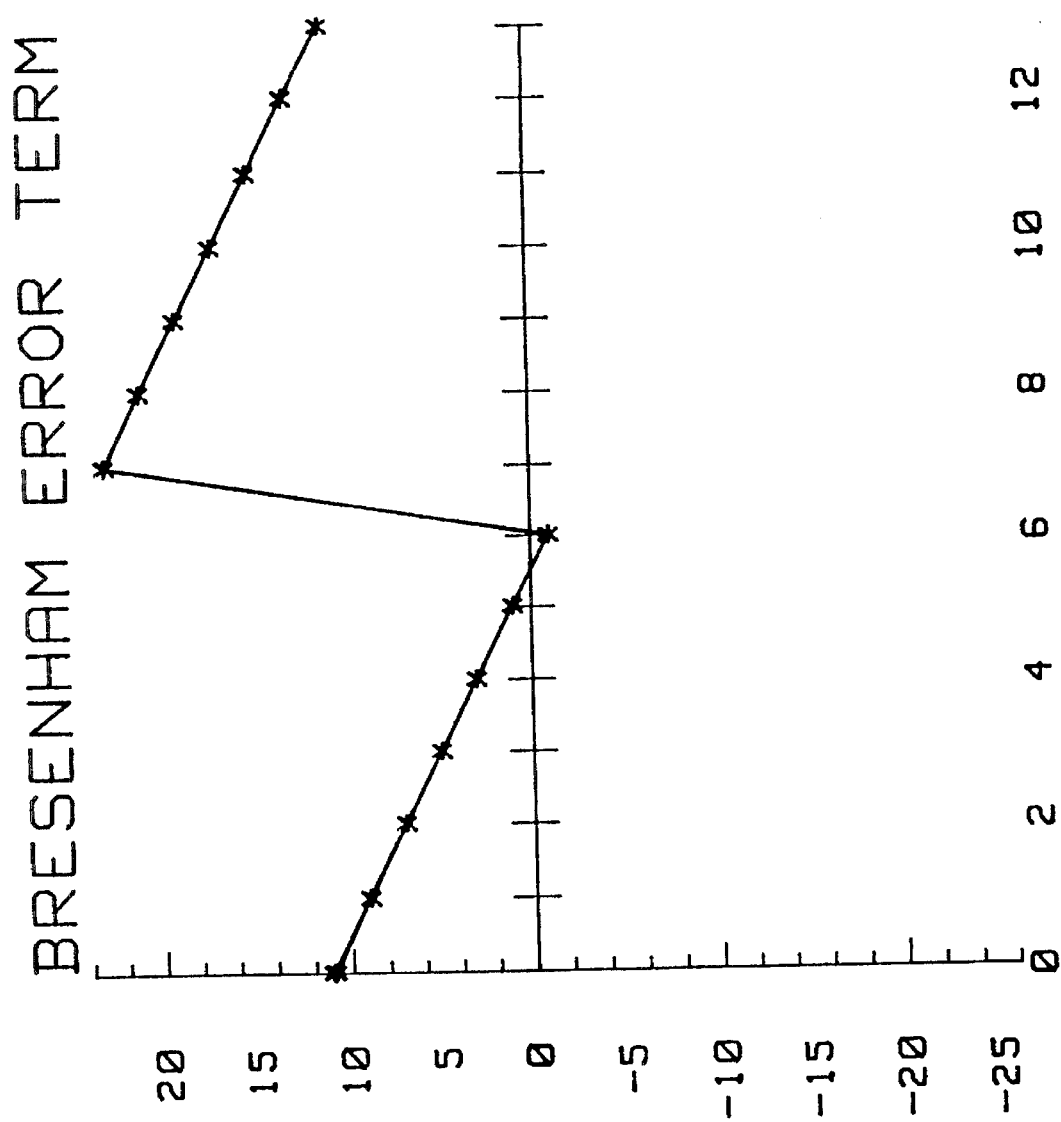
FIG. 38 is a graph of the Bresenham error term of the pixels for the line segment of FIG. 37.
Figure 39:
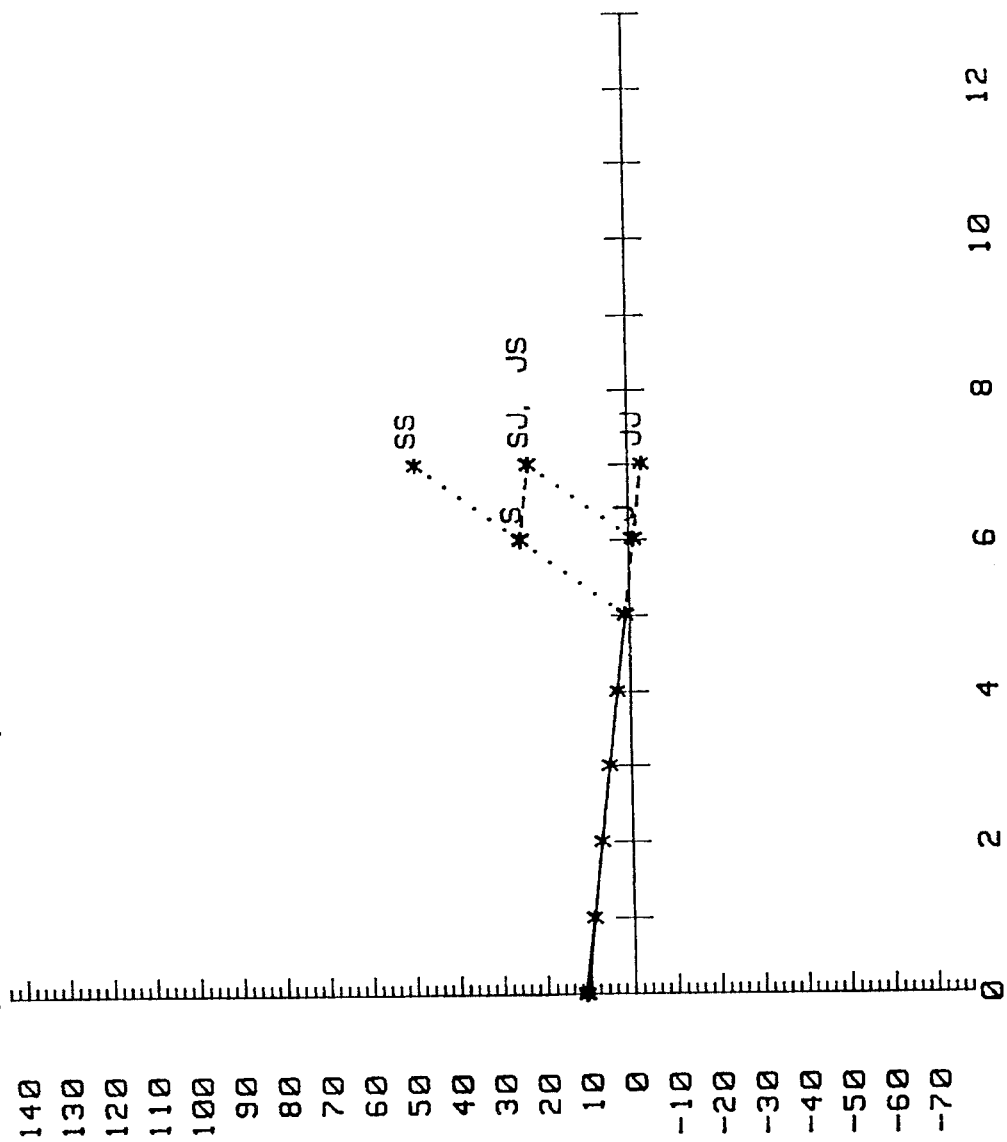
FIG. 39 is a plot of Bresenham error terms corresponding to the five trial next locations for the transitions S, J, SS, JJ and SJ/JS from the starting location at X=5 in FIG. 37.
Figure 40:
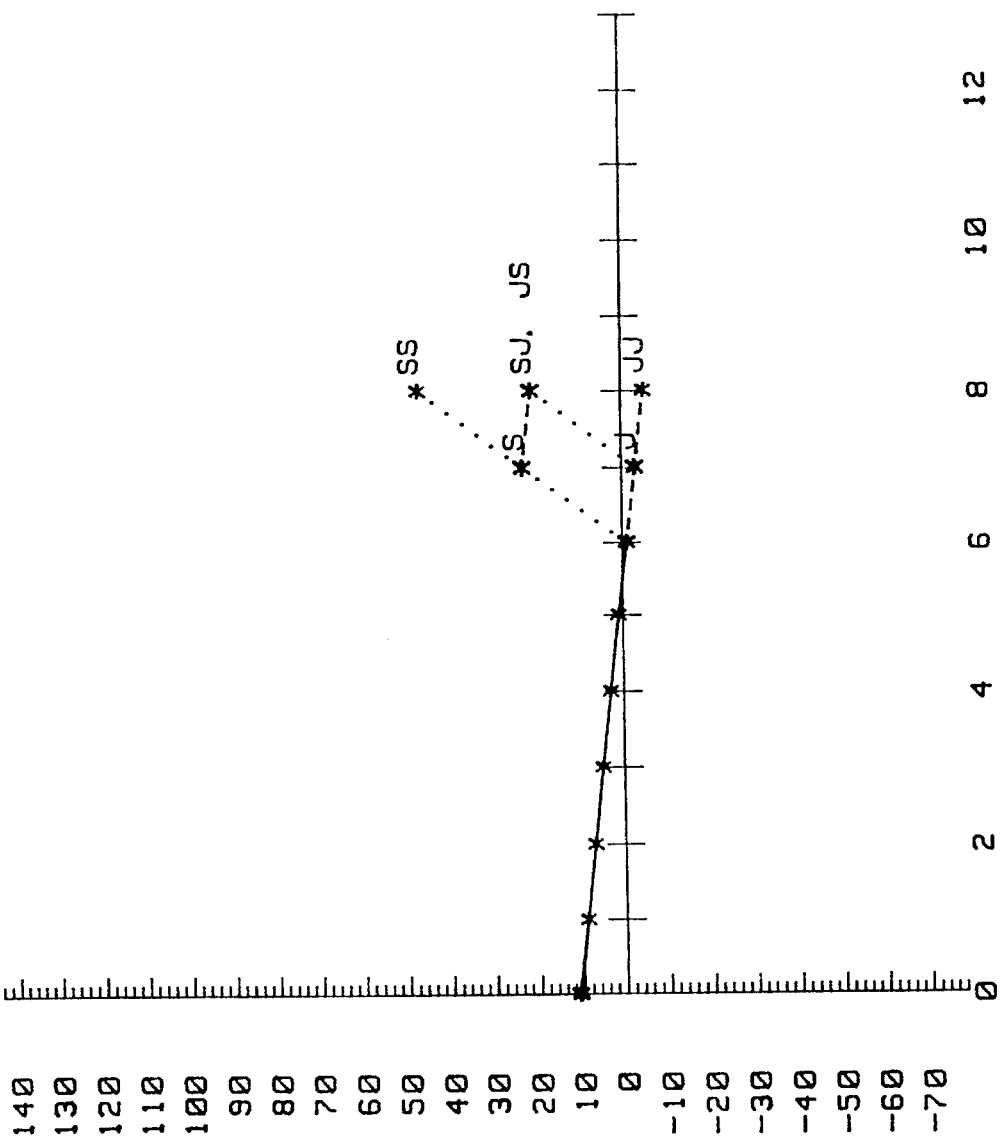
FIG. 40 is a plot of Bresenham error terms corresponding to the five trial next locations for the transitions S, J, SS, JJ and SJ/JS from the starting location at X=6 in FIG. 37.
Figure 41:
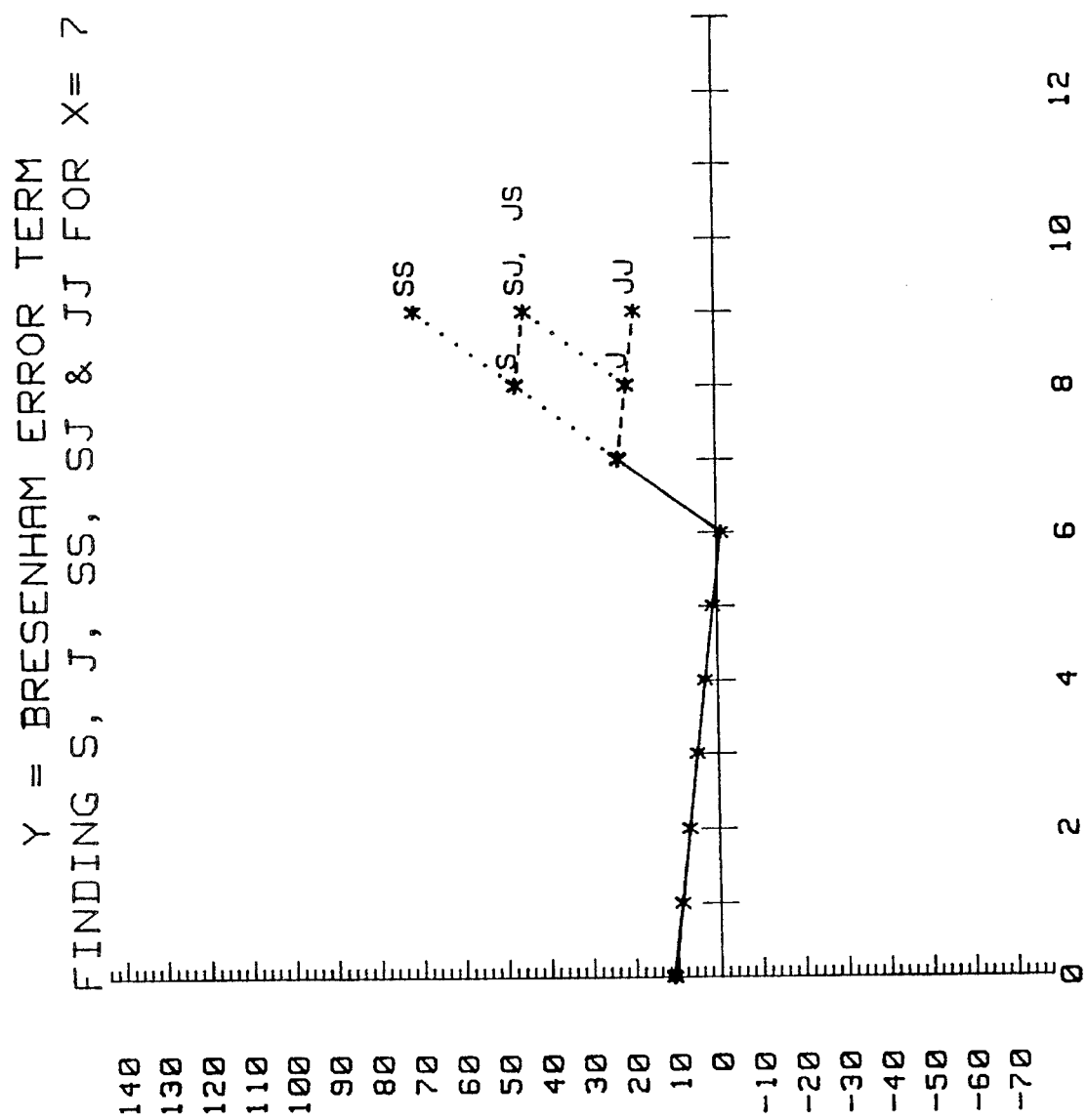
FIG. 41 is a plot of Bresenham error terms corresponding to the five trial next locations for the transitions S, J, SS, JJ and SJ/JS from the starting location at X=7 in FIG. 37.
Figure 42:
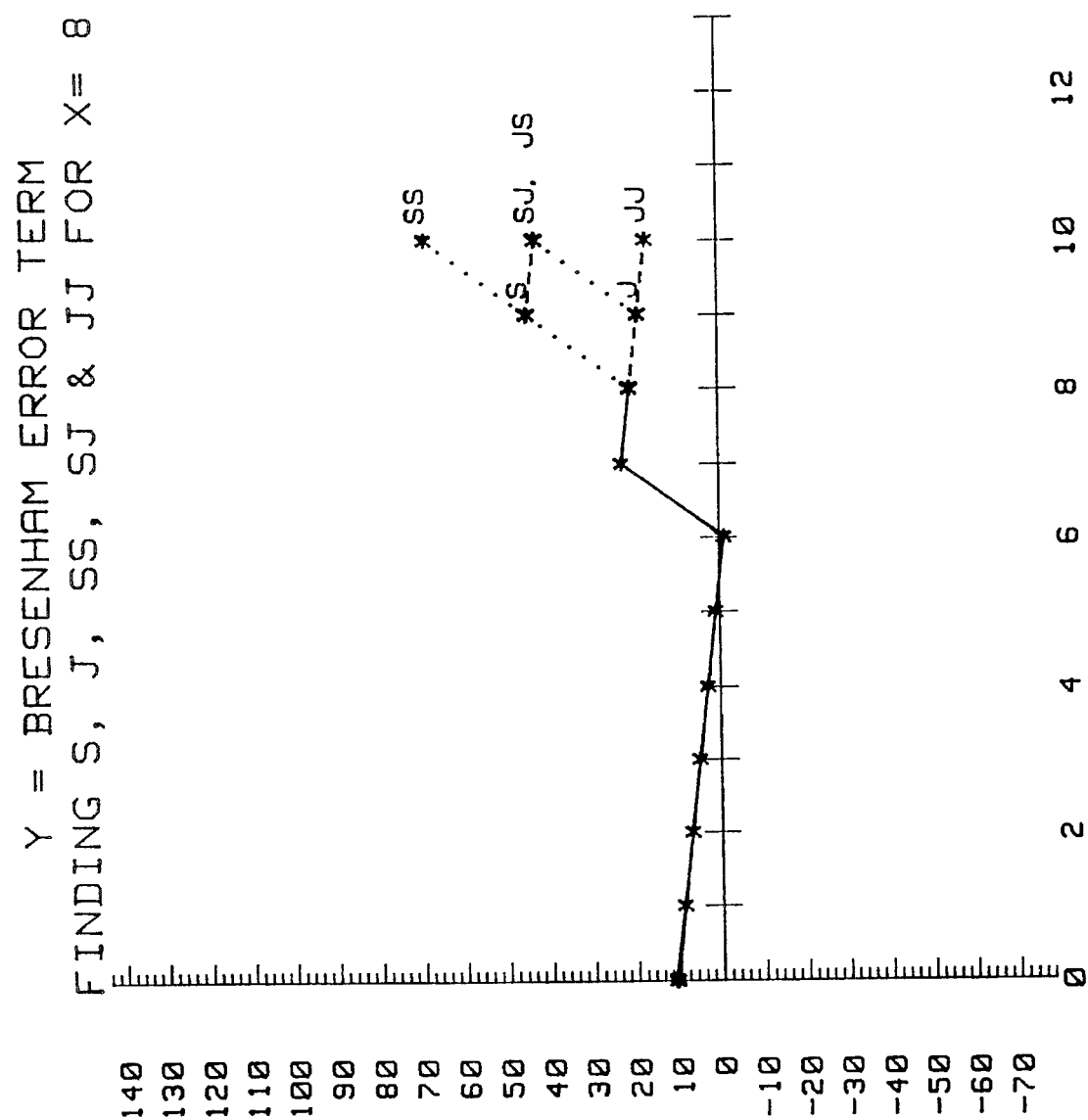
FIG. 42 is a plot of Bresenham error terms corresponding to the five trial next locations for the transitions S, J, SS, JJ and SJ/JS from the starting location at X=8 in FIG. 37.
Figure 43:
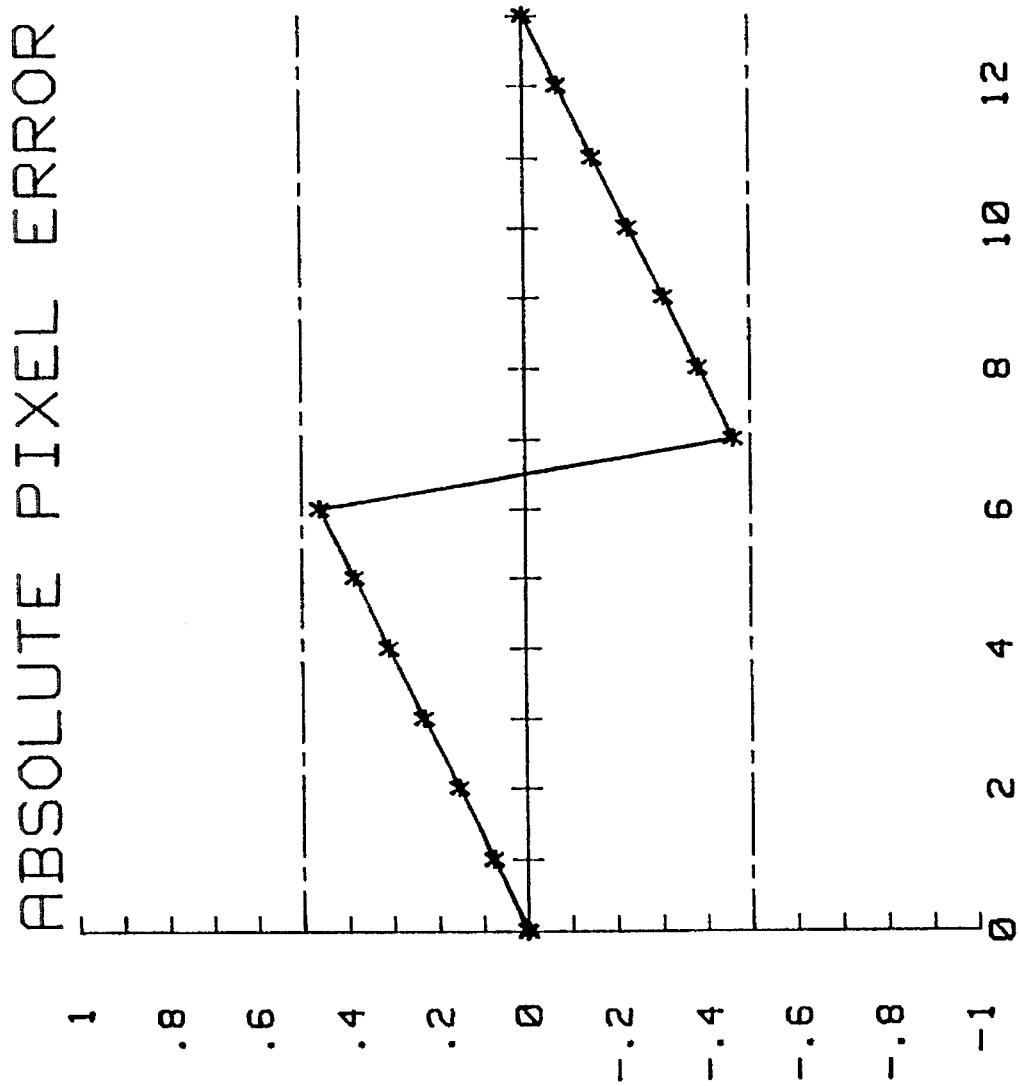
FIG. 43 is a graph of the absolute pixel error of the pixels for the line segment of FIG. 37.
Figure 44:
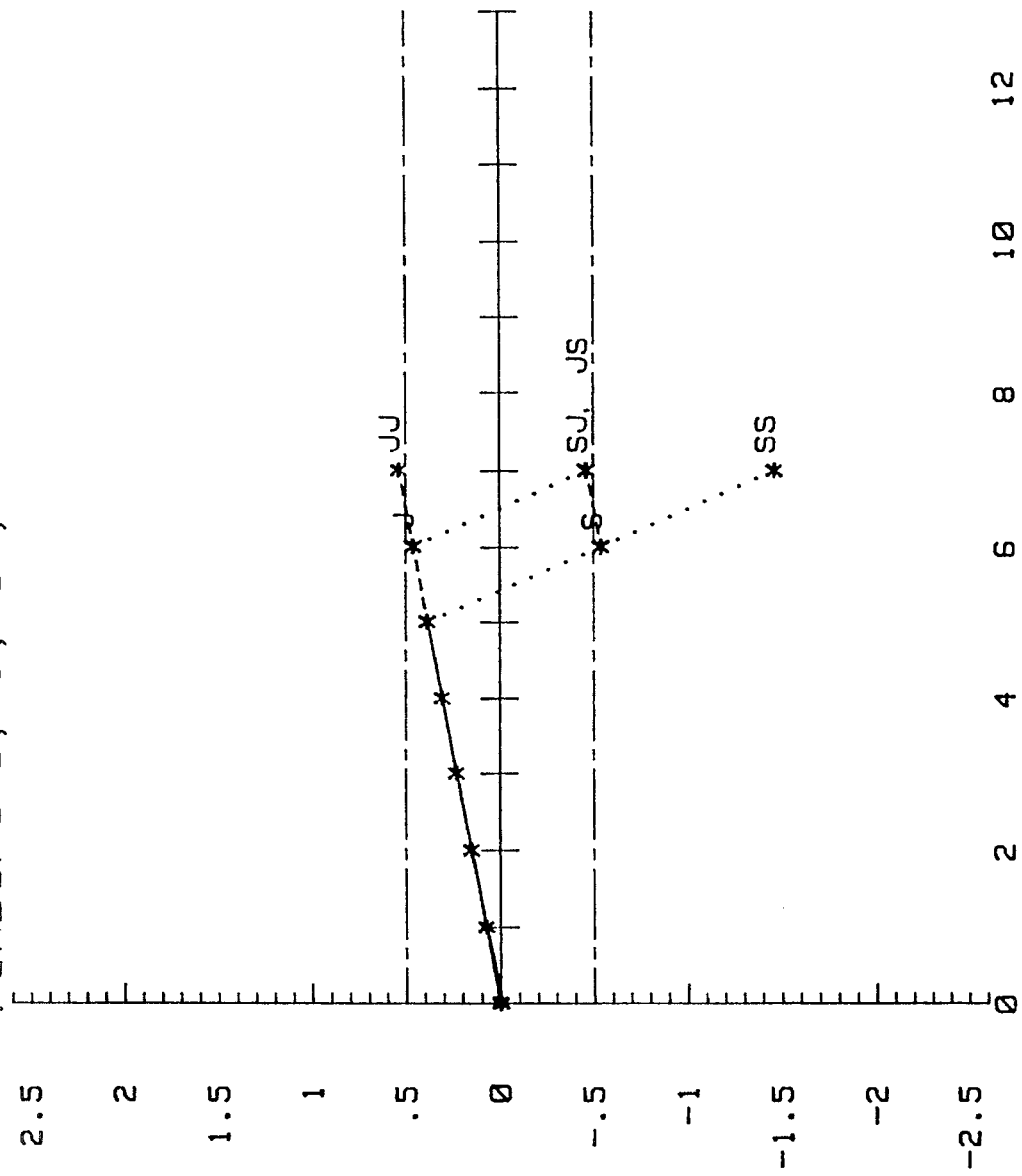
FIG. 44 is a plot of absolute error terms corresponding to the five trial next locations for the transitions S, J, SS, JJ and SJ/JS from the starting location at X=5 in FIG. 37.
Figure 45:
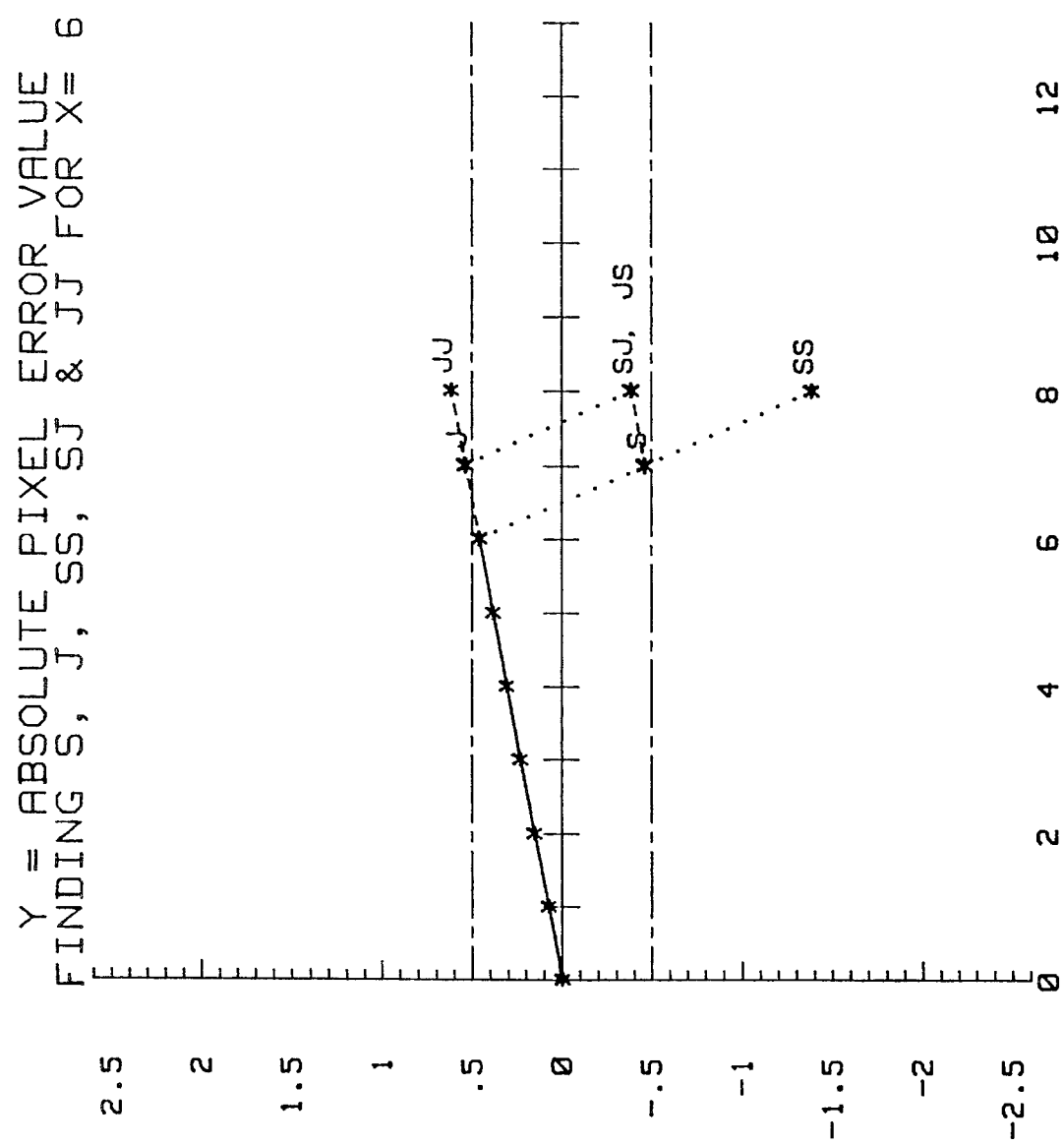
FIG. 45 is a plot of absolute error terms corresponding to the five trial next locations for the transitions S, J, SS, JJ and SJ/JS from the starting location at X=6 in FIG. 37.
Figure 46:
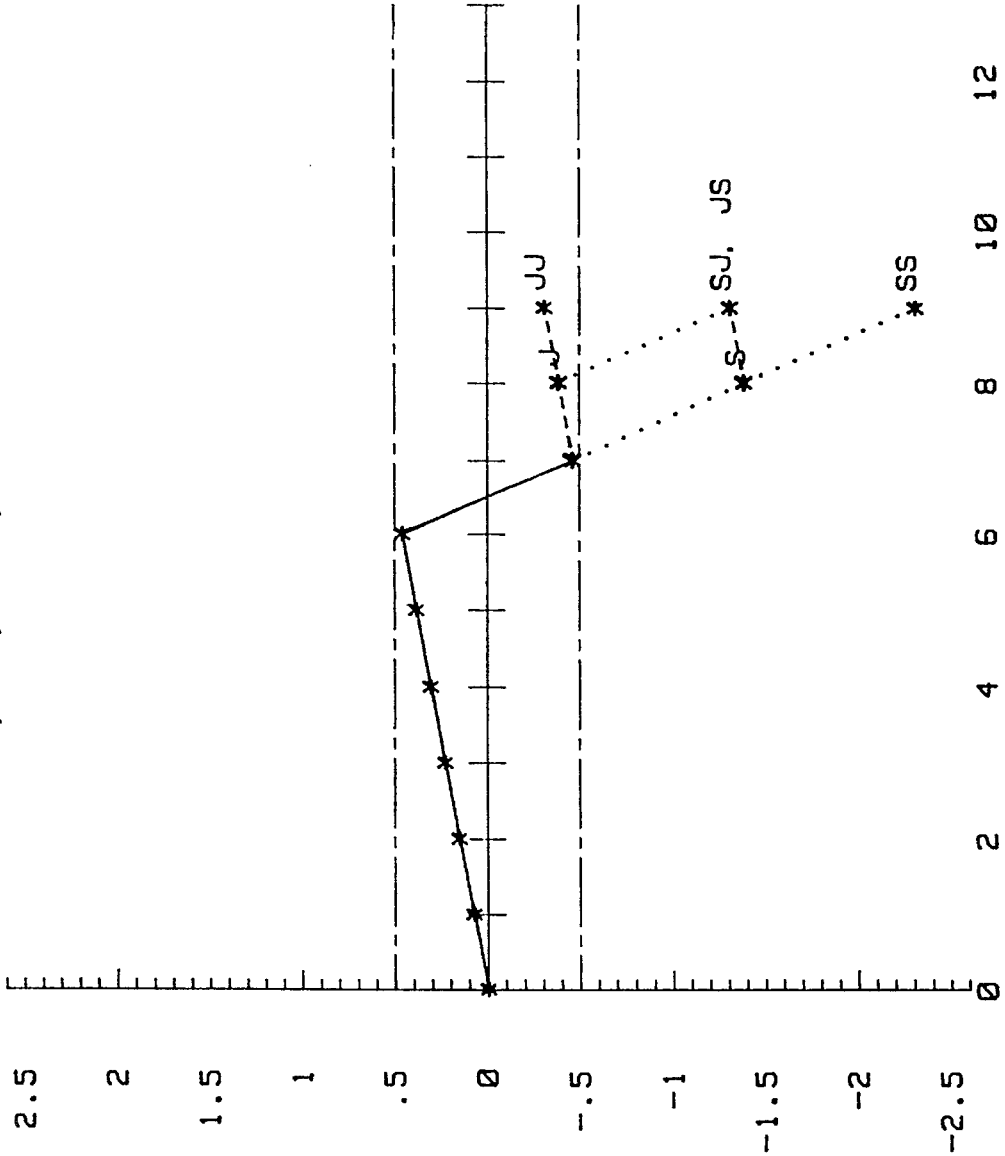
FIG. 46 is a plot of absolute error terms corresponding to the five trial next locations for the transitions S, J, SS, JJ and SJ/JS from the starting location at X=7 in FIG. 37.
Figure 47:
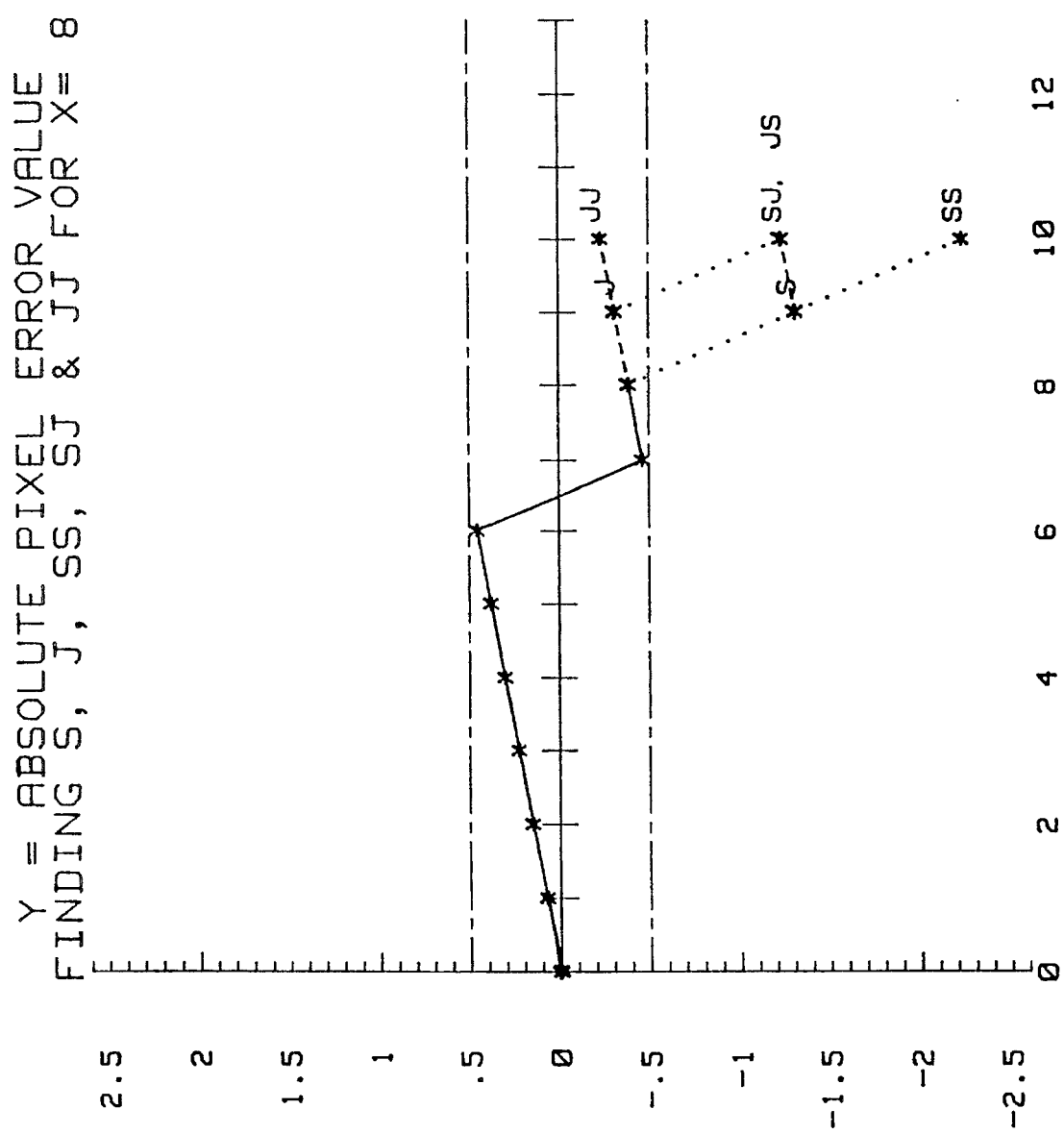
FIG. 47 is a plot of absolute error terms corresponding to the five trial next locations for the transitions S, J, SS, JJ and SJ/JS from the starting location at X=8 in FIG. 37.

FIGS. 37–47 have been included to illustrate various interesting transitions in a vector having a $\Delta X=13$ and a $\Delta Y=12$. FIG. 37 illustrates the vector as a collection 36 of fourteen pixels on a pixel grid 37. Also shown is the ideal line segment 38 represented by the equation $Y=12/13\ X$. FIG. 38 is a plot of the Bresenham error term for the entire vector. FIGS. 39–42 show the partial Bresenham error term and trial Bresenham error terms associated with starting locations X=5 through X=8, respectively. FIG. 43 is a plot of the absolute error term for the entire vector, and FIGS. 44–47 correspond to FIGS. 39–42, except that they are for the absolute error term.

Figure 48:
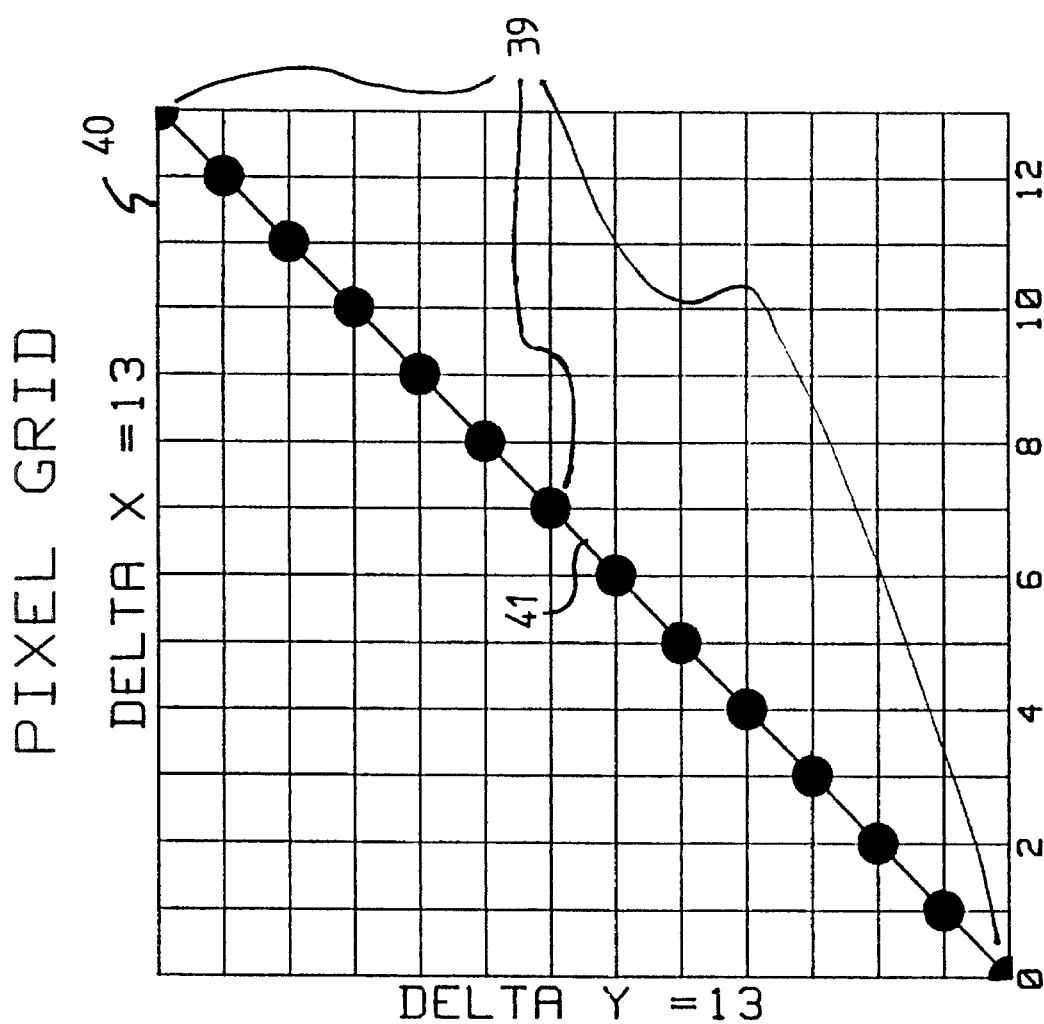
FIG. 48 is a pixel grid having pixels selected to represent a line segment that is described by a ΔX=13 and a ΔY=13.
Figure 49:
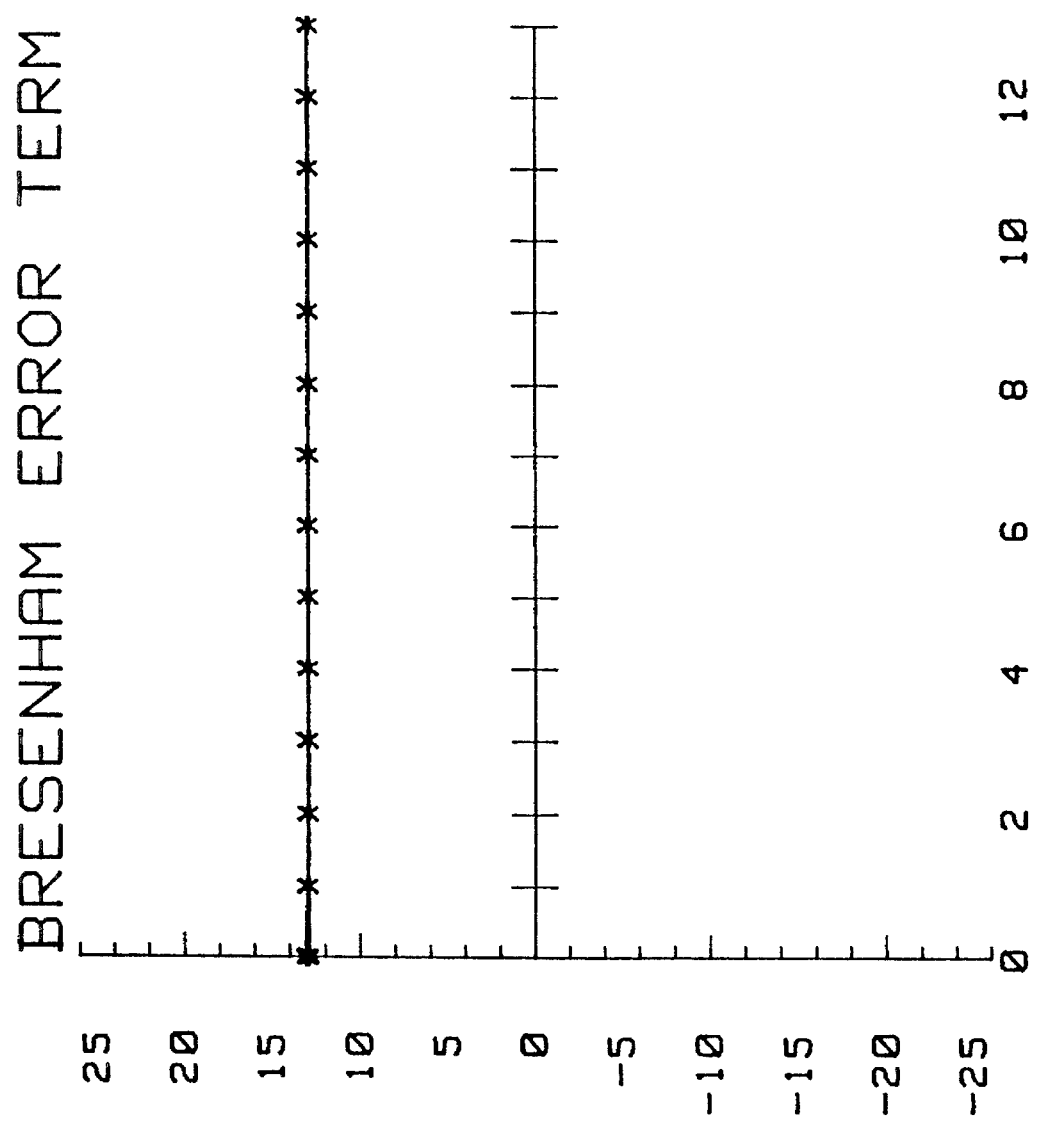
FIG. 49 is a graph of the Bresenham error term of the pixels for the line segment of FIG. 48.
Figure 50:
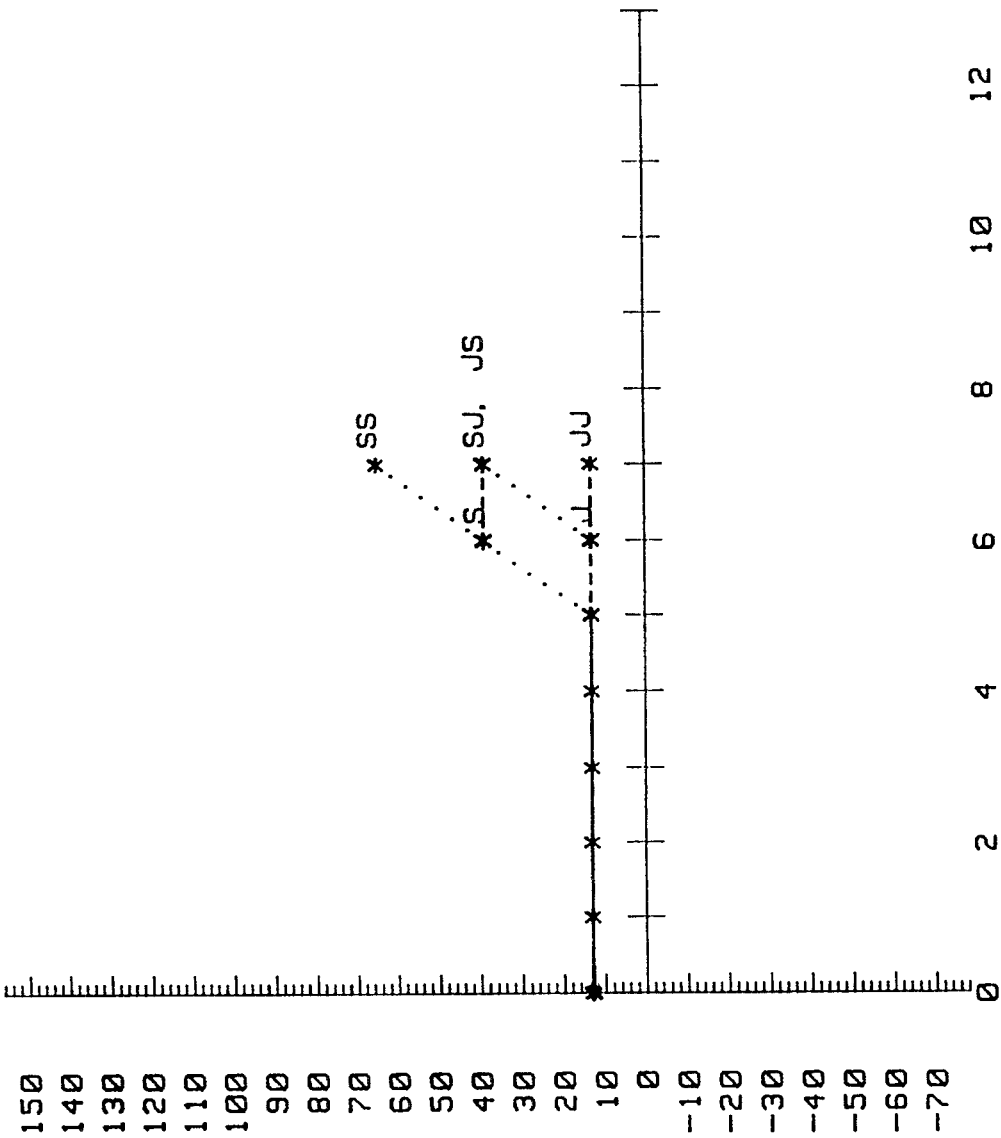
FIG. 50 is a plot of Bresenham error terms corresponding to the five trial next locations for the transitions S, J, SS, JJ and SJ/JS from the starting location at X=5 in FIG. 48.
Figure 51:
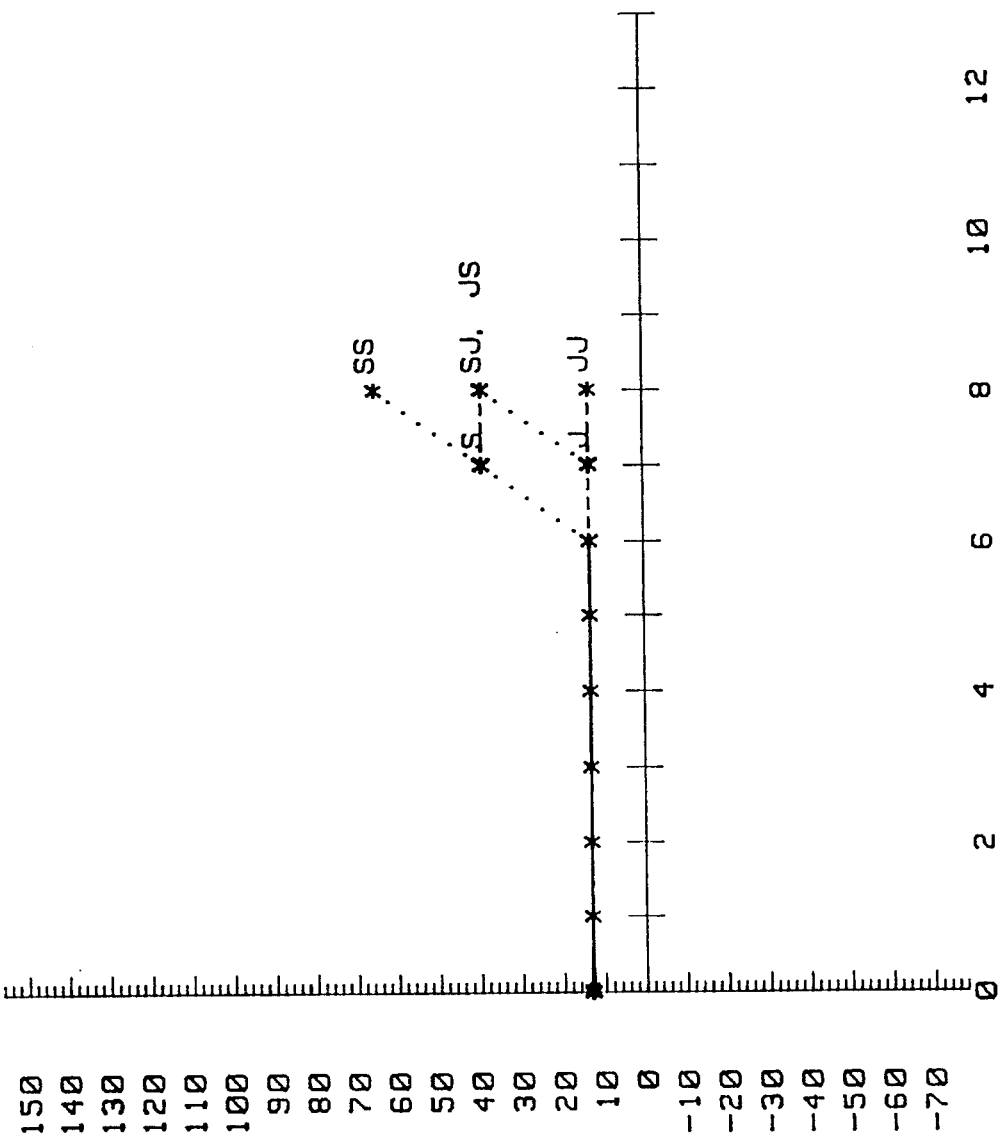
FIG. 51 is a plot of Bresenham error terms corresponding to the five trial next locations for the transitions S, J, SS, JJ and SJ/JS from the starting location at X=6 in FIG. 48.
Figure 52:
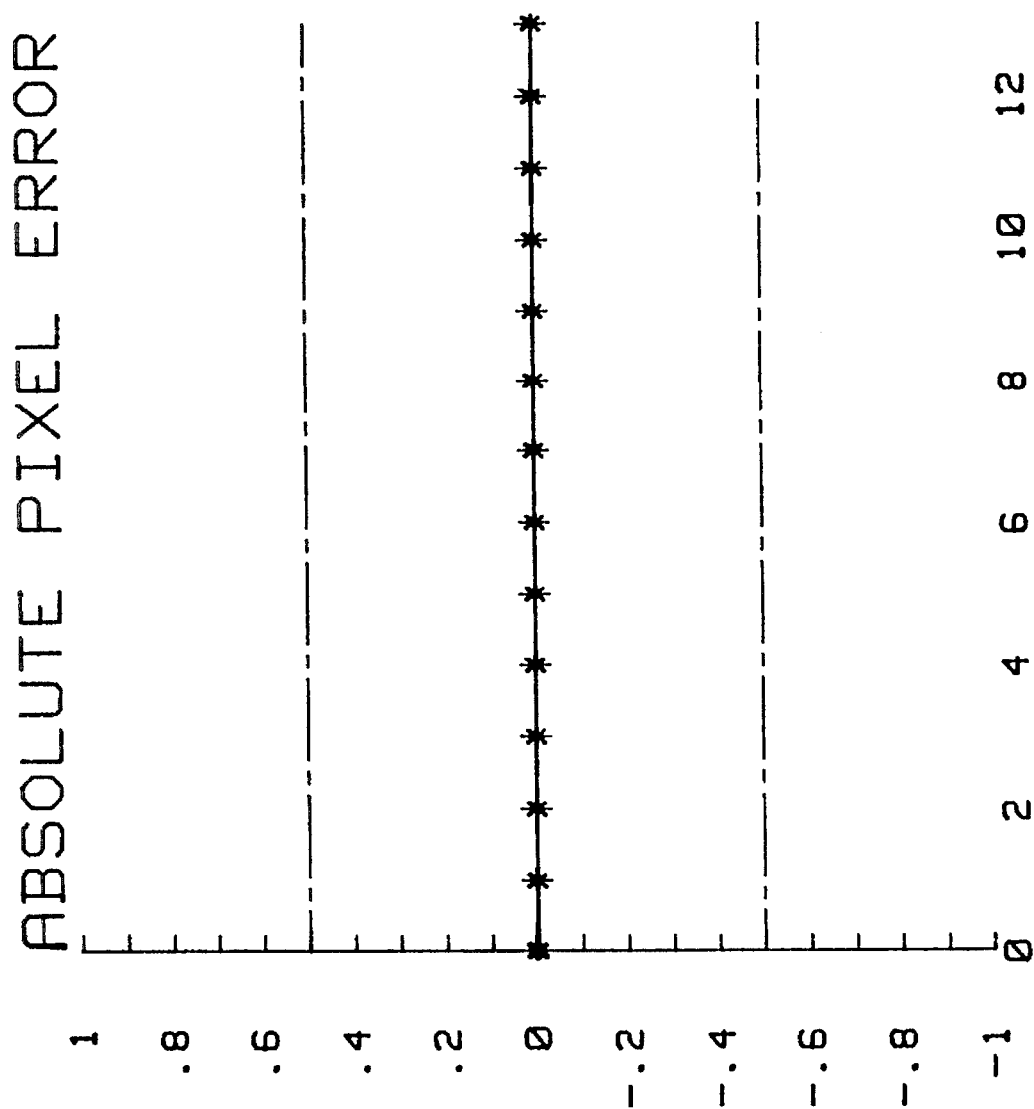
FIG. 52 is a graph of the absolute pixel error of the pixels for the line segment of FIG. 48.
Figure 53:
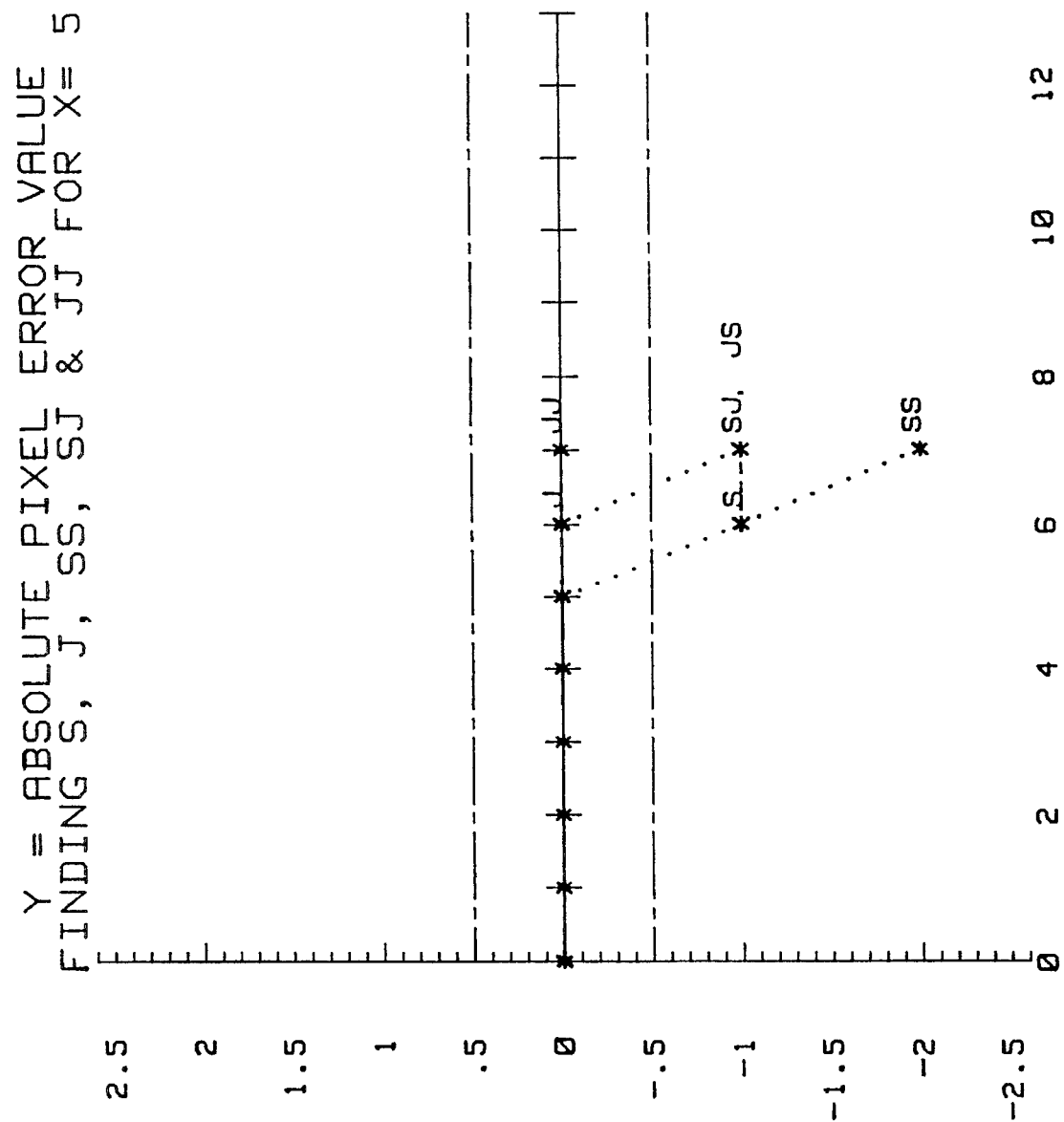
FIG. 53 is a plot of absolute error terms corresponding to the five trial next locations for the transitions S, J, SS, JJ and SJ/JS from the starting location at X=5 in FIG. 48.

FIGS. 48–54 have been included to illustrate various interesting transitions in a vector having a $\Delta X=13$ and a $\Delta Y=13$. FIG. 48 illustrates the vector as a collection 39 of fourteen pixels on a pixel grid 40. Also shown is the ideal line segment 41 represented by the equation Y=13/13 X. FIG. 49 is a plot of the Bresenham error term for the entire vector. FIGS. 50 and 51 show the partial Bresenham error term and trial Bresenham error terms associated with starting locations X=5 and X=6, respectively. FIG. 52 is a plot of the absolute error term for the entire vector, and FIGS. 53 and 54 correspond to FIGS. 50 and 51, except that they are for the absolute error term.

Figure 55A:
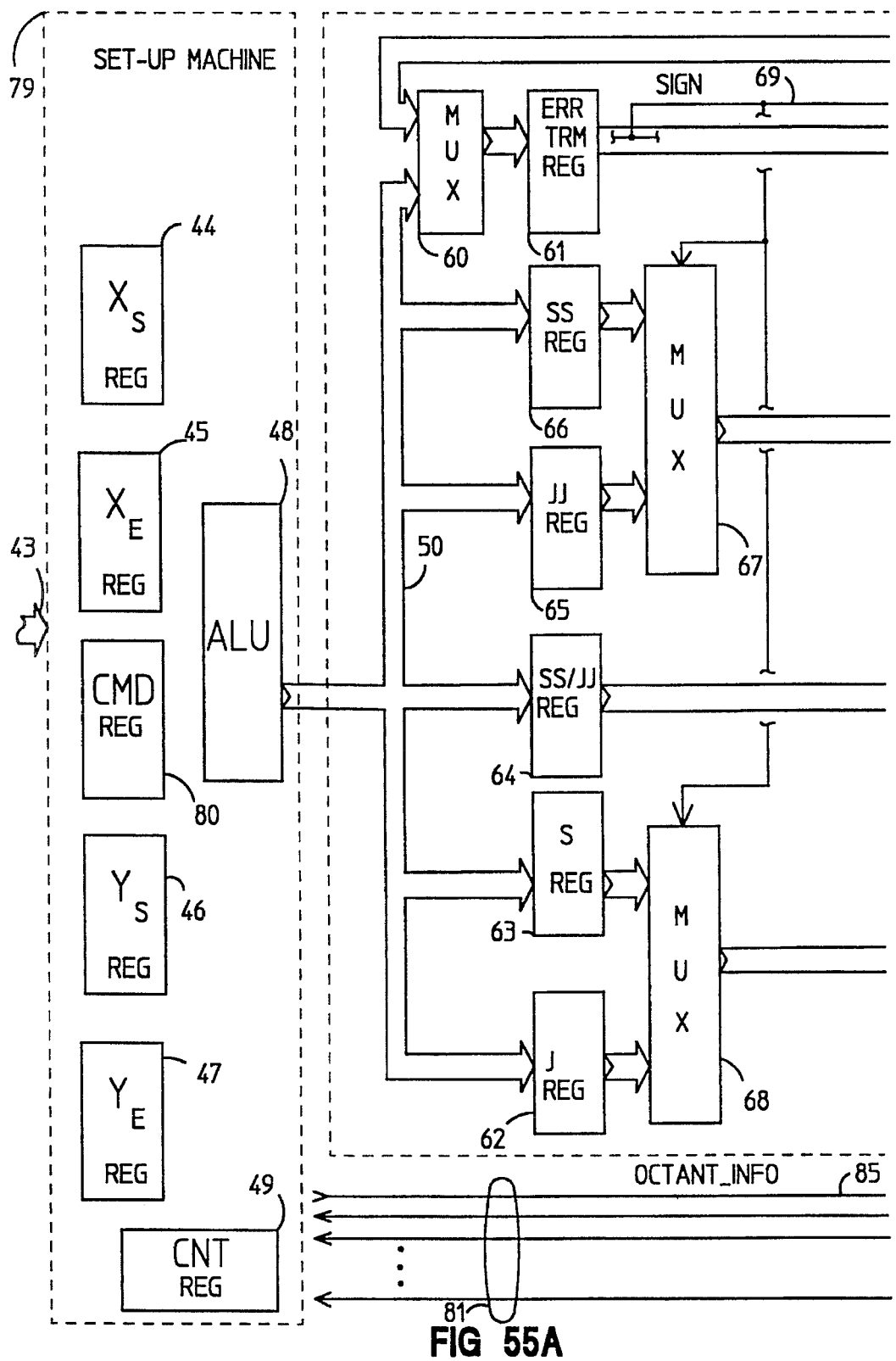
FIGS. 55A and 55B are a simplified hardware block diagram arranged to emphasize the flow of data through a computational mechanism that simultaneously selects a plurality of pixel locations within a pixel grid as locations that lie upon a line segment defined by two end points.
Figure 55B:
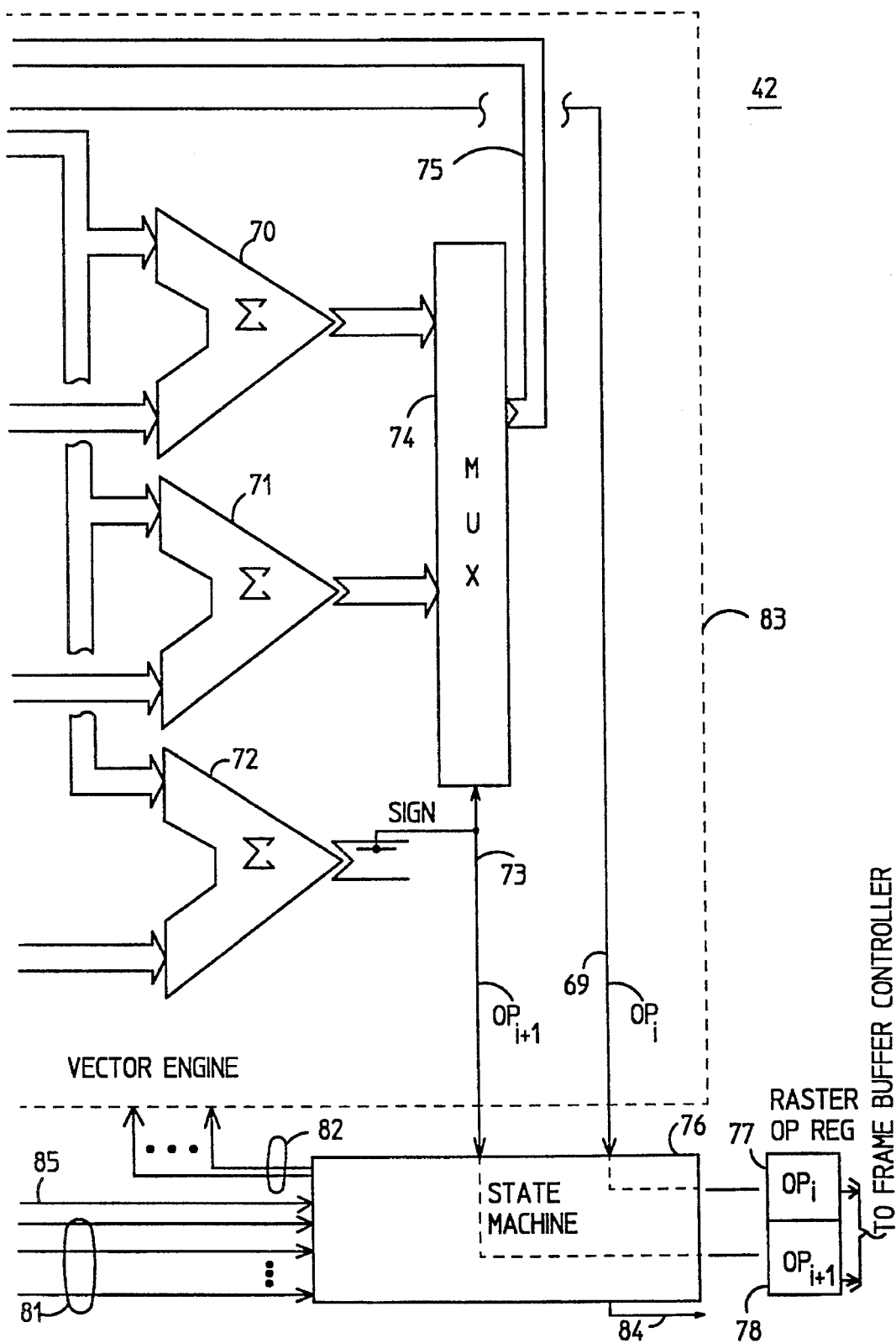

Refer now to FIGS. 55A and 55B, wherein is shown a conceptual block diagram of a hardware mechanism 42 that is capable of simultaneously selecting a plurality of adjacent pixel locations to represent a line segment defined by two end points on a pixel grid. Conceptually, the hardware mechanism 42 is divided into two main sections: a set-up machine 79 and a vector engine 83. The set-up machine 79 responds to commands and data from the host environment and performs initial computations to find various constants. After set-up the vector engine is turned loose to simultaneously select pairs of adjacent pixel locations, according to the principles of the preceding examples for Bresenham's algorithm. A state machine 76 serves both the set-up machine 79 and the vector engine 83.

The set-up machine 79 is responsive to commands and data from a host environment that are supplied over a bus 43. Among the data that are of interest are the end points of the vector to be drawn. The starting pixel location is $(X_s, Y_s)$, and these values are loaded into registers 44 and 45, respectively. In similar fashion the ending pixel location $(X_e, Y_e)$ is loaded into registers 46 and 47, respectively. An instruction (or mode) register 80 can then receive information as to the type of processing that is desired, if there should be more than one kind, and can serve as a means to actually initiate operation after the starting and ending pixel locations have been loaded.

Once the starting and ending pixel locations have been loaded and a vector drawing operation has been initiated, the set-up machine 79 computes an initial Bresenham error term, which is loaded into the Err Term register 61 via MUX 60. The various adjustments that are to be made to the error term to account for a jump J, a step S, a jump and a step in either order SJ/JS, two jumps JJ and two steps SS, are also computed and loaded into associated registers 62 through 66, respectively. The difference between $X_s$ and $X_e$ is also found and placed into a counter (CNT) 49; this tells the number of pixel locations that need to be found. The value placed in CNT register 49 may also cooperate with a line style, or line patterning, mechanism (not shown). After each pair of pixel locations is found CNT is decremented by two, or, if the initial value of CNT is first shifted one bit toward the LSB, CNT may be decremented by one for each pair. When the value in CNT reaches zero (or goes negative, as is appropriate, since the cessation of pixel generation may be conditioned on the satisfaction of a number of cyclic mechanisms that do not necessarily end in unison) enough frame buffer operations for adjacent pixel locations have been selected. Any that extend beyond the actual end of the desired vector may be suppressed or simply ignored.

The set-up machine 79 also determines original octant information, which is sent as OCTANT_INFO 85 to the state machine 76. If the vector to be drawn does not lie within the first octant, then the set-up machine 79 determines the equivalent first octant representation that can be operated upon by the vector engine 83, with the understanding that the state machine 76 will use the OCTANT_INFO 85 to adjust the results to appear in the proper octant.

Once the various set-up operations have been completed the vector engine 83 commences operation. It variously combines the initial Bresenham error term in register 61 with error term increments to discover the sequence of steps (S) and jumps (J) that describe the "subsequent next two" locations along the vector. We put the phrase "subsequent next two" in quotes, because just what those next two are needs to be carefully understood. The Bresenham error term in the Err Term register 61 already selects the very next operation: if it is positive the next location is reached by a J; if it is negative, by an S. (Zero can be construed as either positive or negative, as desired, and is typically based on a tie-breaker rule.) The term "subsequent next two" actually refers: (1) to the first operation after the one indicated by Err Term register 61, and is one of the locations reachable by SS, JJ or SJ/JS; and (2), to the second operation after the one indicated by Err Term register 61. That second operation is indicated by the sign of a new value for the Bresenham error term to be loaded into register 61. To get the pair of pixel locations of interest We use the sign of the Err Term value already found in register 61 to tell us the first location in the pair, which is then reached by either an S or a J. Then we use the sign of the correspondingly adjusted error term value to (1) indicate another S or J, which is the first of the "subsequent next two", and (2), to select an associated new value (second of the "subsequent next two") to be placed into the Err Term register 61. Its sign also selects a subsequent S or J, but for the next pair. After a new value of the error term has been placed into register 61 the process may continue for another pair of pixel locations.

Here is a more detailed description of the process carried out by the vector engine 83. Assume that the Err Term register 61 has just been loaded with a new value of the Bresenham error term. Its sign 69 is immediately put to use in three different places. First, it goes to state machine 76 where it is used, in conjunction with the octant information 85, to form the first symbol of the pair of raster operation symbols, $OP_i$ 77. In the first octant, for example, if the sign is positive then a $OP_i$ 77 is set to represent S; if negative it is set to represent a J. Having thus selected what the next operation is to be, it is necessary to find out what the one after that is to be. To do that the value of the error term in register 61 must be adjusted by the constant corresponding to the selected operation, which is the second place where the sign information 69 is put to use. To that end sign information 69 controls which of registers 62 and 63 is passed through MUX 68 to one input of adder 72. The other input to adder 72 is the existing Bresenham error term in register 61. Since the selected operation can't be both an S and a J at the same time, only one needs to be used, thus reducing the amount of hardware..The result of the calculation by adder 72 is another Bresenham error term whose sign 73 select the next operation, S for + and J for −, just as above. The sign 73 is sent to state machine 76, where is used in the formation of the second symbol $OP_{i+1}$ 78 in the pair of raster operation symbols. Sign 73 also is sent to a MUX 74, whose operation is described below.

At the same time that adder 72 is calculating its sum, adder 70 is calculating One of two possible error terms for the "double operation" after the one corresponding to the calculation in adder 72. That is, if the operation in adder 72 is for an S, then the one in adder 70 is for SS, and if the operation in adder 72 is for a J, then the one in adder 70 is for JJ. To this end, MUX 67 is the third place where sign information 69 is put to use, by controlling whether the JJ constant of register 65 or the SS constant of register 66 is sent forward to be one of the inputs to adder 70. The other input to adder 70 is the Bresenham error term in register 61. Thus, the output of adder 70 represents two of the three possible new Bresenham error terms that might be used as the next Bresenham error term value in register 61. (Of course, both possibilities are not represented at any one time, as only one of the two is possible, depending on whether the first operation was S or J.)

The third possible value of the Bresenham error term is, of course, the one for SJ/JS. While adders 70 and 72 are calculating their outputs, adder 71 is finding that third possible value for the Bresenham error term. It does this by combining the SJ/JS constant in register 64 with the error term in register 61.

The outputs of adders 70 and 71 represent the possible choices for the next Bresenham error term value in register 61. The selection is made by MUX 74 according to the sign information 73 from adder 72.

It will be appreciated that vector engine 83 is capable of producing pairs of raster operation symbols $OP_i$ and $OP_{i+1}$, simultaneously, during the same single dock cycle, and of continuing to do so repeatedly, during consecutive clock cycles. At the beginning of a clock cycle the Err Term Reg 61 will contain a value, either from the activities of the set-up machine 79, or from MUX 74 at the end of the previous clock cycle. Thus, at the start of the current cycle the sign of the value in the Err Term Reg 61 is available both for duty as $OP_i$ and as steering information within the vector engine 83. As steering information it selects which sums are formed by adders 70 and 72. The forming of the sums by the adders 70, 71 and 72 does take a significant portion of the clock cycle. However, at the conclusion of that portion the sign 73 of the sum formed by adder 72 is available. It get used as OPi+1 and as steering for selecting which of the outputs from adders 70 and 71 (which outputs are also now available) is to be used as the next value in Err Term Reg 61. Thus, at the end of the dock cycle the vector engine 83 is ready to compute another pair of frame buffer operation codes. It is required that there be no extraneous delays as data propagates through the circuit, and it is required that the Err Term Reg 61 be of a design that it's contents can be: dumped to a bus during the same time that it is being loaded from another bus. It is quite conventional for a register to be able to operate in that fashion.

Once both raster operation symbols $OP_i$ and $OP_{i+1}$ have been generated, state machine 76 may generate a signal 84 that indicates to a frame buffer controller (not shown) that the next pair of frame buffer operations is available. Alternatively, the frame buffer operation symbols may be pushed onto the top a stack-like structure, from which they are withdrawn at the bottom as the frame buffer controller uses them. The state machine 76 controls the action of the resources of the set-up machine 79 and vector engine 83, and also responds to conditions occurring therein, through collections of control lines 81 and 82, and the signal OCTANT_INFO 85.

One of the conditions to be responded to is when the value in the CNT register 49 indicates that the entire vector has been drawn. If an even number of frame buffer operations are required, then no special actions are required. It may happen, however, that the first frame buffer operation of a pair completes the vector; some means is then required to inform the frame buffer that the second of the pair is to be ignored. Similarly, the vector engine may continue to produce pixels because a condition relating to line patterning is not yet satisfied. A way to do this is to define a frame buffer operation symbol that is either a no operation symbol (NOP) or a termination indicator. Then, at the end of the sequence of selected operations the state machine 76 uses that NOP or termination indicator, allowing an arbitrary number of frame buffer operations $OP_j$ to be transmitted as pairs.

It was stated above that FIG. 55 was a conceptual block diagram. What we mean by this is that it is not a literal block diagram of the actual resources used to implement the hardware apparatus 42. Instead, it has been optimized to illustrate how data flows and how it interacts. A general description and hardware block diagram of the actual apparatus would give little due as to its purpose and particular means of operation. That is because it is simply a collection of resources, such as registers and ALU's, that are coupled together by various busses. A state machine, or perhaps a PLA, responds to conditions inside the resources and issues instructions to those resources. Thus, the MUX's 67, 68 and 74 do not exist as individual circuits. Instead of MUX 67, for example, there will be issued either a "Dump SS Reg" instruction or a "Dump JJ Reg" instruction (say, to the double step, or DS, bus). At the same time, the ALU 70 would receive a "Load from DS" instruction. In keeping with this kind of architecture, there really would not need to be separate collections of ALU's for use only by the set-up machine or by the vector engine. Instead, there is some minimum number that are shared through the bussing arrangement. The same can be said of all the other needed resources that are provided for use by the set-up machine 79 and the vector engine 83. A thoroughly documented example of this sort of thing may be found in the patent to Swanson previously incorporated herein.

Appendix

Figure 54:
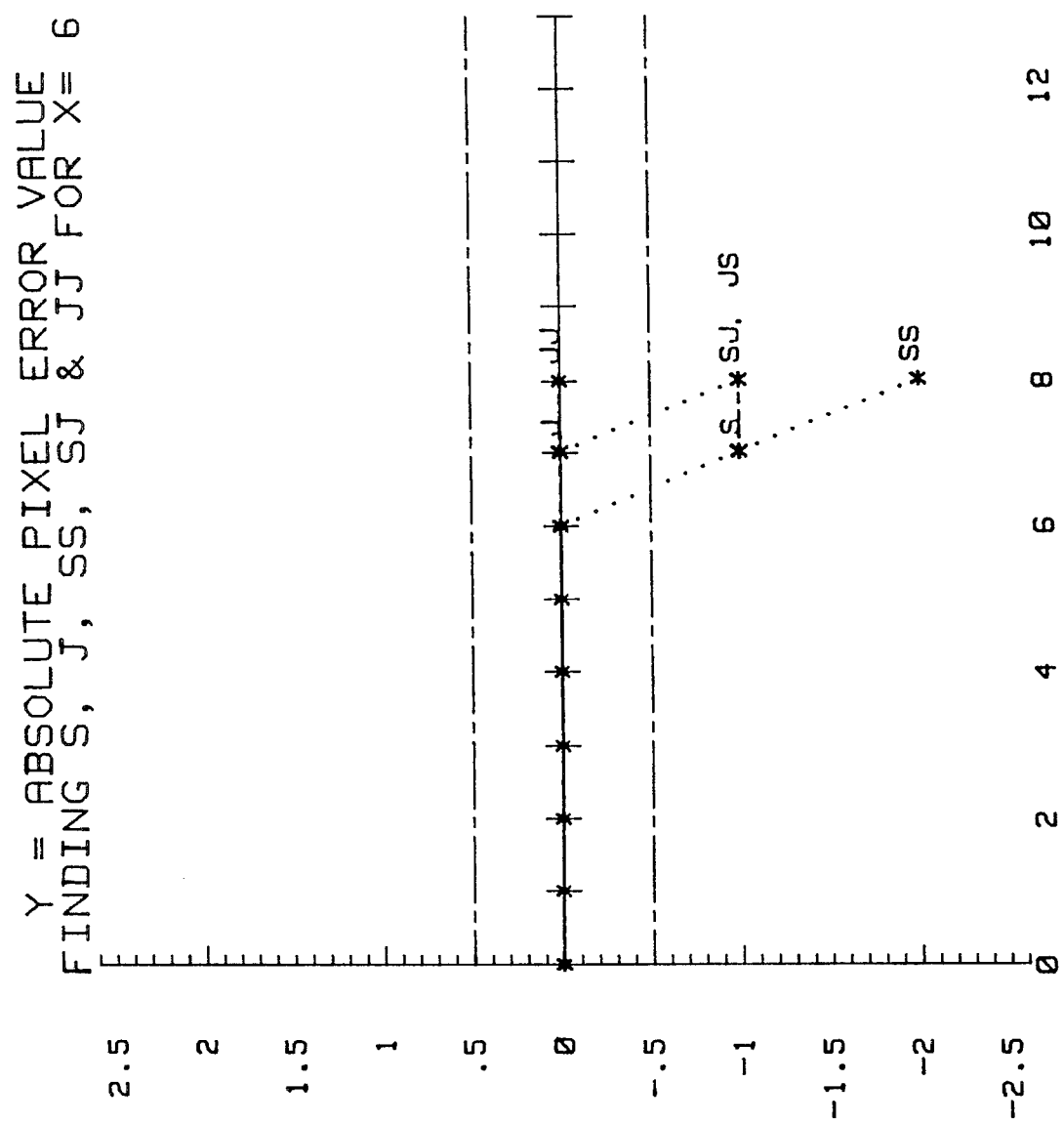
FIG. 54 is a plot of absolute error terms corresponding to the five trial next locations for the transitions S, J, SS, JJ and SJ/JS from the starting location at X=6 in FIG. 48.

This Appendix contains a listing of a program written in Basic. The purpose of the program is to illustrate how trial error terms can be calculated in advance to allow simultaneous selection of pixel locations. The program was written to run on HP equipment, and in particular assumes that an HPGL device is available to construct the graphical output that is produced. Figures 2-54 were produced using this program.

APPENDIX   PAGE 1 of 7

```
10    !THIS PROGRAM IS WRITTEN TO RUN UNDER HEWLETT-PACKARD BASIC.
20    !IT RAN UNDER 6.2, BUT WILL PROBABLY RUN UNDER ANY EARLIER VERSION,
30    !ALTOUGH THIS WAS NOT TESTED. THE PROGRAM ASSUMES THAT THERE IS AN
40    !HP-IB INTERFACE AT SELECT CODE 7, AND THAT THERE IS AN HP-GL PLOTTER
50    !WITH ADDRESS 6 ON THAT HP-IB. THE PLOTTER USED WAS AN HP7550. EARLIER
60    !MODELS CAN BE USED, BUT CERTIAN FEATURES MIGHT VANISH (E.G., #'S AT THE
70    !END OF PLOT VECTORS. FLOTTER PEN 1 GETS THE SMALLER PEN (.35?) WHILE
80    !PEN 2 GETS A LARGER PEN (.7?).
81    !
82    !IF THE PLOTTER USED DOES NOT HAVE AUTOMATIC PAPER FEED, THEN ANY
83    ![OUTPUT 706; "PG"] STATEMENT NEEDS TO BE REPLACED WITH A [PAUSE/CONTINUE]
84    !STRUCTURE, INCLUDING A MESSAGE TO LOAD A NEW SHEET INTO THE PLOTTER.
85    !
90    PRINTALL IS CRT
100   DEG
110   OUTPUT 706;"IN","FS 7","VS 5"
120   PLOTTER IS 706,"HPGL"
130   PENUP
140   VIEWPORT 30,90,20,80
150   INTEGER Xend,Yend,D,Incr1,Incr2,X,Y,Pixnum,Xtic
160 Gazin:  INPUT "ENTER INTEGER DELTA X NOT MORE THAN 20 = ",Xend,"ENTER INTEGER DELTA Y LESS THAN OR EQUAL TO DELTA X = ",Yend
170   IF Xend=0 OR Xend<0 THEN GOTO Gazin
180   IF Yend=0 OR Yend<0 THEN GOTO Gazin
190   Slope=Yend/Xend
200   WINDOW 0,Xend,0,Xend
210   DIM Ytable(21)
220   DIM Dtable(21)
230   DIM Etable(21)
240   Slope=Yend/Xend
250   D=Yend+Yend-Xend
260   Incr1=Yend+Yend
270   Incr2=(Yend-Xend)+(Yend-Xend)
280   X=0
290   Y=0
300   CLIP OFF
310   PEN 2
320   PENUP
330   MOVE Xend/2,1.1*Xend
340   CSIZE 5
350   LORG 4
360   LABEL USING """PIXEL GRID"""
370   PENUP
380   MOVE Xend/2,Xend
390   CSIZE 4
400   LORG 4
410   LABEL USING """DELTA X =""",DD";Xend
420   PENUP
430   MOVE 0,Xend/2
440   LDIR 270
450   LORG 6
460   LABEL USING """DELTA Y =""",DD";Yend
470   LDIR 0
480   CLIP ON
490   PEN 1
500   GRID 1,1
```

```
510    CLIP OFF
520    PEN 2
530    LORG 6
540    CSIZE 3
550    FOR Xtic=0 TO Xend STEP 2
560      MOVE Xtic,0
570      LABEL USING "K";Xtic
580    NEXT Xtic
590    CLIP ON
600    PLOT X,Y,+1
610    Ytable(X)=Y
620    Dtable(X)=D
630    FOR R=.02 TO .3 STEP .02
640      POLYGON R,24,24
650    NEXT R
660    PENUP
670    X=X+1
680    IF D<0 THEN
690      D=D+Incr1
700    ELSE
710      Y=Y+1
720      D=D+Incr2
730    END IF
740    PLOT X,Y,+1
750    FOR R=.02 TO .3 STEP .02
760      POLYGON R,24,24
770    NEXT R
780    PENUP
790    Ytable(X)=Y
800    Dtable(X)=D
810    IF X<Xend THEN GOTO 670
820    PENUP
830    PEN 2
840    MOVE 0,0
850    PLOT Xend,Yend,-1
860    OUTPUT 706;"PG"
870    VIEWPORT 30,90,20,80
880    WINDOW 0,Xend,-2*Xend,Incr1
890    CLIP OFF
900    PEN 2
910    PENUP
920    MOVE Xend/2,Incr1
930    CSIZE 5
940    LORG 4
950    LABEL USING """BRESENHAM ERROR TERM"""
960    CSIZE 3
970    LORG 8
980    FOR Ytic=0 TO Incr1 STEP 5
990      MOVE -1,Ytic
1000     LABEL USING "K";Ytic
```

```
1010    NEXT Ytic
1020    FOR Ytic=0 TO -2*Xend STEP -5
1030      MOVE -1,Ytic
1040      LABEL USING "K";Ytic
1050    NEXT Ytic
1060    LORG 6
1070    FOR Xtic=0 TO Xend STEP 2
1080      MOVE Xtic,-2*Xend
1090      LABEL USING "K";Xtic
1100    NEXT Xtic
1110    CLIP ON
1120    PEN 1
1130    AXES 1,2,0,0,1,5,3
1140    PEN 2
1150    PENUP
1160    MOVE 0,Dtable(0)
1170    OUTPUT 706;"SM*"
1180    FOR X=0 TO Xend
1190      PLOT X,Dtable(X),-1
1200    NEXT X
1210    OUTPUT 706;"SM","PG"
1220    VIEWPORT 30,90,20,80
1230    WINDOW 0,Xend,-1,+1
1240    CLIP OFF
1250    PEN 2
1260    PENUP
1270    MOVE Xend/2,1
1280    CSIZE 5
1290    LORG 4
1300    LABEL USING """ABSOLUTE PIXEL ERROR"""
1310    CSIZE 3
1320    LORG 8
1330    FOR Ytic=-1 TO +1 STEP .2
1340      Fytic=Ytic
1350      IF ABS(Ytic)<.05 THEN Fytic=0
1360      MOVE -1,Fytic
1370      LABEL USING "K";Fytic
1380    NEXT Ytic
1390    LORG 6
1400    FOR Xtic=0 TO Xend STEP 2
1410      MOVE Xtic,-1
1420      LABEL USING "K";Xtic
1430    NEXT Xtic
1440    CLIP ON
1450    PEN 1
1460    AXES 1,.1
1470    PENUP
1480    OUTPUT 706;"LT-5,5"
1490    MOVE 0,.5
1500    PLOT Xend,.5,-1
```

APPENDIX  PAGE 4 of 7

```
1510    PENUP
1520    MOVE 0,-.5
1530    PLOT Xend,-.5,-1
1540    OUTPUT 706;"LT"
1550    PEN 2
1560    PENUP
1570    MOVE 0,Ytable(0)
1580    OUTPUT 706;"SM*"
1590    FOR X=0 TO Xend
1600       Etable(X)=Ytable(X)-Slope*X
1610       PLOT X,Etable(X),-1
1620    NEXT X
1630    Workloop:DISP "START COUNTING AT ZERO ON THE LEFT, ENTER INTEGER TARGET PIX
        EL X ADDR LESS THAN",Xend-1
1640    INPUT Lpixnum
1650    DISP "ENTER INTEGER TARGET PIXEL X ADDR GREATER THAN OR EQUAL TO ",Lpixnum
        ,"AND LESS THAN ",Xend-1
1660    INPUT Rpixnum
1670    Lpixnum=INT(Lpixnum)
1680    Rpixnum=INT(Rpixnum)
1690    IF Lpixnum>Rpixnum THEN GOTO Workloop
1700    IF NOT (Rpixnum<(Xend-1)) THEN GOTO Workloop
1710    FOR Pixnum=Lpixnum TO Rpixnum STEP 1
1720       OUTPUT 706;"PG","SM","RO 0"
1730       VIEWPORT 20,100,10,90
1740       WINDOW 0,Xend,-6*Xend,6*Incr1
1750       CLIP OFF
1760       PENUP
1770       CSIZE 4
1780       LORG 4
1790       PEN 2
1800       MOVE Xend/2,6*Incr1
1810       LABEL USING """FINDING S, J, SS, SJ & JJ FOR X=""",DD";Pixnum
1820       Temp=6*Incr1-(-6*Xend)
1830       Temp=Temp/10
1840       MOVE Xend/2,6*Incr1+Temp
1850       LORG 6
1860       LABEL USING """Y = BRESENHAM ERROR TERM"""
1870       CSIZE 3
1880       LORG 8
1890       FOR Ytic=0 TO 6*Incr1 STEP 10
1900          MOVE -1,Ytic
1910          LABEL USING "K";Ytic
1920       NEXT Ytic
1930       FOR Ytic=0 TO -6*Xend STEP -10
1940          MOVE -1,Ytic
1950          LABEL USING "K";Ytic
1960       NEXT Ytic
1970       LORG 6
1980       FOR Xtic=0 TO Xend STEP 2
1990          MOVE Xtic,-6*Xend
2000          LABEL USING "K";Xtic
```

```
2010      NEXT Xtic
2020      CLIP ON
2030      PEN 1
2040      AXES 1,2,0,0,1,5,3
2050      PEN 2
2060      PENUP
2070      MOVE 0,Dtable(0)
2080      OUTPUT 706;"SM*"
2090      FOR X=0 TO Pixnum
2100         PLOT X,Dtable(X),-1
2110      NEXT X
2120      PENUP
2130      MOVE Pixnum,Dtable(Pixnum)
2140      OUTPUT 706;"LT-1,1"
2150      PLOT Pixnum+1,Dtable(Pixnum)+Incr1,-1
2160      OUTPUT 706;"LB S"
2170      PENUP
2180      MOVE Pixnum,Dtable(Pixnum)
2190      OUTPUT 706;"LT-2,1"
2200      PLOT Pixnum+1,Dtable(Pixnum)+Incr2,-1
2210      OUTPUT 706;"LB J"
2220      PENUP
2230      MOVE Pixnum+1,Dtable(Pixnum)+Incr1
2240      OUTPUT 706;"LT-1,1"
2250      PLOT Pixnum+2,Dtable(Pixnum)+Incr1+Incr1,-1
2260      OUTPUT 706;"LB SS"
2270      PENUP
2280      MOVE Pixnum+1,Dtable(Pixnum)+Incr1
2290      OUTPUT 706;"LT-2,1"
2300      PLOT Pixnum+2,Dtable(Pixnum)+Incr1+Incr2,-1
2310      OUTPUT 706;"LB SJ,"
2320      PENUP
2330      MOVE Pixnum+1,Dtable(Pixnum)+Incr2
2340      OUTPUT 706;"LT-1,1"
2350      PLOT Pixnum+2,Dtable(Pixnum)+Incr2+Incr1,-1
2360      OUTPUT 706;"LB    JS"
2370      PENUP
2380      MOVE Pixnum+1,Dtable(Pixnum)+Incr2
2390      OUTPUT 706;"LT-2,1"
2400      PLOT Pixnum+2,Dtable(Pixnum)+Incr2+Incr2,-1
2410      OUTPUT 706;"LB JJ"
2420      PENUP
2430      OUTPUT 706;"PG","SM","RO 0","LT"
2440      VIEWPORT 20,100,10,90
2450      WINDOW 0,Xend,-2.6,+2.6
2460      CLIP OFF
2470      PENUP
2480      CSIZE 4
2490      LORG 4
2500      PEN 2
```

APPENDIX    PAGE 6 of 7

```
2510    MOVE Xend/2,+2.6
2520    LABEL USING """FINDING S, J, SS, SJ & JJ FOR X=""",DD";Pixnum
2530    MOVE Xend/2,+2.8
2540    LORG 4
2550    LABEL USING """Y = ABSOLUTE PIXEL ERROR VALUE"""
2560    CSIZE 3
2570    LORG 8
2580    FOR Ytic=0 TO +2.6 STEP .5
2590       MOVE -1,Ytic
2600       LABEL USING "K";Ytic
2610    NEXT Ytic
2620    FOR Ytic=0 TO -2.6 STEP -.5
2630       MOVE -1,Ytic
2640       LABEL USING "K";Ytic
2650    NEXT Ytic
2660    LORG 6
2670    FOR Xtic=0 TO Xend STEP 2
2680       MOVE Xtic,-2.6
2690       LABEL USING "K";Xtic
2700    NEXT Xtic
2710    CLIP ON
2720    PEN 1
2730    AXES 1,.1,0,0,1,10,3
2740    PENUP
2750    OUTPUT 706;"LT-5,5"
2760    MOVE 0,.5
2770    PLOT Xend,.5,-1
2780    PENUP
2790    MOVE 0,-.5
2800    PLOT Xend,-.5,-1
2810    OUTPUT 706;"LT"
2820    PEN 2
2830    PENUP
2840    MOVE 0,Etable(0)
2850    OUTPUT 706;"SM*"
2860    FOR X=0 TO Pixnum
2870       PLOT X,Etable(X),-1
2880    NEXT X
2890    PENUP
2900    MOVE Pixnum,Etable(Pixnum)
2910    OUTPUT 706;"LT-1,1"
2920    PLOT Pixnum+1,Ytable(Pixnum)-Slope*(Pixnum+1),-1
2930    OUTPUT 706;"LB S"
2940    PENUP
2950    MOVE Pixnum,Etable(Pixnum)
2960    OUTPUT 706;"LT-2,1"
2970    PLOT Pixnum+1,Ytable(Pixnum)+1-Slope*(Pixnum+1),-1
2980    OUTPUT 706;"LB J"
2990    PENUP
3000    MOVE Pixnum+1,Ytable(Pixnum)-Slope*(Pixnum+1)
```

APPENDIX    PAGE 7 of 7

```
3010    OUTPUT 706;"LT-1,1"
3020    PLOT Fixnum+2,Ytable(Pixnum)-Slope*(Fixnum+2),-1
3030    OUTPUT 706;"LB SS"
3040    PENUP
3050    MOVE Fixnum+1,Ytable(Pixnum)-Slope*(Fixnum+1)
3060    OUTPUT 706;"LT-2,1"
3070    PLOT Fixnum+2,Ytable(Pixnum)+1-Slope*(Fixnum+2),-1
3080    OUTPUT 706;"LB SJ,"
3090    PENUP
3100    MOVE Fixnum+1,Ytable(Pixnum)+1-Slope*(Fixnum+1)
3110    OUTPUT 706;"LT-1,1"
3120    PLOT Fixnum+2,Ytable(Pixnum)+1-Slope*(Fixnum+2),-1
3130    OUTPUT 706;"LB     JS"
3140    PENUP
3150    MOVE Fixnum+1,Ytable(Pixnum)+1-Slope*(Fixnum+1)
3160    OUTPUT 706;"LT-2,1"
3170    PLOT Fixnum+2,Ytable(Pixnum)+2-Slope*(Fixnum+2),-1
3180    OUTPUT 706;"LB JJ"
3190    PENUP
3200    OUTPUT 706;"LT","SM"
3210 NEXT Fixnum
3220 More:INPUT "PICK ANOTHER RANGE OF X PIXEL ADDRESSES ?  YES OR NO & ENTER",Answr$
3230    IF Answr$="YES" THEN GOTO Workloop
3240    IF NOT (Answr$="NO") THEN GOTO More
3250    OUTPUT 706;"PG","SM","LT","IN"
3260    DISP "DONE"
3270    END
```

We claim:

1. A method of selecting which adjacent pixels in a pixel grid are to represent a line segment having a slope $0 \leq m \leq 1$ and whose end points are specified to be the starting pixel location $(X_s, Y_s)$ and the ending pixel location $(X_e, Y_e)$, X being the major axis and Y being the minor axis, the selected adjacent pixels described by a sequence of operations S and J, S representing a unit increment in the X axis without a unit increase in the Y axis, and J representing a unit increase in the X axis accompanied by a unit increase in the Y axis, the method comprising the steps of:

(a) computing an initial value for an error term E;

(b) computing error terms increments $\Delta_S$, $\Delta_J$, $\Delta_{SS}$, $\Delta_{JJ}$ and $\Delta_{JS/SJ}$, corresponding respectively to the individual operations S, J, the ordered compounds S followed by S, J followed by J, and the unordered compound of J in conjunction with S;

(c) selecting one of $\Delta_S$ and $\Delta_J$ based on an inspection of the error term E;

(d) selecting one of $\Delta_{SS}$ and $\Delta_{JJ}$ based on an inspection of the error term E;

(e) subsequent to step (c), computing either the trial error term $E+\Delta_S$ or the trial error term $E+\Delta_J$, according to the selection in step (c);

(f) subsequent to step (d), computing either the trial error term $E+\Delta_{SS}$ or the trial error term $E+\Delta_{JJ}$, according to the selection in step (d);

(g) subsequent to steps (a) and (b), computing the trial error term $E+\Delta_{JS/SJ}$;

(h) selecting one of the trial error terms computed in step (f) or step (g) as a new value of the error term E, based on an inspection of the trial error term computed in step (e);

(i) indicating that the next operation should be S if the error term increment selected in step (c) was $\Delta_S$ and should be J if the error term increment selected in step (c) was $\Delta_J$; and (j) indicating that the operation subsequent to the next operation should be S or J in accordance with the outcome of the inspection in step (h) of the trial error term computed in step (e).

2. A method as in claim 1 further comprising the step of repeating steps (c) through (j) until all pixel positions along the X axis between $X_e$ and $X_s$ have had determined an associated S or J operation.

3. A method as in claim 1 wherein the trial error term and the various trial error terms are Bresenham error terms.

4. A method of determining pairs of first and second selected adjacent pixels to represent a line segment having a slope $0 \leq m \leq 1$ and whose end points are a starting pixel location and an ending pixel location, the selected adjacent pixels described by a sequence of operations S and J, S representing a unit increment in a major axis X without a unit increase in minor axis Y, and J representing a unit increase in the X axis accompanied by a unit increase in the Y axis, the method comprising the steps of:

(a) computing a first error term indicating whether the first selected adjacent pixel location that is initially adjacent the starting location is reached by performing an S or by performing a J;

(b) inspecting the first error term to identify which operation S or J is indicated to reach the first adjacent pixel;

(c) if the operation identified in step (b) is S, then computing a second error term for the operation S and that indicates whether the second selected adjacent pixel location is reached by performing an S or by performing a J;

(d) if the operation identified in step (b) is J, then computing a second error term for the operation J and that indicates whether the second selected adjacent pixel location is reached by performing an S or by performing a J;

(e) inspecting the second error term to identify which operation S or J is indicated to reach the second selected adjacent pixel;

(f) computing a third error term for the unordered compound operation of an S in conjunction with a J that is an error term for a third adjacent pixel location;

(g) if the operation identified in step (b) is S, then computing a fourth error term for the compound operation S followed by S that is an error term for a third adjacent pixel location;

(h) if the operation identified in step (b) is J, then computing a fourth error term for the compound operation J followed by J that is an error term for a third adjacent pixel location;

(i) if the operation identified in step (e) was S, then replacing the first error term with the third error term;

(j) if the operation identified in step (e) was J, then replacing the first error term with the fourth error term;

(k) outputting symbols corresponding to the operations identified in steps (b) and (e) ; and (l) repeating steps (b) through (k) until one of the first and second selected adjacent pixel locations corresponds to the ending pixel location.

5. A method as in claim 4 wherein the first through fourth error terms are Bresenham error terms.

* * * * *

UNITED STATES PATENT AND TRADEMARK OFFICE
CERTIFICATE OF CORRECTION

PATENT NO.: 5,519,822

DATED: 5/21/96

INVENTOR(S): Anthony C. Barkans, et al.

It is certified that error appears in the above-indentified patent and that said Letters Patent is hereby corrected as shown below:

Column 2, line 32, delete the comma "," after "this".
Column 3, line 2, after "Fig. 1" insert --is--;
   line 3, change "their" to --that--;
   lines 42, 45, 49, 52, 60, 64, and 67, change "staring" to --starting--.
Column 4, lines 3 and 6, change "staring" to --starting--.
Column 5, line 34, "He" should read --lie--.
Column 6, line 24, "Cartesian"" should read --Cartesian--;
   line 33, "$x_2, y_1$" should read --$x_2, y_1)$--
   line 63, "dose" should read --close--.
Column 7, line 1, "position$_s$" should read --positions--; and
   line 15, delete the comma "," between "to" and "the".
Column 8, line 25, "fat" should read --far--.
Column 12, line 17, "We" should read --we--;
   line 49, delete the second period "." after "hardware."; and
   line 57, "One" should read --one--.
Column 13, line 18, "dock" should read --clock--;
   line 34, "dock" should read --clock--; and
   line 38, delete the semi-colon ":" after "be".

UNITED STATES PATENT AND TRADEMARK OFFICE
CERTIFICATE OF CORRECTION

PATENT NO. : 5,519,822
DATED : 5/21/96
INVENTOR(S) : Anthony C. Barkans, et. al.

It is certified that error appears in the above-identified patent and that said Letters Patent is hereby corrected as shown below:

Column 14, line 29, delete "due" and insert --clue--.

Signed and Sealed this

Eighth Day of February, 2000

Attest:

Q. TODD DICKINSON

Attesting Officer

Commissioner of Patents and Trademarks